United States Patent
Hama et al.

(10) Patent No.: US 6,944,557 B2
(45) Date of Patent: Sep. 13, 2005

(54) ULTRASONIC LENGTH MEASURING APPARATUS AND METHOD FOR COORDINATE INPUT

(75) Inventors: Soichi Hama, Kawasaki (JP); Hidenori Sekiguchi, Kawasaki (JP); Akira Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 10/354,196

(22) Filed: Jan. 30, 2003

(65) Prior Publication Data

US 2003/0144814 A1 Jul. 31, 2003

(30) Foreign Application Priority Data

Jan. 31, 2002 (JP) ...................................... 2002-023386
Feb. 28, 2002 (JP) ...................................... 2002-054982
Mar. 28, 2002 (JP) ...................................... 2002-092766

(51) Int. Cl.[7] ............................................. G08C 21/00
(52) U.S. Cl. ...................... 702/66; 73/1.82; 178/18.04
(58) Field of Search ............................. 702/39, 54, 56, 702/66, 71, 79, 113, 127, 150, 152, 155, 158–159, 166, 171, 176, 178, 183, 189, 193; 73/1.79, 1.81–1.82, 587; 178/18.01, 18.02, 18.03, 18.04, 19.01, 19.02

(56) References Cited

U.S. PATENT DOCUMENTS

| | | | | |
|---|---|---|---|---|
| 3,692,936 A | * | 9/1972 | Moffitt | .................... 178/18.04 |
| 5,637,839 A | * | 6/1997 | Yamaguchi et al. | ..... 178/18.04 |
| 5,760,346 A | * | 6/1998 | Kobayashi et al. | ....... 178/18.04 |
| 6,041,284 A | * | 3/2000 | Yoshimura et al. | ........... 702/56 |
| 6,288,711 B1 | * | 9/2001 | Tanaka et al. | ............... 345/179 |
| 6,338,028 B1 | * | 1/2002 | Shelton et al. | .............. 702/159 |
| 6,356,854 B1 | * | 3/2002 | Schubert et al. | ............ 702/150 |
| 6,484,118 B1 | * | 11/2002 | Govari | ....................... 702/150 |

* cited by examiner

Primary Examiner—Marc S. Hoff
Assistant Examiner—Mary Catherine Baran
(74) Attorney, Agent, or Firm—Westerman, Hattori, Daniels & Adrian, LLP

(57) ABSTRACT

An ultrasonic length measuring apparatus measures the number of times a waveform of an ultrasonic wave signal crosses a threshold value, detects the crossing timing at, for example, a waveform having a maximal amplitude after a predetermined number of times counting from a first crossing point, measures the time period from the transmission start of the ultrasonic wave by the transmission unit to the detected crossing timing and calculates the length based on the time measured. A coordinate inputting apparatus includes a pen for transmitting an ultrasonic wave and a coordinate inputting apparatus for inputting coordinate positions of the pen based on a propagation time of the ultrasonic wave transmitted by the pen and received by a plurality of ultrasonic wave receivers. The receiver includes at least a pair of ultrasonic receivers for receiving the ultrasonic wave transmitted by the pen.

16 Claims, 44 Drawing Sheets

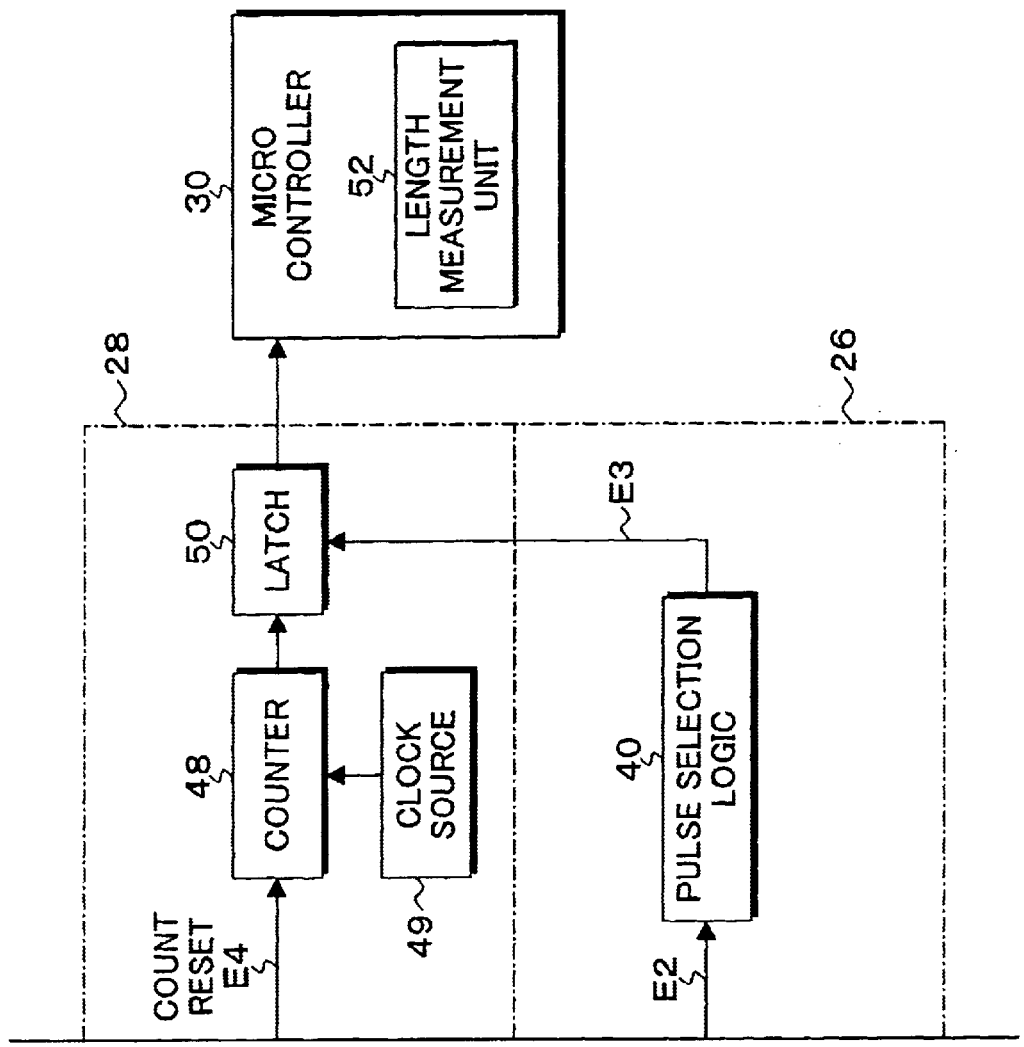
FIG. 7B

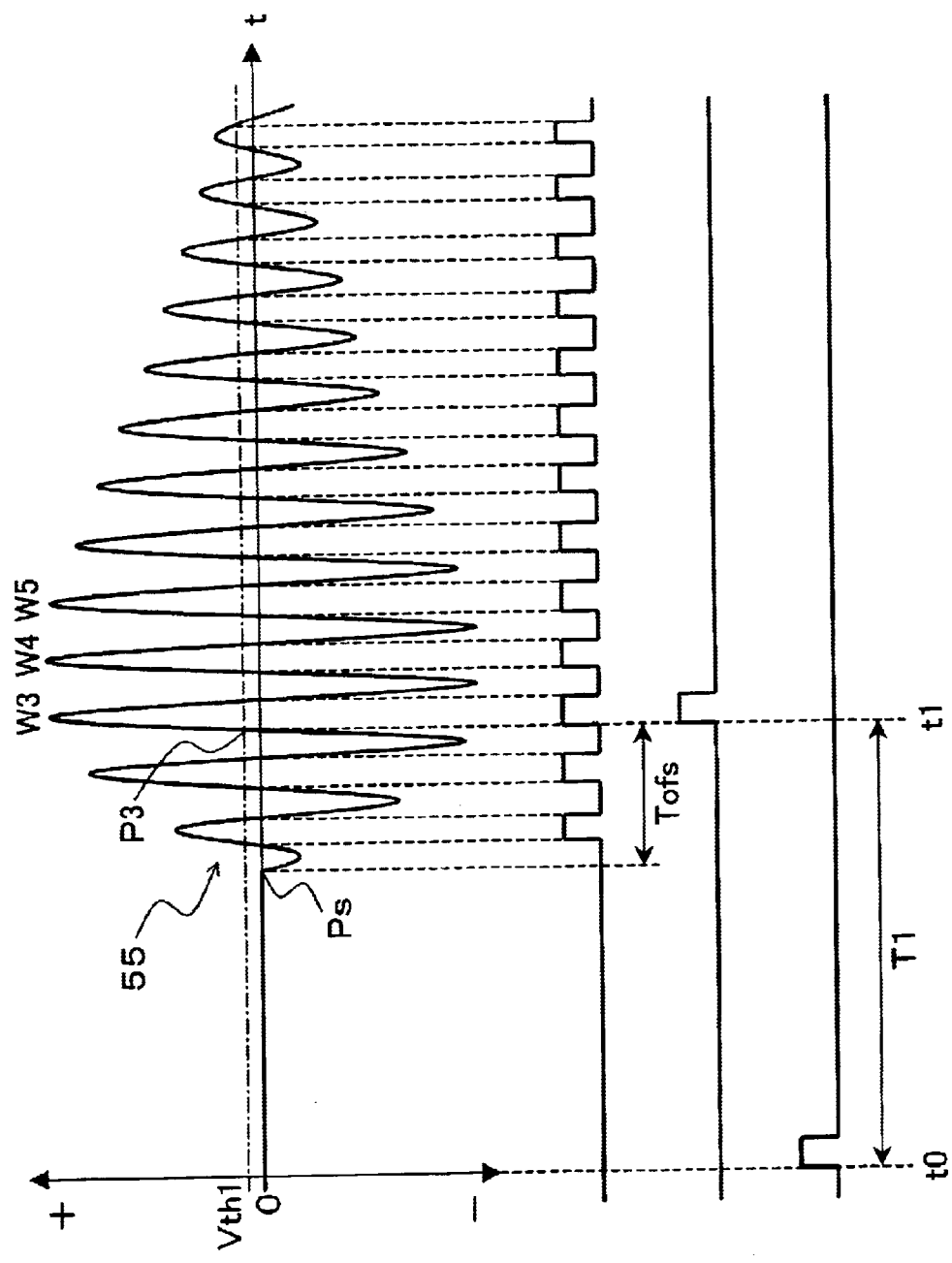
FIG. 8A E1
FIG. 8B E2
FIG. 8C E3
FIG. 8D E4

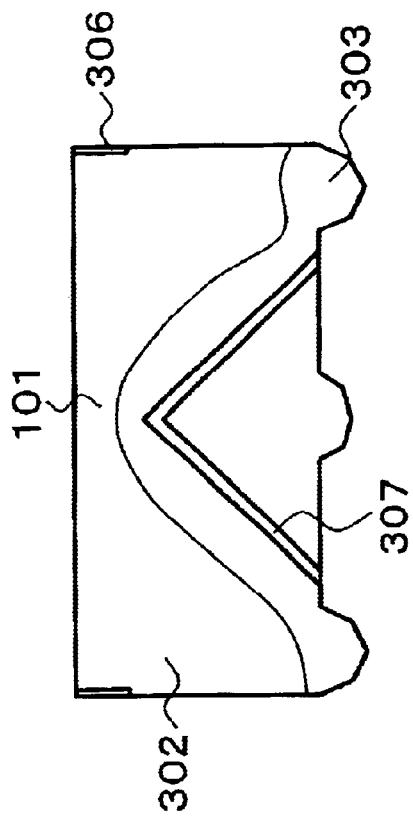
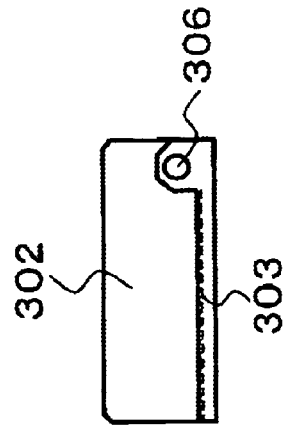
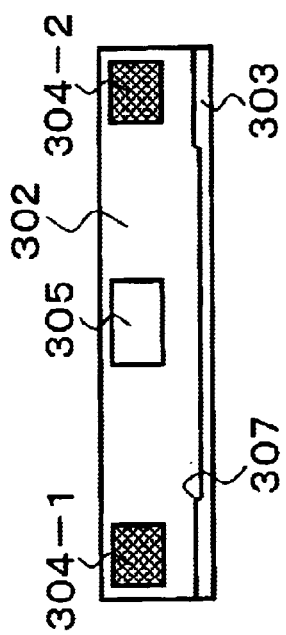

DETECTION OF WRITING

SYNCHRONOUS SIGNAL

ULTRASONIC WAVE TRANSMISSION

SOUND OF COLLISION
ULTRASONIC WAVE
Δt
START OF WRITING

SYNCHRONOUS SIGNAL

FALSE PULSE PRODUCED BY SOUND OF COLLISION

DETECTED ULTRASONIC WAVE

MISDETECTION

Δt

PROPAGATION TIME TO BE DETECTED NORMALLY

DETECTION OF WRITING

SYNCHRONOUS SIGNAL

ULTRASONIC WAVE TRANSMISSION

FIG. 42A  PEN-ON SIGNAL  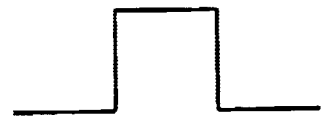
FIG. 42B  PEN-OFF SIGNAL  

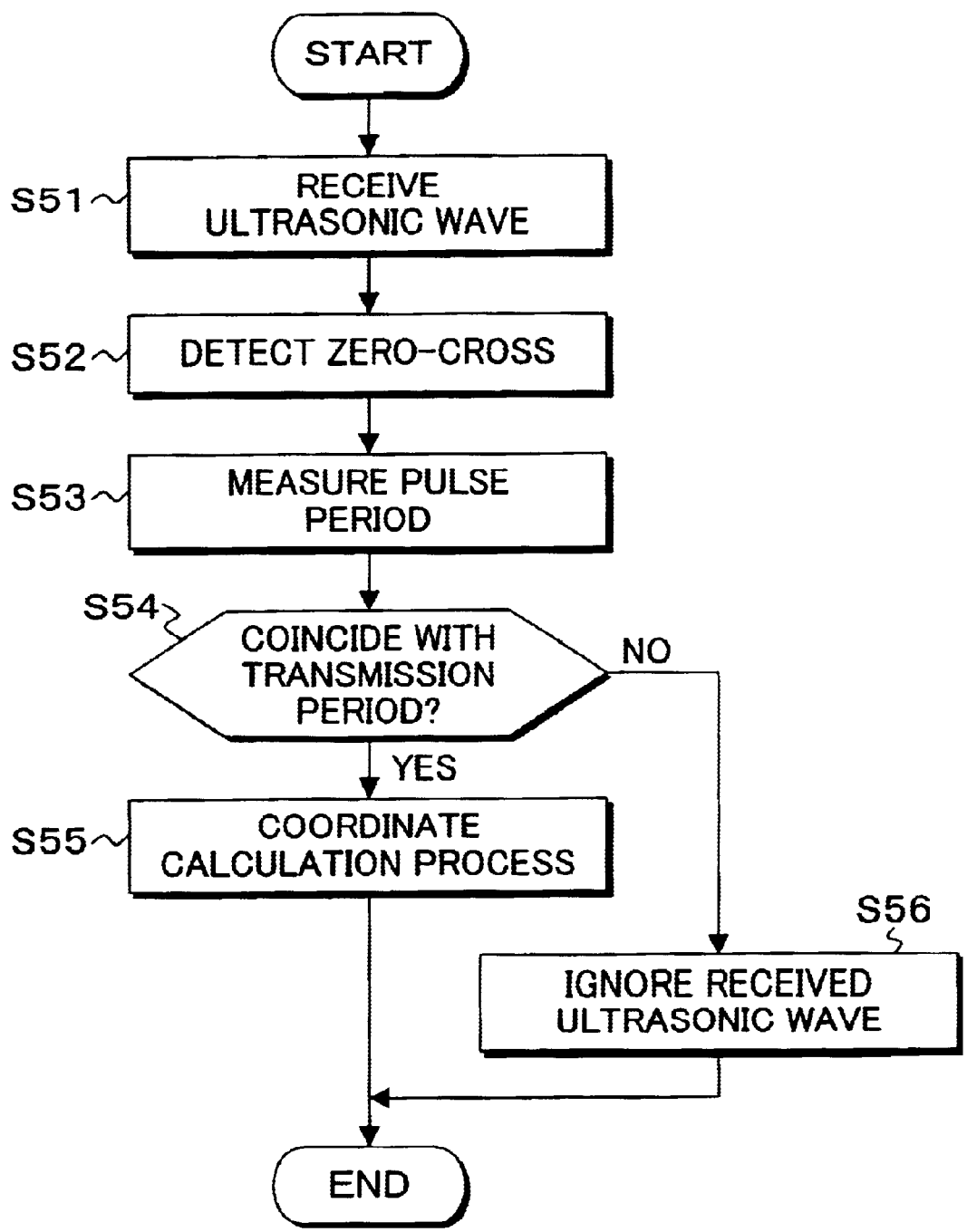

ULTRASONIC LENGTH MEASURING APPARATUS AND METHOD FOR COORDINATE INPUT

BACKGROUND OF THE INVENTION

1. Field of the Invention

The present invention relates generally to an ultrasonic length measuring apparatus and method for measuring the length by counting the propagation time of ultrasonic waves and, more particularly, to an ultrasonic length measuring apparatus and method for coordinate inputting, as character data or graphic data, tracks created by hand-writing characters or figures on a sheet of paper with a dedicated pen.

2. Description of the Related Arts

Mice, trackballs and magnetic-type or pressure-sensitive-type tablets etc. are known as coordinate inputting apparatuses (pointing devices) for inputting the coordinate information to the computer. Among these, the magnetic-type or pressure-sensitive-type tablets are excellent in terms of usability and precision. This is a pointing apparatus with which, when a magnetic-type or pressure-sensitive-type sensor plane is traced with a pen-type mover, the coordinate positions on the sensor plane traced are detected and their position information is output as electric signals. The magnetic-type or pressure-sensitive-type tablet has an excellent characteristic as above but the area for writing operation is limited within the sensor plane attached to it. If the area for writing is extended, a larger apparatus is necessary as an apparatus constituting the sensor plane and, in this case, the cost of the sensor plane unit increases as well as a large space for accommodating the sensor plane unit is necessary.

Conventionally, length measuring apparatuses using ultrasonic wave employed in coordinate inputting apparatuses obtain a length by receiving an ultrasonic wave transmitted by a transmitter and measuring the propagation time periods of the wave. Because the length to be measured is obtained by multiplying the propagation time period by the velocity of the ultrasonic wave, the length is calculated by measuring the time between the time the wave is transmitted and the time the wave arrives at the receiver as the propagation time period. A proper threshold is set for the received waveform of the ultrasonic wave that has been converted into an electric signal after being received by the receiver and the time the signal exceeds the threshold is determined as the time the wave arrives at the receiver. In order to obtain a length accurately, it is necessary to always detect the arriving timing with a same waveform as the received waveform of the ultrasonic wave from the receiver.

Because an ultrasonic wave becomes attenuated as the length the wave has propagated becomes longer, the form of an ultrasonic wave received at the receiver varies depending on the length. FIG. 1 shows a form of an ultrasonic wave received. In FIG. 1, the waveform is the form of an ultrasonic wave 1100 when the length is short and the wave is attenuated to have the form as an ultrasonic wave 1102 represented by the dotted line when the length is long. The ultrasonic wave actually arrives is not only attenuated. An ultrasonic wave sensor made from an ordinary piezoelectric ceramic used as the receiver is very sensitive but the form of the ultrasonic wave received slowly becomes larger as shown in FIG. 1 because of the high Q-value. Therefore, if the arriving time is obtained by simply obtaining the timing when the waveform crosses the threshold $V_{th1}$, the timing is a detected timing 1104 when the length is short but the timing is a detected timing 1106 when the length is long and the amplitude of the detected waveform has been attenuated because the threshold $V_{th1}$ and the wave crossing it are different. As a result, an error corresponding to one wavelength is produced. For example, when utilizing an ultrasonic wave at the frequency of 40 KHz, dislocation of one wavelength causes an error of as much as 8 mm because one wavelength corresponds to approximately 8 mm. As the approaches for reducing this influence of amplitude of ultrasonic waves, a method utilizing the envelope of the form of the ultrasonic wave received (for example, Japanese Patent Application Laid-open (kokai) No. Hei5-215850) and a method for obtaining an assumed zero-cross point utilizing a plurality of each apex of wave of the form of an ultrasonic wave (for example, Japanese Patent Application Laid-open (kokai) No. Hei8-254454) etc. have been proposed. In the case of the method utilizing the envelope, the wave crossing the threshold is not mistaken like in the case utilizing directly the waveform of an ultrasonic wave but the temporal resolution can not made high. In the method in which an assumed zero-cross point is obtained, a complicated, i.e., expensive signal processing circuit is necessary in which a peak-detector is conducted at a plurality of levels for the received waveform and the assumed zero-cross point is obtained by calculation. Therefore, a method in which the signal processing circuit is simple and low-cost but a high temporal resolution can be obtained is being sought.

The uses which need such a high resolution include, for example, a case where a coordinate of a position is measured from two lengths measured by receiving an ultrasonic wave from an ultrasonic wave transmission unit attached to a pen etc. using two ultrasonic wave sensors fixedly mounted and the movement of the pen accompanying the writing down of characters on a sheet of paper is input into an information processing apparatus, and cases where the mounting spacing of ultrasonic wave sensors is much smaller compared to the length to be measured.

With the prevalence of personal computers in recent years, inputting electronic texts using a keyboard is getting more frequent than hand-writing characters on a sheet of paper using pencil etc. However, handwriting characters etc. actually on a sheet of paper is easier than inputting with a keyboard when taking a brief note. Therefore, when attending a meeting, it is still common that each person present brings a scratchpad and hand-writes into it using a pencil. However, considering that the note taken has to be handed out to others or managed, it is preferable that the note taken is electronized. Especially, because the process necessary for the electronization if the hand-written characters are read out by an image scanner and it is inconvenient to carry if a touch-panel or a tablet is employed, it is desirable to be able to input the hand-written characters easily as electronized data. From the above-described facts, conventionally, a coordinate input apparatus is known in which a pair of ultrasonic wave receivers are arranged on a sheet of paper and, by receiving an ultrasonic wave transmitted from a pen by these ultrasonic wave receivers and from triangulation using the propagation time period of the ultrasonic wave, the coordinates are input. For example, Japanese Patent Application Laid-open (kokai) No. Hei8-36462 and Japanese Patent Application Laid-open (kokai) No. 2000-298547 disclose a technique in which two ultrasonic wave receivers constituting a receiver are arranged on a desk or support base and the length between a pen and the ultrasonic wave receiver is continuously measured from the propagation time period necessary for an ultrasonic wave to propagate to there ultrasonic wave receivers and, then, the coordinates of the pen against the desk is obtained using triangulation. In this case, an infrared ray and ultrasonic wave receiver is provided on the desk and an infrared ray from the pen is received by the infrared ray and ultrasonic wave receiver to make the temporal synchronization of the time when an ultrasonic wave was generated from the pen. However, when such a conventional technique employing triangulation is used, an area being a blind spot is created in a portion of the sheet of paper and the problems that inputting coordinates becomes impossible or the resolution becomes degraded consequently even if the input is possible occur. In addition, problems of larger size of the apparatus and increased cost occur.

SUMMARY OF THE INVENTION

Ultrasonic Length Measuring Apparatus and Method

The present invention provides an ultrasonic length measuring apparatus and method enabling an extremely high-precision length measurement with a relatively simple configuration.

According to a first aspect of the present invention there is provided an ultrasonic length measuring apparatus comprising a transmission unit for transmitting an ultrasonic wave; at least one receiving unit (ultrasonic sensor) for receiving an ultrasonic wave and converting it into an electric signal; a timing detection unit for measuring the number of times of the crossing of the waveform of the received ultrasonic wave signal from the receiving unit over a predetermined threshold value and for detecting a crossing timing after predetermined times from a crossing point of a first crossing; a time measuring unit for measuring the time period from the start of transmission of the ultrasonic wave by the transmission unit to the crossing timing detected; and a length measuring unit for calculating a length based on the time measured. As a result of inventors' active consideration, the resolution of the measurement of the arriving time using the received waveform of the ultrasonic wave depends on the inclination of the waveform crossing the threshold value and the resolution obtained becomes higher as the amplitude becomes larger because the inclination becomes steeper. That is, the dispersion of the timing for crossing the threshold value becomes smaller as the amplitude becomes larger. Therefore, the invention improves the measurement precision of the propagation time by detecting the crossing timing with a wave having a large amplitude that has a steep inclination of its waveform for crossing the threshold.

According to a second aspect of the present invention there is provided an ultrasonic length measuring apparatus comprising a transmission unit for transmitting an ultrasonic wave; at least one receiving unit for an ultrasonic wave and converting it into an electric signal; a timing detection unit for measuring the number of times of the crossing of the waveform of the received ultrasonic wave signal from the receiving unit over a predetermined threshold value and for detecting each crossing timing for predetermined times from the crossing point after predetermined times from the crossing point of first crossing; a time measuring unit for measuring the time period from the start of transmission of the ultrasonic wave by the transmission unit to the each crossing timing detected, and obtaining the arithmetic mean of each time measured; and a length measuring unit for calculating a length based on the time obtained as the arithmetic mean. In this case, it is possible to further improve the effective temporal resolution by obtaining the arithmetic mean of a plurality of the crossing timing when the inclination of the waveform crossing the threshold becomes steep.

The point of intersection after predetermined time periods herein means the point of intersection crossing the threshold at a vibration with which the amplitude of the received waveform of the ultrasonic wave becomes maximal or a point of intersection crossing the threshold at a vibration one vibration immediately before or after the above vibration. The amplitude of the wave which first crosses the threshold used in the conventional detection is approximately 20–50% of the maximal amplitude depending on the Q-value of the receiving system. Therefore, the temporal resolution can be improved by using the point of intersection crossing the vibration having the maximal amplitude and not the first point of intersection because an amplitude two (2) to five (5) times as large as the conventional amplitude can be used. The point of intersection after the predetermined times means a point of intersection crossing the threshold at the nth vibration of the received waveform of the ultrasonic wave or the point of intersection crossing the threshold at the $(n\pm1)$th vibration when the integer value of Q-value of the receiver unit (ultrasonic wave sensors) is n. For example, the Q-value of an ultrasonic wave sensor using a piezoelectric film such as PVDF is approximately 4. Then, in this case, the a crossing timing that corresponds to a point of intersection crossing the threshold at the (n=)fourth vibration of the received waveform of an ultrasonic wave or to a point of intersection crossing the threshold at the $(n\pm1=)$ third or fifth vibration is detected and the ultrasonic wave has the maximal amplitude and the amplitudes next to it in this timing, then, the resolution can be improved.

In the ultrasonic length measuring apparatus of the present invention in which a plurality of crossing timings are subjected to arithmetic mean, the timing detection unit measures the number of times of crossing of the waveform of the received ultrasonic wave received by the receiving unit, with the threshold value with the threshold value set on both of the polarities relative to the center of the vibration, and detects each crossing timing for a predetermined number of times from the crossing point of both of the polarities after predetermined times counting from the crossing point of the first crossing. In this case, the time measuring unit obtains the time by measuring and obtaining the arithmetic mean of each of the time from the start of transmitting the ultrasonic wave by the transmission unit to each detected crossing timing of both polarities. Thus, the temporal resolution can be further improved by increasing the number of crossing timings in the vicinity of the maximal amplitude that the arithmetic mean is obtained from. In the ultrasonic length measuring apparatus of the present invention in which a plurality of crossing timings are subjected to arithmetic mean, the timing detection unit measures the number of times of crossing at the rises and fall-downs of the waveform of the received ultrasonic wave received by the receiving unit, with a predetermined threshold, and detects each crossing timing for a predetermined number of times after a predetermined number of times counting from the crossing point of the first crossing. In this case, the time measuring unit obtains the time obtained by measuring each time period from the start of transmission of the ultrasonic wave to each crossing timing of the detected rises and fall-downs and obtaining the arithmetic mean thereof. Thus, the temporal resolution can be further improved by increasing the number of crossing timings in the vicinity of the maximal amplitude that the arithmetic mean is obtained from. The transmission unit comprises a transmission notifying unit which issues beams or electromagnetic waves in synchronism with the start of transmission of ultrasonic waves, and the time measuring unit receives a beam or electromagnetic wave from the transmission notifying unit and detects a transmission starting timing of the ultrasonic wave. In the ultrasonic length measuring apparatus of the present invention, the apparatus comprises at least two (2) systems of the receiving unit, the timing detection unit, the time measuring unit and the length measuring unit, and further comprises a coordinate measuring unit for calculating the position of the transmission unit as two (2)-dimensional coordinates based on two (2) lengths obtained by each of the length measuring unit. Therefore, a very high length resolution can be achieved with a simple circuit even when the mounting spacing of ultrasonic wave sensors are very small comparing to the length to be measured as in a case where a coordinate of a position is measured from two lengths measured by receiving an ultrasonic wave from an ultrasonic wave transmission unit attached to a pen etc. using two ultrasonic wave sensors fixedly mounted and the move of the pen accompanying the writing down of characters on a sheet of paper is input into an information processing apparatus.

According to a third aspect of the present invention there is provided an ultrasonic length measuring method comprising a transmission step transmitting an ultrasonic wave; a receiving step receiving an ultrasonic wave by use of at least one receiving unit and converting the ultrasonic wave into an electric signal; a timing detection step measuring the number of times of the crossing of the waveform of the received ultrasonic wave signal over a predetermined threshold value and detecting a crossing timing after predetermined times from a crossing point of a first crossing; a time measuring step measuring the time period from the start of transmission of the ultrasonic wave to the crossing timing detected; and a length measuring step calculating a length based on the time measured.

According to a fourth aspect of the present invention there is provided an ultrasonic length measuring method comprising a transmission step transmitting an ultrasonic wave; a receiving step receiving an ultrasonic wave by use of at least one receiving unit and converting the ultrasonic wave into an electric signal; a timing detection step measuring the number of times of the crossing of the waveform of the received ultrasonic wave signal over a predetermined threshold value and for detecting each crossing timing for predetermined times from the crossing point after predetermined times from the crossing point of first crossing; a time measuring step measuring the time period from the start of transmission of the ultrasonic wave to the each crossing timing detected, and obtaining the arithmetic mean of each time measured; and a length measuring step calculating a length based on the time obtained as the arithmetic mean. This ultrasonic length measuring method further comprises a coordinate measurement step for calculating a transmission position as a two (2)-dimensional coordinate based on the two lengths obtained in the timing detection step, the time measurement step and the length measurement step for the waveform of the received ultrasonic wave received by at least two (2) systems of the receiving unit. The other features of the ultrasonic length measuring method are essentially the same as those of the ultrasonic length measuring apparatus.

Coordinate Inputting Apparatus

The present invention provides a coordinate inputting apparatus of ultrasonic-wave-utilization-type having decreased area that becomes a blind spot and excellent usability and portability.

According to a fifth aspect of the present invention there is provided a coordinate inputting apparatus comprising a pen transmitting an ultrasonic wave; and a receiver for receiving the ultrasonic wave transmitted from the pen by at least a pair of ultrasonic wave receivers and for inputting a coordinate position of the pen based on the propagation time periods of the ultrasonic wave received respectively by each of the ultrasonic wave receivers; wherein the receiver includes a plurality of ultrasonic wave receivers for receiving the ultrasonic wave transmitted from the pen; and a clip mechanism for pinching a corner of a predetermined sheet. According to the invention, because the receiver can be arranged and fixed at a corner of the sheet of paper, the whole area of the sheet can be covered if the receiver has a directivity of ±45 degrees. Therefore, no blind spot is created, it is possible to make the configuration of the coordinate inputting apparatus smaller and the apparatus has a good usability and portability. As a result, the apparatus can be utilized as a portable apparatus.

In addition, the coordinate inputting apparatus of the invention is characterized in that its clip mechanism is fixed to a plate-shaped board mounted with a sheet of paper for writing down with a dedicated pen. According to this, the receiver has been arranged and fixed in advance at a corner of the board by the clip mechanism and, therefore, it is possible to cover the whole area of the sheet when the receiver has a directivity of ±45 degrees. As a result, no blind spot is created and the usability and portability of the writing implement are excellent because the board mounted with the sheet acts as a support for writing and the apparatus can be utilized as a portable apparatus.

Furthermore, the coordinate inputting apparatus of the invention comprises a pen having an infrared ray transmission unit for transmitting infrared ray pulses and the receiver is characterized in that it further comprises an infrared ray receiver for receiving the infrared ray pulses transmitted from an infrared ray transmitter as a synchronized signal. According to the above, it is possible to transmit a synchronized signal of infrared ray pulses to the receiver without connecting it by a wire. Furthermore, the coordinate inputting apparatus is characterized in that the sheet of paper is fixed at a position where the angle between a straight line connecting a plurality of the ultrasonic wave receivers and the upper edge of the sheet of a paper ranges from 30 to 60 degrees. Therefore, the apparent spacing between the ultrasonic wave receivers from the pen can be prevented from being small and the problem of degradation of the resolution can be avoided because the position to fix the receiver is arranged such that the angle between a straight line connecting a plurality of the ultrasonic wave receivers and the upper edge of the sheet of a paper ranges from 30 to 60 degrees.

The coordinate inputting apparatus of the invention is characterized in that a flexible edge portion set at an angle of approximately 90 degrees is formed by pressing a corner of the sheet to the pinching face against any of the sheet of the clip mechanism. Therefore, the arrangement angle of the receiver to the sheet is automatically arranged at a inclined position at 45 degrees with which the strongest directivity is obtained by inserting the sheet along the edge portion.

According to the invention, a highly reliable coordinate inputting apparatus is provided that can be prevented from malfunctioning caused by a collision sound created by the dedicated pen and the sheet. Therefore, the coordinate inputting apparatus of the invention has a configuration in which a synchronized signal and a length measurement signal each having a propagation velocity different from that of the other are transmitted intermittently from the mover such as a dedicated pen, the propagation length to the different fixed positions of the length measurement signals is calculated from the difference of receiving timings and the position of the mover is calculated from the calculated propagation lengths and, in addition, the starting timing of transmission of the intermittent length measurement signal is delayed for a predetermined time period. According to the above configuration, the collision sound created when the mover and contact plane are contacted to each other and this length measurement signal can be definitely distinguished even in the case where a sound wave such as an ultrasonic wave is used as the length measurement signal. That is, the collision sound is created and propagated without any temporal delay when the mover and the contact plane are contacted to each other but, in contrast, the length measurement signal is propagated after it has been delayed for a predetermined time period. Therefore, by eliminating the sound waves received at an unnaturally early timing from the applicable signals to position detection calculation, the situation can be prevented in which an incorrect position detection is conducted by applying the above collision sound mistakenly judged as a length measurement signal to the length detection calculation.

The above and other objects, aspects, features and advantages of the present invention will become more apparent from the following detailed description when taken in conjunction with the accompanying drawings.

BRIEF DESCRIPTION OF THE DRAWINGS

FIGS. 7A and 7B illustrate a block diagram of the receiver shown in FIG. 5;

FIGS. 8A to 8D illustrate time-charts of a signal waveform in the operation of the receiver shown in FIGS. 7A and 7B;

FIGS. 19A to 19C illustrate the configuration of the receiver;

FIGS. 42A and 42B illustrate time-chart of a pen-ON signal and a pen-OFF signal;

FIG. 43 illustrates a flow-chart of the process operation on the receiving side constituting the fourth embodiment of the invention.

DETAILED DESCRIPTION OF THE PREFERRED EMBODIMENT

The inventors already proposed a method in which an arriving time is detected with a high precision by setting threshold values in both polarities of the symmetric detected waveform of the ultrasonic wave (Japanese Patent Application No. 2001-213565).

In this method, ultrasonic wave sensors (receiver) use a piezoelectric film, for example, as PVDF. These ultrasonic wave sensors have lower sensitivity compared to the ultrasonic wave sensors made from common piezoelectric ceramic but have a characteristic that the rise time when receiving ultrasonic waves is sharp due to their small Q-values.

Figure 1:
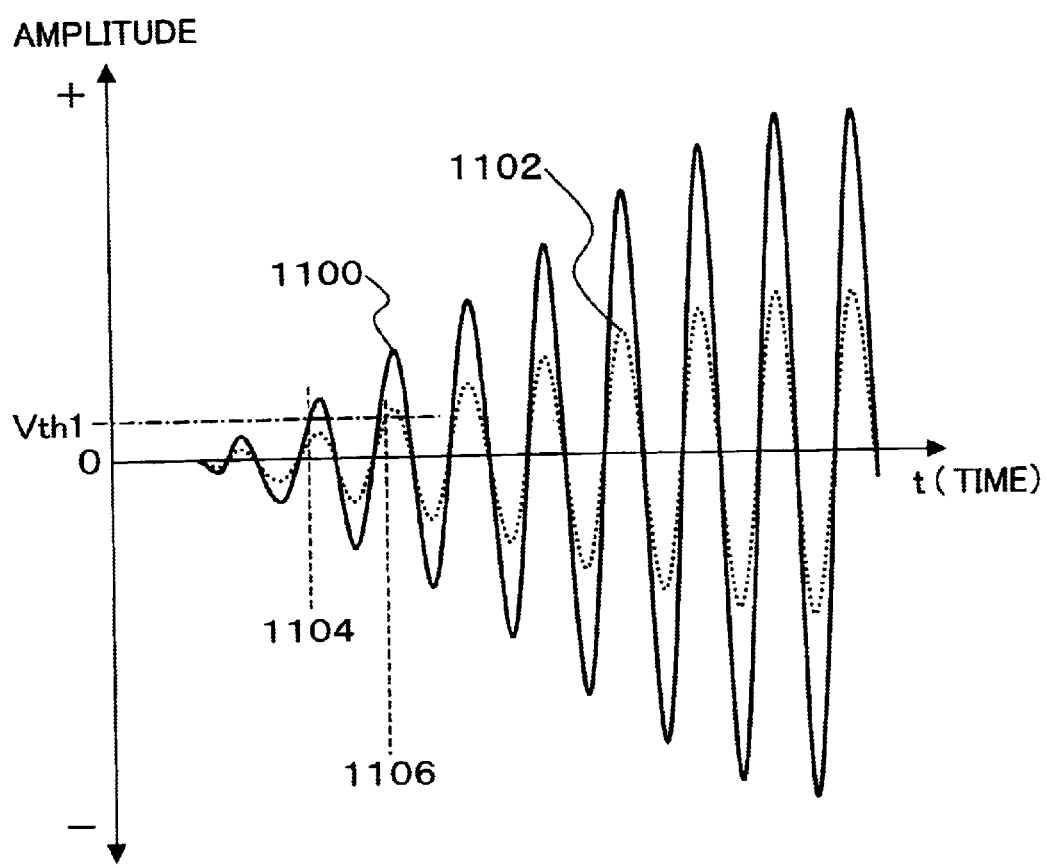
FIG. 1 illustrates the conventional waveform of an ultrasonic wave that attenuates in response to length.
Figure 2:
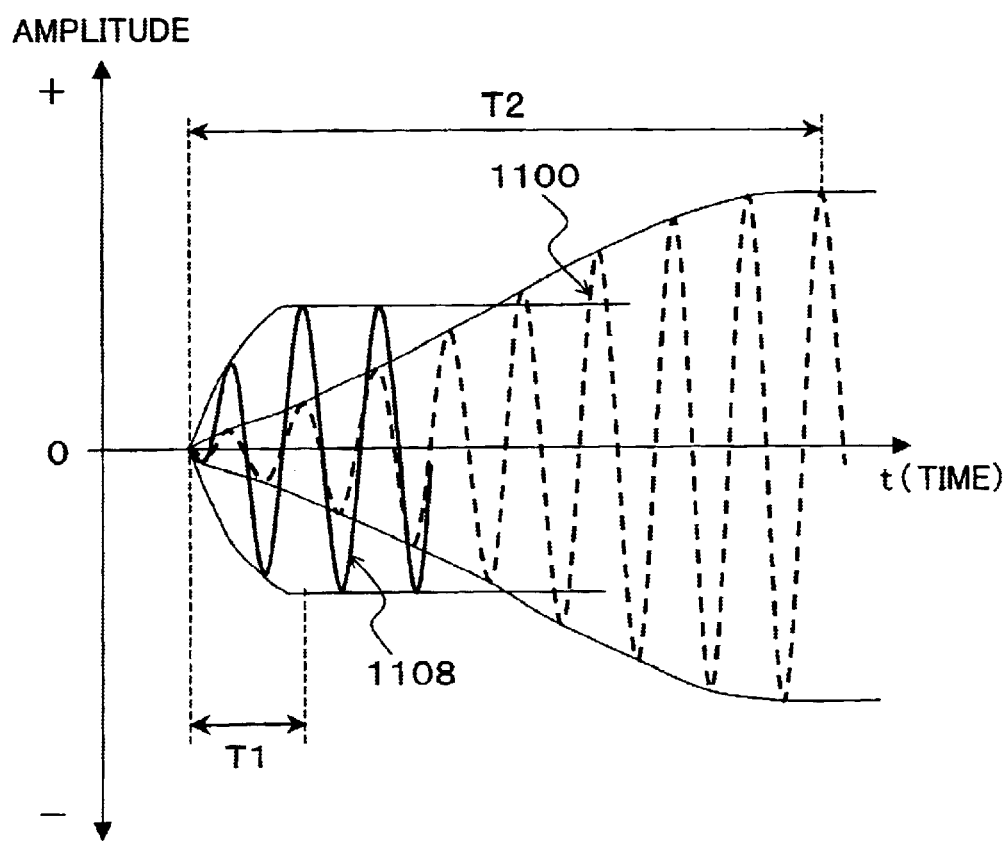
FIG. 2 illustrates the variation in the rise of the waveforms of ultrasonic wave generated by an ultrasonic wave sensor made from ceramic and an ultrasonic wave sensor made from a piezoelectric film.
Figure 3:
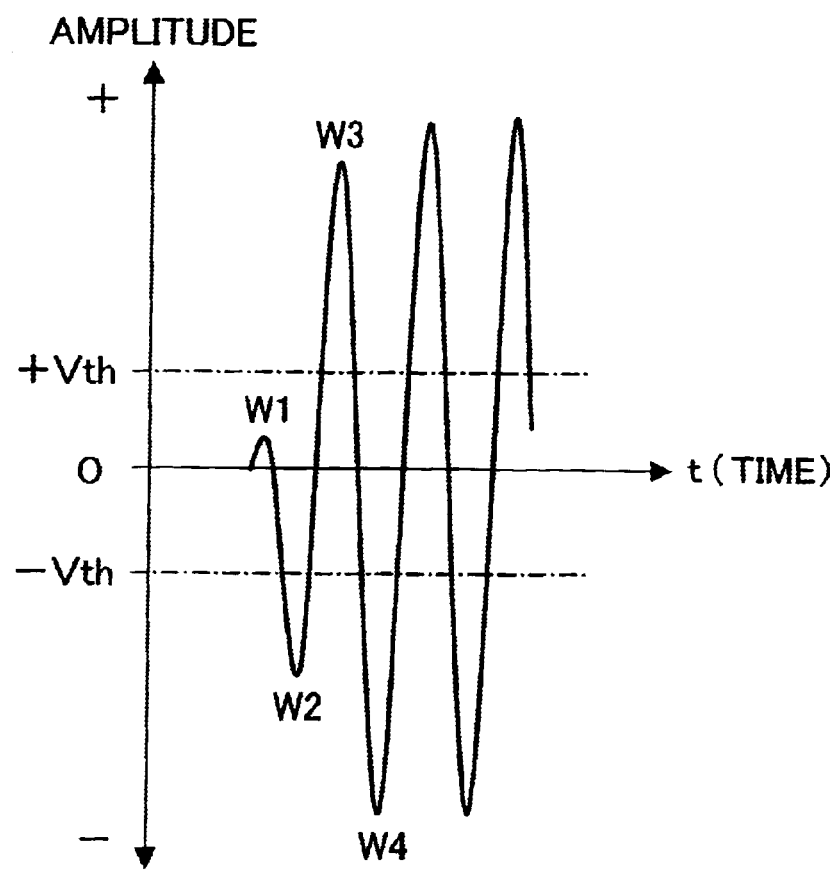
FIG. 3 illustrates a method which was already proposed by the inventors for switching threshold values used for the timing detection in response to length by setting threshold values in both polarities.
Figure 4:
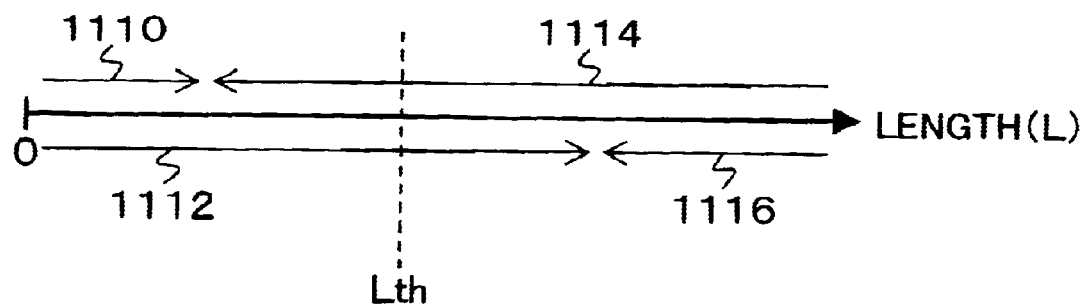
FIG. 4 illustrates a threshold value switching in response to length corresponding to the waveform shown in FIG. 3.

FIG. 2 shows comparing a waveform 1100 of an ultrasonic wave obtained by an ultrasonic wave sensor made from piezoelectric ceramic to a waveform 1108 of an ultrasonic wave obtained by an ultrasonic wave sensor made from a piezoelectric film such as PVDF. In FIG. 2, a time T1 which the waveform 1108 of an ultrasonic wave obtained by a piezoelectric film needs to arrive at the peak amplitude is an extremely short time compared to a time T2 which the waveform 1100 of an ultrasonic wave obtained by piezoelectric ceramic. Therefore, even in the case where the amplitude of the waveform is varied by the attenuation caused by length, the opportunities to mistake the wave crossing the threshold value is considerably decreased. Furthermore, in order to eradicate the error, threshold values $+V_{th}$ and $-V_{th}$ are provided on both of the positive and the negative side of the center of vibration as shown in FIG. 3 and each of them is used separately for the receiving timing detection. Denoting the first wave as W1, the second wave as W2, the third wave as W2 and so on counting from the start of vibration irrespective of polarity, a wave crossing the threshold value on the positive side $+V_{th}$, for example, is the first wave W1 when the length is short and it is the third wave W3 as shown in the figure when the length becomes longer and the amplitude becomes attenuated. Because a piezoelectric film sensor has a low Q-value and the difference of the amplitudes between adjacent waves is large, the wave to be crossed can be known to some extent when the length is known and timing detection can not be mistaken. Certainly, the length for the waves to be switched has a width because of the influence of noise. In addition, because the inclination of the point where the waveform crosses the threshold value becomes mild, the resolution extremely becomes degraded immediately before the wave switches. Therefore, the measurement can be conducted with a high precision over the whole range of length by using the more stable timing among the timings obtained at the positive and the negative thresholds $+V_{th}$ and $-V_{th}$. Therefore, as shown in FIG. 4, as the range of a wave crossing the threshold value in response to a length L, a first wave crossing range 1110 and a third wave crossing range 1114 are provided on the side of the positive threshold value $+V_{th}$ and a second wave crossing range 1112 and a fourth wave crossing range 1116 are provided on the side of the negative threshold value $-V_{th}$. Then, for example, by providing a threshold value switching length $L_{th}$ in the middle of the overlapping area of the second wave crossing range 1112 and the third wave crossing range 1114, it is good to obtain the crossing timing from the threshold value $-V_{th}$ on the negative side and the second wave crossing range 1112 created by the second wave W2 for the length shorter than the threshold value switching length $L_{th}$ and to obtain the crossing timing from the threshold value $+V_{th}$ on the positive side and the third wave crossing range 1114 created by the third wave W3 for the length longer than the threshold value switching length $L_{th}$. According to this method, a much higher resolution can be obtained than the one obtained in the method utilizing the envelope. However, because the crossing timing is obtained using a wave close to the start of vibration of a waveform of an ultrasonic wave that has the amplitude becoming gradually larger, a sufficient resolution can not be obtained for the uses in which the length to be measured is several ten cm or less, requiring a very high resolution.

Figure 5:
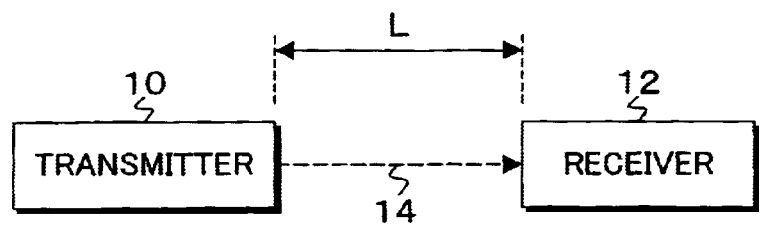
FIG. 5 illustrates the basic configuration of the invention.

FIG. 5 illustrates the basic configuration of an ultrasonic length measuring apparatus according to the invention. The ultrasonic length measuring apparatus of the invention comprises a transmitter 10 and a receiver 12. An ultrasonic wave is transmitted from the transmitter 10 and is received by the receiver 12 and the length L between the transmitter 10 and the receiver 12 is measured based on the propagation time of the ultrasonic wave.

Figure 6:
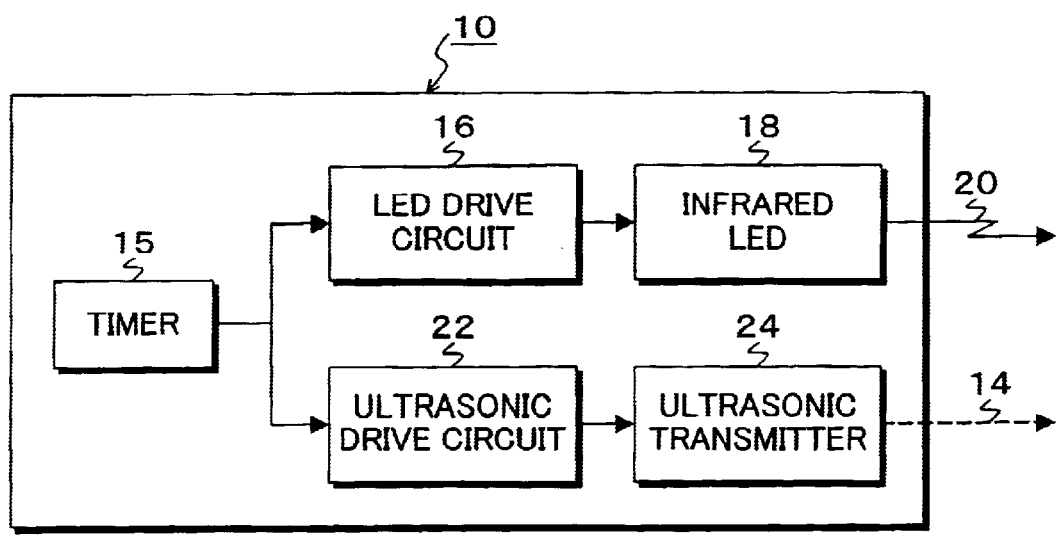
FIG. 6 illustrates a block diagram of the transmitter shown in FIG. 5.

FIG. 6 illustrates a block diagram showing the details of the transmitter 10 shown in FIG. 5. The transmitter 10 comprises a timer 15, an LED drive circuit 16, an infrared LED 18, an ultrasonic wave drive circuit 22 and an ultrasonic wave transmitter 24. The timer 15 outputs a timer signal at a predetermined time interval operating the LED drive circuit 16 and the ultrasonic wave drive circuit 22 at the predetermined time interval. Therefore, an ultrasonic wave is transmitted from the ultrasonic wave transmitter 24 as soon as an infrared ray pulse 20 is transmitted from the infrared LED 18. The infrared ray pulse 20 from the infrared LED 18 is used to notify the receiver 12 of the transmission time of the ultrasonic wave. Therefore, if a signal arrives at the receiver 12 in a moment immediately after it has been transmitted, other means than an infrared ray, for example, a radio wave can be transmitted as the signal. Furthermore, if it is possible to connect the transmitter 10 and the receiver 12 through a wire, it is possible to arrange such that the transmission of the ultrasonic wave is notified by an electric signal through the wire.

Figure 7A:
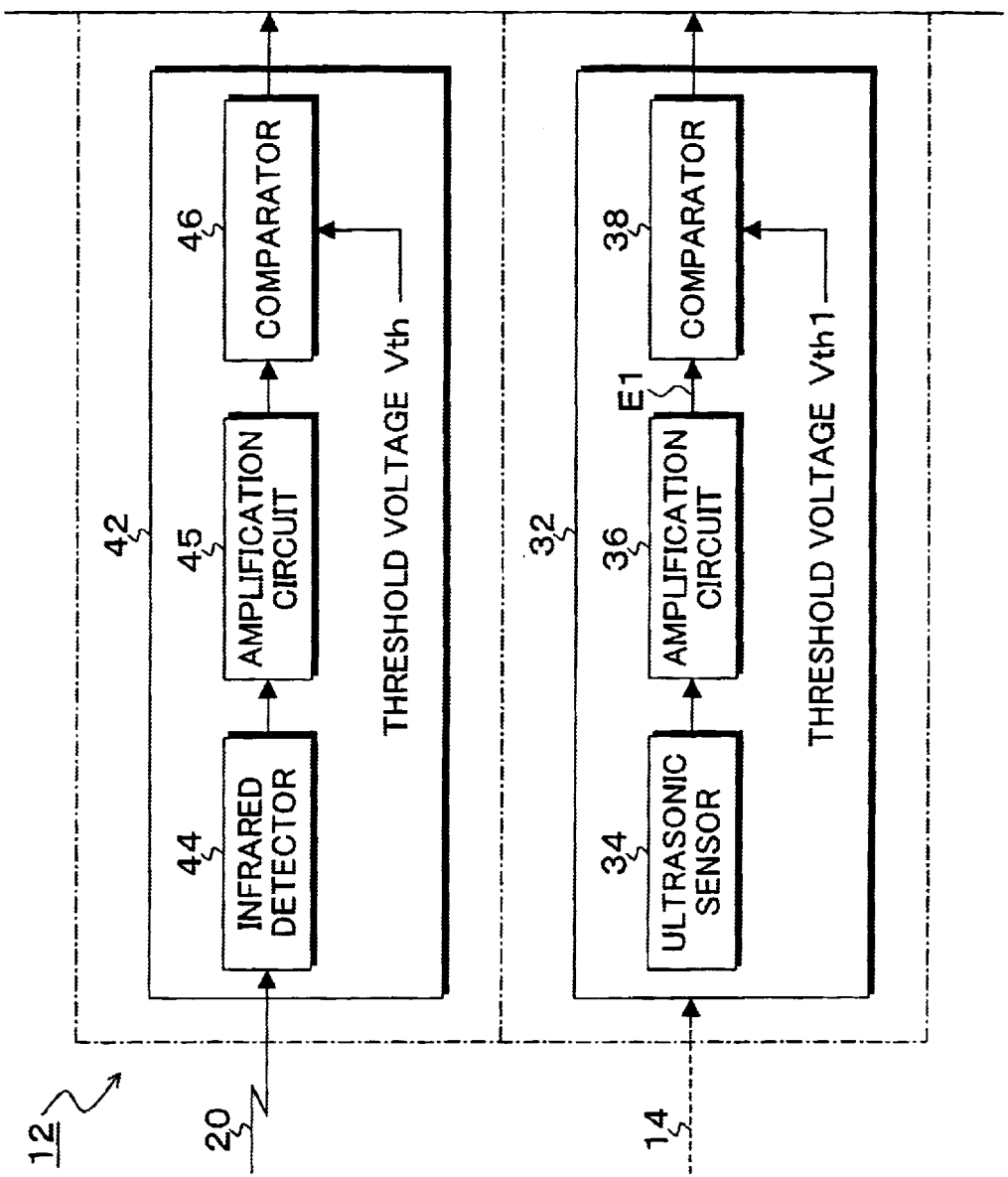

FIGS. 7A and 7B are block diagrams showing the details of the receiver 12 in FIG. 5 and, in this receiver 12, an ultrasonic length measurement processing according to the invention is conducted. The receiver 12 comprises a timing detection unit 26 for detecting the receiving timing, time measuring unit 28 for measuring the time from a transmission of an ultrasonic wave to a receiving timing and a micro-controller 30 for measuring a length based on the measured time. The timing detection unit 26 is provided with an ultrasonic wave detection unit 32. The ultrasonic wave detection unit 32 comprises an ultrasonic wave sensor 34, an amplification circuit 36 and a comparator 38 set with a threshold voltage $V_{th1}$. An ultrasonic wave sensor using a piezoelectric film such as PVDF is used as the ultrasonic wave sensor and the Q-value of a receiving instrument constituted by this ultrasonic wave sensor 34 using a piezoelectric film is approximately 4. An ultrasonic wave received by the ultrasonic wave sensor 34 is converted into an electric signal, amplified in the amplification circuit 36 and outputs to the comparator 36 a waveform of an ultrasonic wave as shown in FIG. 8A as a received signal E1 of an ultrasonic wave. The comparator 38 is preset with an threshold voltage $V_{th1}$ at a predetermined level on the positive side as shown in FIG. 8 and outputs to a pulse selection logic circuit 40 a pulse signal E2 of FIG. 8B corresponding to the timing when a waveform of an ultrasonic wave 55 crosses the threshold voltage $V_{th1}$. In this embodiment, the pulse selection logic circuit 40 outputs a crossing timing signal E3 as shown in FIG. 8C at a timing of crossing point P3 of the rise of the third wave W3 on the positive side in the waveform of the ultrasonic wave, with the threshold voltage $V_{th1}$ in the waveform of the ultrasonic wave shown in FIG. 8A. The time measurement unit 28 comprises an infrared ray detection unit 42. The infrared ray detection unit 42 is provided with an infrared ray detector 44, amplification circuit 45, a comparator 46 set with an threshold voltage $V_{th}$. The infrared ray detector 44 receives the infrared ray pulse 20 from the receiver 10 shown in FIG. 6 and converts the received pulse 20 into an electric signal. After the converted electric signal is amplified in the amplification circuit 45, the comparator 46 outputs to a counter 48 a count reset signal E4 shown in FIG. 8D at the timing when exceeding the threshold voltage $V_{th}$. The count reset signal E4 from the comparator 46 is a timing signal indicating the start of transmission of an ultrasonic wave. The counter 48 is reset when it has received the counter reset signal E4, i.e., is reset at the timing of the ultrasonic wave transmission, and starts counting of clocks from a clock source 49. The output of the counter 48 is provided to a latch 50. The latch 50 latches the value of the counter 48 when it receives the crossing timing signal E3 from the pulse selection logic circuit 40. Therefore, the propagation time of the ultrasonic wave from the start of the ultrasonic wave transmission by the count reset signal E4 to the crossing timing signal E3 output at the pulse selection logic circuit 40 is latched at the latch 50 and is output to the micro-controller 30. The micro-controller 30 is provided with a function as a length measurement unit 52 and measures the length between the transmitter 10 and the receiver 12 by multiplying the ultrasonic wave propagation time retained in the latch 50 by the sonic velocity.

Next, The operation of the receiver 12 shown in FIGS. 7A and 7B will be described. When the infrared ray pulse 20 and the ultrasonic wave 14 are transmitted from the transmitter 10 shown in FIG. 6, in the receiver 12 shown in FIGS. 7A and 7B, the infrared ray pulse 20 is first received and detected by the infrared ray detector 44. The received infrared ray signal is amplified in the amplification circuit 45, is converted into pulses in the comparator 46 and resets the counter 48 as the count reset signal E4. Because the counter 48 always keeps counting the pulses of the clock source 49, the counter 48 newly starts counting after it has been reset by the count reset signal E4. On the other hand, the ultrasonic wave received following the infrared ray pulse is processed in the ultrasonic wave detection unit 32. That is, the ultrasonic wave is received and converted into an electric signal by the ultrasonic wave sensor 34 and amplified by the amplification circuit 36. Then, the amplified signal is output as the pulse signal E2 constituted by a series of pulses shown in FIG. 8B by comparison with the threshold voltage Vth1 at the comparator 38. The pulse signal E2 from the comparator 38 is provided to the pulse selection logic circuit 40 and only one of the pulses is extracted such that the threshold crossing timing in vicinity of the maximal amplitude of the waveform of the ultrasonic wave. In the embodiment shown in FIGS. 7A and 7B, The maximal amplitude of the waveform of the ultrasonic wave in FIG. 8A is the fourth wave W4. However, the crossing timing signal E3 is output at the timing of the crossing point P3 of the rise of the third wave W3 that is one wave prior to the fourth wave W4. During this operation, the counter 48 continues a counting operation and the output of the counter 48 is provided to the latch circuit 50. When the crossing timing signal E3 selected in the pulse selection logic circuit 40 is input to the latch circuit 50, the count data of the counter 48 at that timing is retained. In the micro-controller 30, as shown in FIG. 8A, because it is previously known that the crossing timing signal E3 conducting the time measurement has a temporal shift corresponding to, in this case, λ=2.5 wavelength, using this shift as an offset time $T_{ofs}$, after correcting a time T1 detected from the crossing timing signal E3, a calculation for converting the corrected time T1 by multiplying by the sonic velocity is conducted in the length measurement unit 52.

Figure 9:
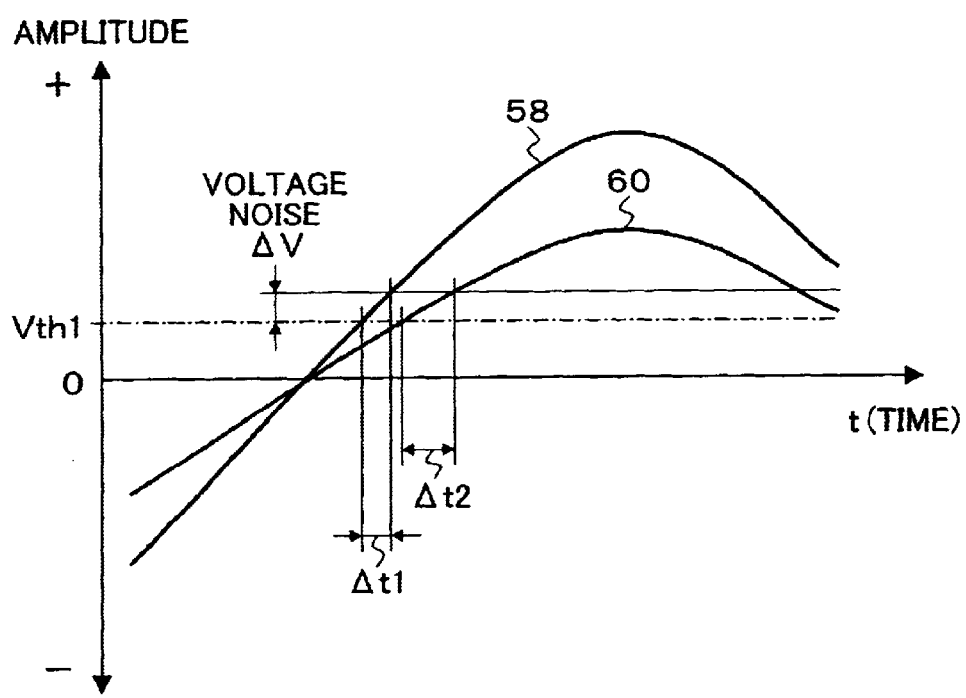
FIG. 9 illustrates the dispersion of the inclinations and timings of a waveform against the amplitude.

Next, the principle for detecting the crossing timing for the time measurement for the waveform of an ultrasonic wave by the pulse selection logic circuit 40 provided to the receiver 12 shown in FIGS. 7A and 7B will be described. The resolution of the measurement of the propagation time based on the detection of the threshold value crossing timing of the waveform of an received ultrasonic wave is depends on the inclination of the waveform of the ultrasonic wave crossing the threshold $V_{th1}$ as shown in FIG. 9. FIG. 9 shows an waveform of an ultrasonic wave 58 having a large amplitude together with a waveform of an ultrasonic wave 60 having a amplitude reduced by an attenuation. Assuming that a variations occur depending on the voltage noise at the threshold crossing timing due to the presence of a voltage noise ΔV on, for example, positive side of the threshold voltage Vth1 for the waveforms of the ultrasonic waves 58 and 60. The dispersion of the timing for the voltage noise ΔV of the waveform of the ultrasonic wave 58 having a large amplitude is Δt1 and, on the other hand, the dispersion of the timing for the voltage noise ΔV of the waveform of the ultrasonic wave 60 having the reduced amplitude is larger being Δt2. Therefore, the resolution of the propagation time measurement based on the crossing timing of the waveform of the ultrasonic wave with the threshold voltage $V_{th1}$ depends on the inclination of the waveform of the ultrasonic wave crossing the threshold voltage $V_{th1}$. Because the inclination of the threshold crossing point becomes steeper as the amplitude becomes larger like the waveform of the ultrasonic wave 58, a higher temporal resolution can be obtained.

Figures 10A, 10B:
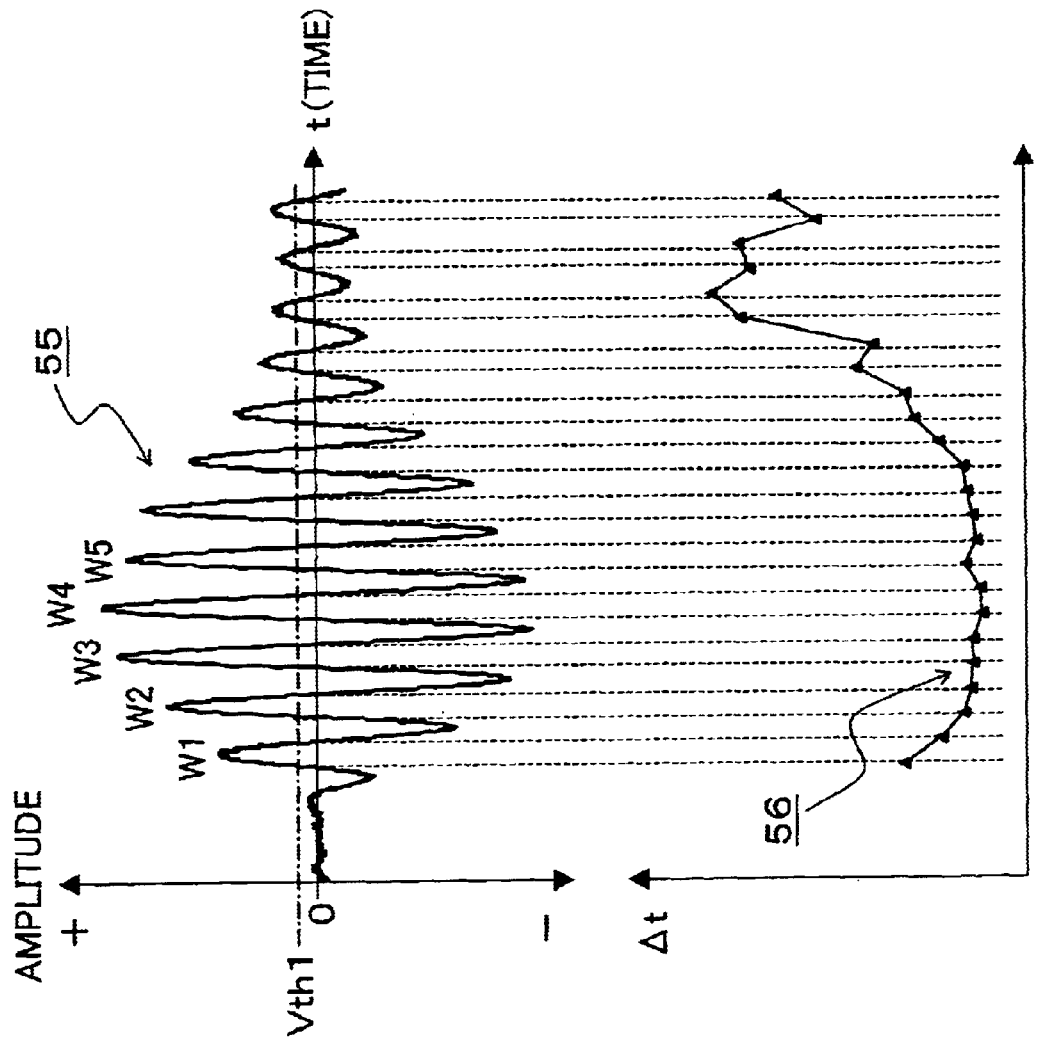
FIGS. 10A and 10B illustrate the relation of correspondence of the dispersion of crossing timings of the waveform against the waveform of an ultrasonic wave and the threshold value in the invention.

FIG. 10A extracts the waveform of the ultrasonic wave 55 that is received and detected by the ultrasonic wave detection unit 32 using an ultrasonic sensor 34 made from a piezoelectric film shown in FIGS. 7A and 7B. FIG. 10B shows the characteristics 56 of the dispersion Δt of crossing timings of the waveform against the threshold. As shown in FIG. 10A, the waveform of the ultrasonic wave 55 is constituted of a plurality of vibration, i.e., waves and the waveform crosses the threshold voltage $V_{th1}$ many times, however, the amplitude of the waveform of the ultrasonic wave 55 becomes gradually large. Approximating the waveform of the ultrasonic wave 55 as V(t) using a sine curve, it is obtained as the following equation where its amplitude is V and the frequency of the ultrasonic wave is f.

$$v(t) = V \sin(2\pi f t)$$

Representing the phase of a crossing point as t1, the inclination dv/dt in the vicinity of the phase of the crossing point t1 is obtained as follows.

$$dv/dt = 2\pi f V \cos(2\pi f t_1)$$

Therefore, it is seen that, as the amplitude V becomes larger, i.e., the inclination at the crossing point becomes steeper, the dispersion Δt of the timing for crossing the threshold value becomes gradually smaller as the characteristic 56 shown in FIG. 10B. Assuming that the threshold voltage $V_{th1}$ is sufficiently small comparing to the amplitude, the inclination in the vicinity of the crossing point is in inverse proportion to the amplitude because the phase of the crossing point approaches closely to zero. In addition, the threshold voltage $V_{th1}$ is usually set as low as possible such that it can be detected even in the case where the ultrasonic wave is attenuated due to a long length. Thus, it is understood that the threshold crossing timing at which the amplitude of the waveform of the received ultrasonic wave becomes maximal should be detected in order to improve the resolution of the ultrasonic wave propagation time. In the case of the waveform of the ultrasonic wave 55 shown in FIG. 10A, it is the fourth wave W4 being the fourth vibration having has the maximal amplitude and the minimal dispersion as shown in FIG. 10B. Therefore, as to the pulse selection logic circuit 40 shown in FIG. 8, basically, it is preferable to arrange the logic circuit 40 such that a fourth pulse in the pulse signal E2 output from the comparator 38 is extracted and output as a crossing timing signal E4. In this case, the fourth wave W4 having the maximal amplitude does not alone have the minimal dispersion of crossing timings and the third wave W3 and the fifth wave W5 respectively immediately before and after the fourth wave W4 also have amplitudes sufficiently close to the maximal amplitude and have sufficiently small dispersion. Thus, as to the pulse selection logic circuit 40 shown in FIGS. 7A and 7B, it is possible to arrange the logic circuit 40 such that the logic circuit 40 extracts the pulse signal of the third wave W3 or the pulse signal of the fifth wave W5 instead of extracting the signal of the fourth wave W4 having the maximal amplitude. Therefore, as to the pulse selection logic circuit 40 in the embodiment shown in FIGS. 7A and 7B, a pulse signal corresponding to the third wave W3 that is one wavelength before the fourth wave W4 having the maximal amplitude is extracted as a crossing timing signal E4. In this way, it is preferable to receive previously the waveform of an ultrasonic wave at the design stage of the apparatus, to check which of threshold crossing points on the waveform of the ultrasonic wave corresponds to the crossing point with the maximal amplitude and to arrange the pulse selection logic circuit 40 shown in FIGS. 7A and 7B such that the logic circuit 40 selects the pulse signal corresponding to, for example, the third wave W3 based on the result of the check. In addition, because a waveform of an ultrasonic wave is attenuated analogously maintaining its shape even when it is attenuated, the vibration having the maximal amplitude does not differ from the vibration previously checked. On the other hand, the number of vibrations until the waveform of the ultrasonic wave 55 shown in FIG. 10A reaches the maximal amplitude approximately equals the Q-value at the ultrasonic wave receiving instrument. For example, because the Q-value is approximately 4 in the receiving system using a piezoelectric film for the ultrasonic sensor 34 shown in FIGS. 7A and 7B, the fourth vibration has the maximal amplitude as shown in FIG. 10A. Therefore, it is possible to set the number of crossings n for outputting the crossing timing signal based on the Q-value of the ultrasonic wave receiving instrument. That is, when the pulse selection logic circuit 40 shown in FIGS. 7A and 7B is arranged to extract the n=Qth or N=Q±1th wave, obtaining the number of crossings n for selecting a crossing timing signal gives the same result as in the case of extracting the pulse corresponding to the maximal amplitude or that pulse ±one (1) pulse.

Figures 11A, 11B:
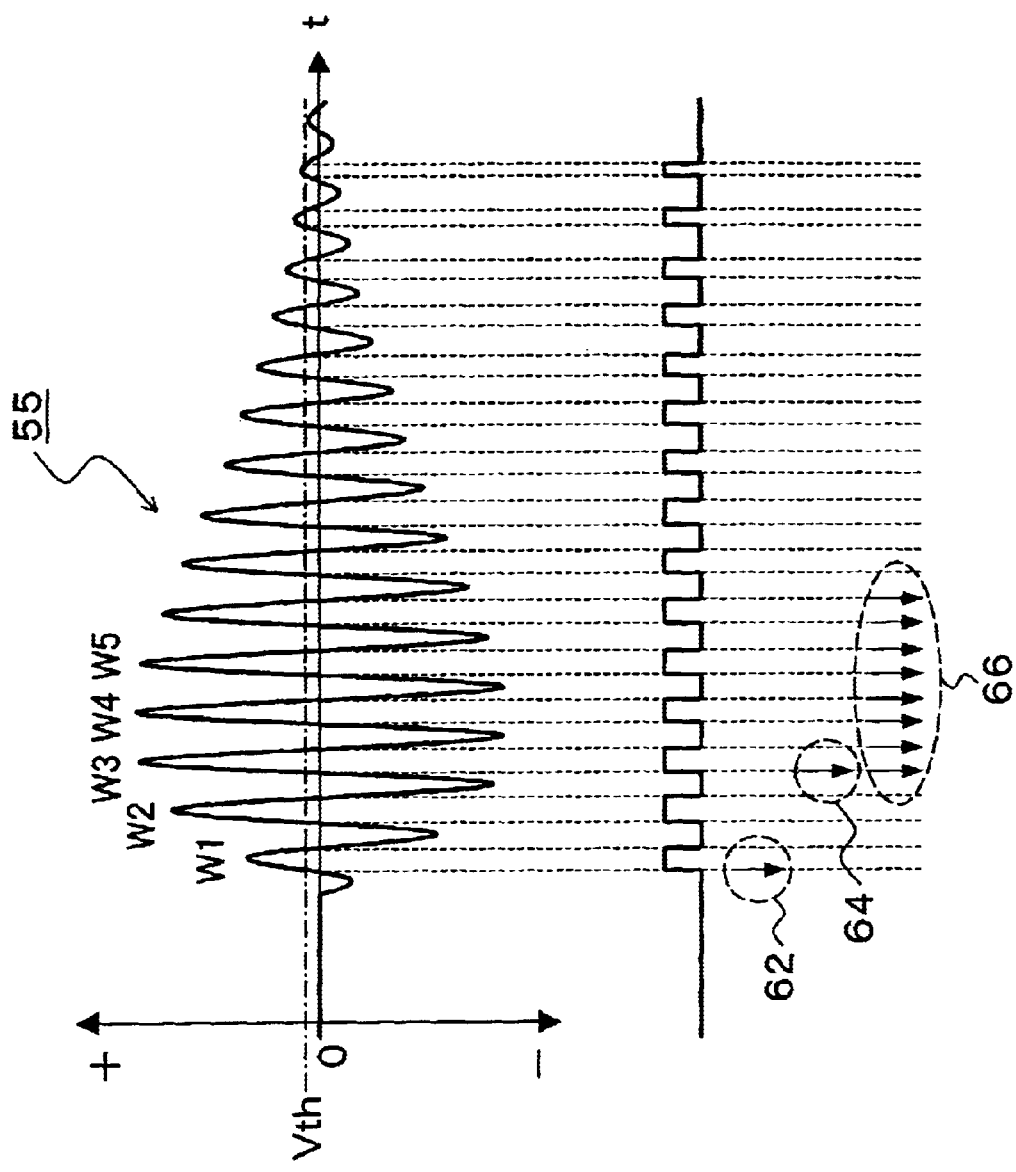
FIG. 11 illustrates the comparison of the crossing timings for the propagation time measurement of the invention with the conventional crossing timing.

FIG. 11A shows comparing the case of detecting a conventional timing 62 crossing first and the case of detecting at the timing 64 of the rise of the third wave W3 in the embodiment shown in FIGS. 7A and 7B in terms of the pulse signal E2 output from the comparator 38 having a threshold voltage set at $V_{th1}$ against the waveform of the ultrasonic wave 55 received and detected according to the invention. Timings 66 detected consecutively from the third wave W3 will be described later. Conventionally, the amplitude of the timing 62 crossing first that is used for detecting is approximately 20–50% of the maximal amplitude depending on the Q-value of the receiving and detecting instrument. Therefore, when not using the timing 62 of the first crossing point but using the crossing point with the vibration having the maximal amplitude, the resolution in the propagation time measurement can be improved because an amplitude two (2) to five (5) times as large as the conventional amplitude is used. In the embodiment shown in FIGS. 7A and 7B, the propagation time is measured with the timing 64 of the third wave W3. When the propagation time is obtained at the timing 64 of the crossing point of the third wave W3, compared to the case where it is obtained at the timing 62 of the first crossing point, the dispersion of the crossing timings is reduced to one third (⅓) and the resolution of the propagation time measurement can be improved to that extent. It seems to be possible to set the threshold value to first cross the vibration having the maximal amplitude applying a circuit such as a peak-hold circuit to the waveform of the ultrasonic wave 55. However, because the crossing phase becomes larger as the threshold value is raised higher, the inclination of the waveform becomes mild and the dispersion can not be reduced. Therefore, the above approach is not appropriate.

Figure 12:
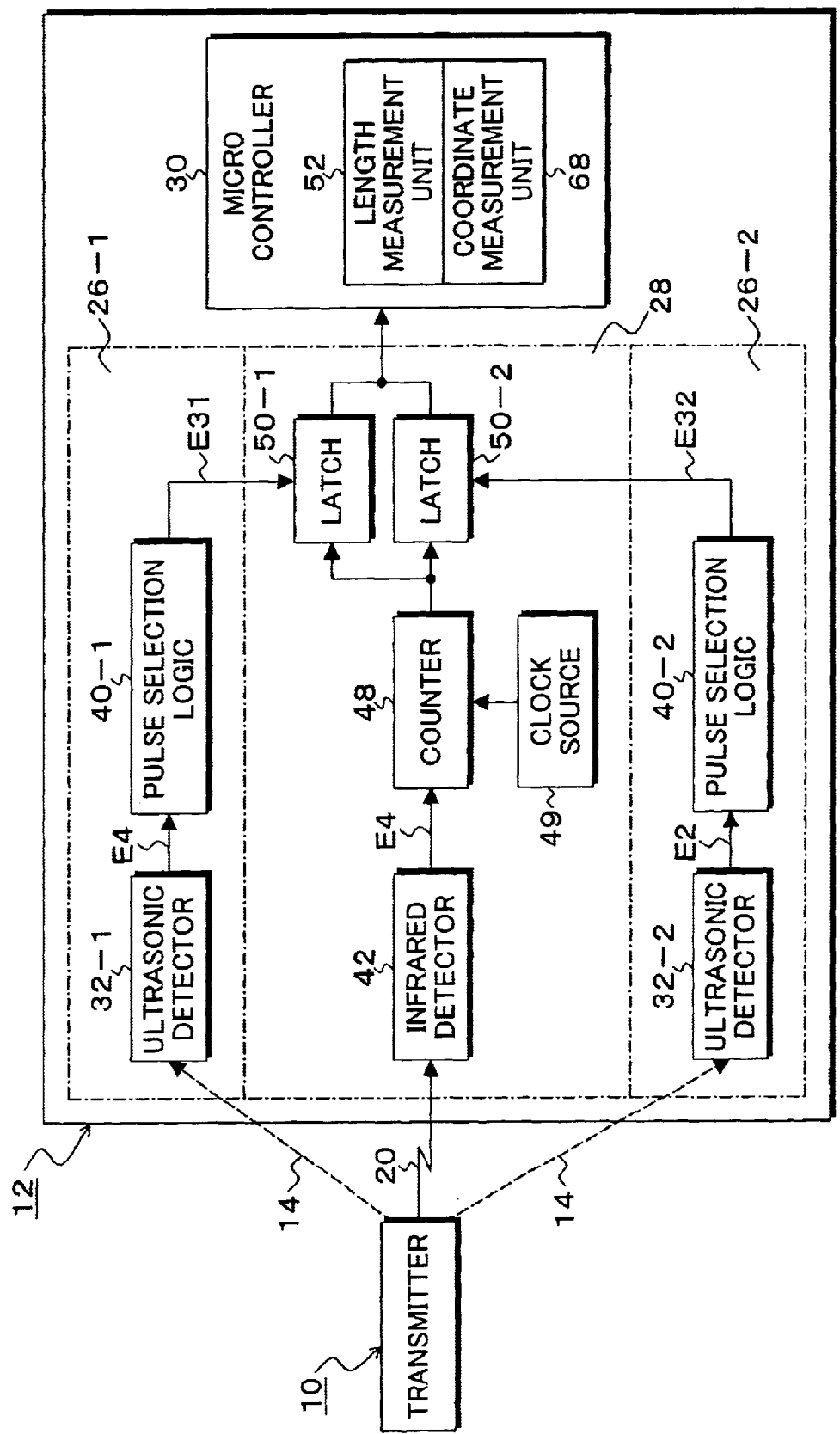
FIG. 12 illustrates a block diagram of an embodiment of a receiver comprising two (2) systems of receiving systems for measuring the two(2)-dimensional coordinate position of a transmitter unit.

FIG. 12 shows a block diagram of another embodiment of a receiver according to the invention comprising two (2) systems of ultrasonic wave receiving systems for measuring the two-dimensional coordinate positions of a transmission unit. The receiver 12 comprises two (2) systems of timing detection units 26-1 and 26-2 comprising respectively ultrasonic wave detection units 32-1 and 32-2 and pulse selection logic circuits 40-1 and 40-2. Each of these ultrasonic wave detection unit 32-1 and 32-2 and pulse selection logic circuits 40-1 and 40-2 are same as the ultrasonic wave detection unit 32 and the pulse selection logic circuit 40. Furthermore, a time measurement unit 28 is also provided and the time measurement unit 28 comprises two (2) systems of latch circuit 50-1 and 50-2 in addition to the infrared ray detection unit 42, the counter 48 and the clock source 49. The infrared ray detection unit 42 is also same as the one of the embodiment shown in FIGS. 7A and 7B. The infrared ray detection unit 42 receives the infrared ray pulse 20 from the transmitter 10, outputs the counter reset signal E4 and resets the counter 48 at the timing of the start of an ultrasonic wave transmission. Furthermore, the micro-controller 30 is provided with a coordinate measurement unit 68 in addition to the length measurement unit 52. In the embodiment shown in FIG. 12, for example the receiver 12 is arranged fixedly and, in contrast, the transmitter is provided movably. The transmitter 10 transmits repeatedly the ultrasonic wave 14 and the infrared ray pulse 20 at a predetermined time interval. Therefore, the ultrasonic wave detector 32-1 receives an ultrasonic wave after a time corresponding to a length L1 between the transmitter 10 and it. On the other hand, the ultrasonic wave detection unit 32-2 receives and detects an ultrasonic wave after the time corresponding to a length L2. The pulse selection logic circuits 40-1 and 40-2 extracts a pulse signal indicating the crossing timing of the threshold voltage Vth1 with the third wave of the waveform of the ultrasonic wave 55 as shown in FIGS. 8A–8D and outputs the pulse signal to the latch circuits 50-1 and 50-2 as crossing timing signals E31 and E32. On the other hand, the pulse signal E4 is output indicating the start of the transmission of the ultrasonic wave based on the receiving of the infrared ray pulse 20 from the infrared ray detection unit 42 and resets the counter 48. Therefore, time passed from the transmission of the ultrasonic wave is being counted with the clock counts from the clock source 49. Thus, the count values at the counter 48 at the time when the crossing timing signals E31 and E32 are output from the pulse selection logic circuits 40-1 and 40-2, i.e., the time periods passed from the transmission of the ultrasonic wave are retained in the latch circuits 50-1 and 50-2 in response to each of their respective crossing timings. In the micro-controller 30, an offset correction according to a wave number of the crossing timings predetermined at the length measurement unit 52 is conducted and, then, the sound velocity is multiplied to measure each of the lengths L1, L2 of the ultrasonic wave detection unit 32-1 and 32-2 to the transmitter 10. The coordinate measurement unit 68 conducts triangulation calculation based on the measured length L1 and L2 from the length measurement unit 52 because the spacing between the ultrasonic wave detection units 32-1 and 32-2 in the receiver 12 is fixedly determined and a relative two-dimensional coordinate positions of the transmitter 10 to the receiver 12 is obtained. This embodiment shown in FIG. 12 can be utilized as an inputting tool for characters and figures by measuring the move of a hand real time at the receiver 12 as information on the two-dimensional positions and by inputting measured coordinate positions to a portable terminal or a personal computer etc. when, for example, the receiver 12 is fixedly provided on a board on which a sheet is fixed and the transmitter 10 is provided to a pen for handwriting on the sheet fixed on the board and characters and figures are written or drawn on the sheet using the pen provided with the transmitter 10.

Figure 13:
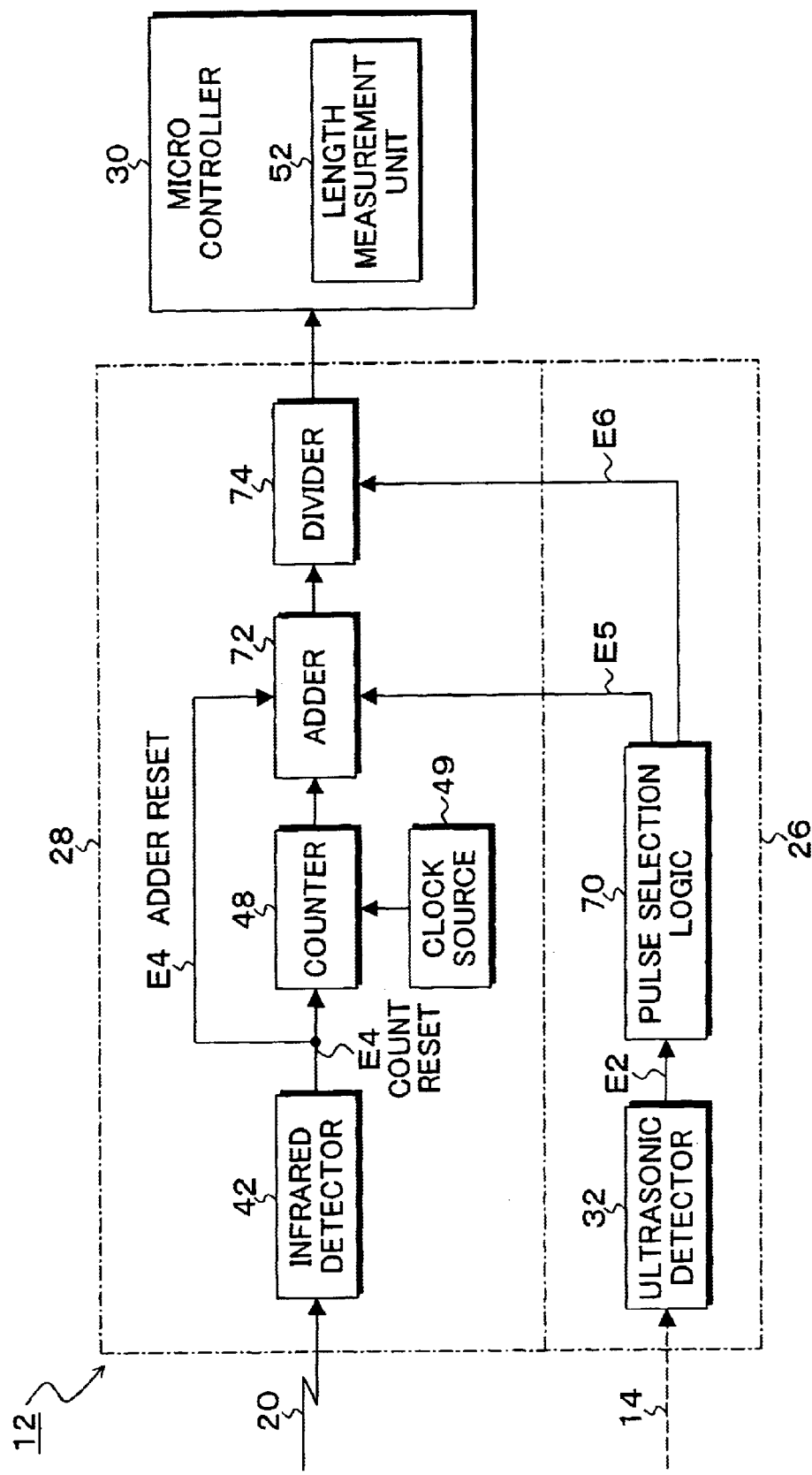
FIG. 13 illustrates a block diagram of an embodiment of a receiver which obtains the arithmetic mean of a plurality of crossing timing time periods.
Figure 14:
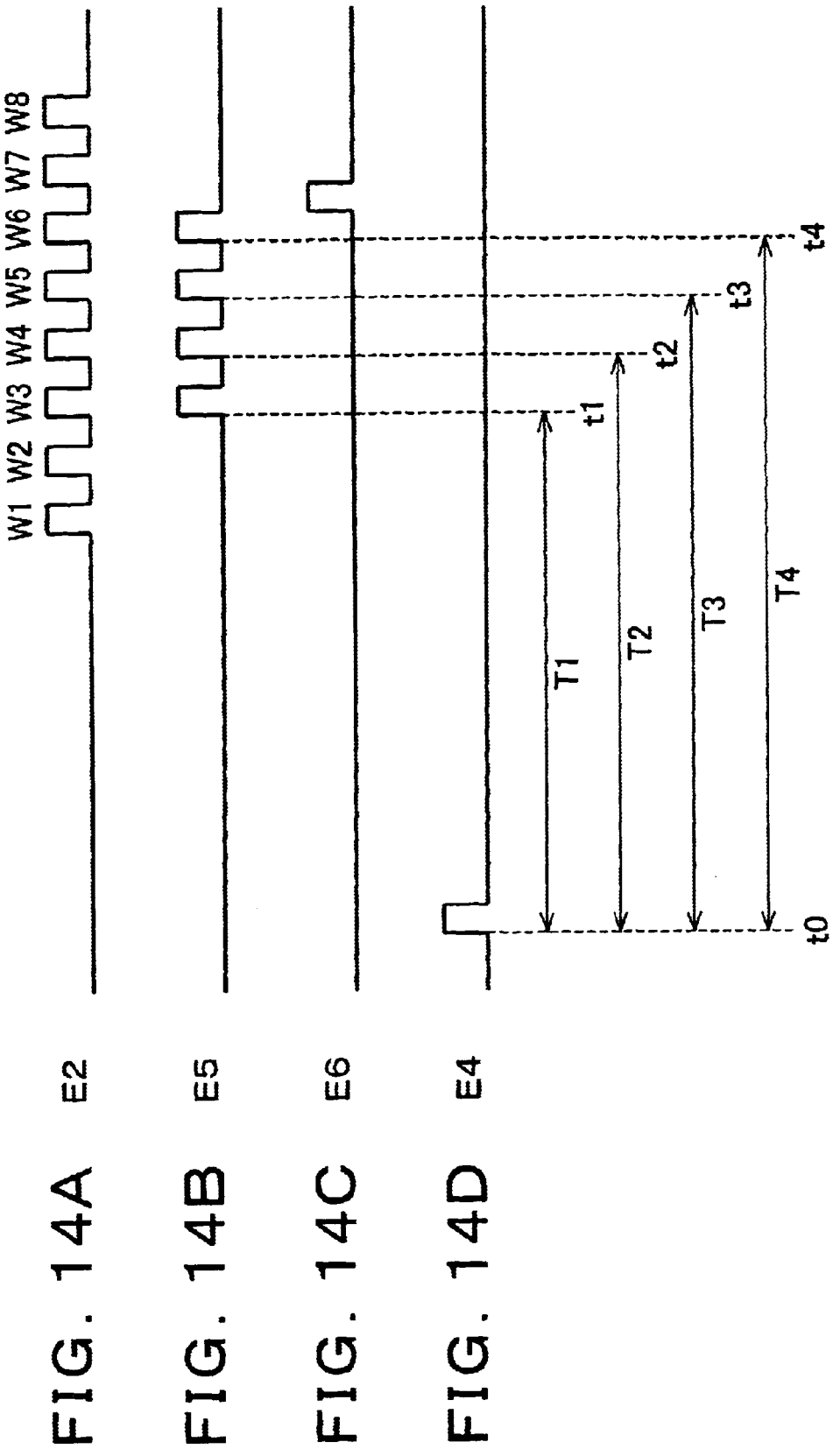
FIGS. 14A to 14D illustrate the time-charts of a signal waveforms in the operation of the receiver shown in FIG. 13.

FIG. 13 shows a block diagram of another embodiment of a receiver according to the invention for measuring a length by obtaining an arithmetic mean a plurality of the crossing timing time periods in the vicinity of the waveform of an ultrasonic wave having the maximal amplitude. The receiver 12 comprises the timing detection unit 26, the time measurement unit 28 and the micro-controller 30. The ultrasonic wave detection unit 32 of the timing detection unit 26 and the infrared ray detection unit 42 of the time measurement unit 28 have same configurations as in the embodiment shown in FIGS. 7A and 7B. A pulse selection logic circuit 70 extracts a predetermined number of pulses in the vicinity of the maximal amplitude from the pulse signal E2 constituted by a series of pulses output from a comparator provided to the ultrasonic wave detection unit 32 and outputs them to an adder 72 as a crossing timing signal E5. FIG. 14A shows the pulse signal E2 output from the ultrasonic wave detection unit 32 as a series of pulses. Receiving this series of pulses, the pulse selection logic circuit 70 outputs a crossing timing signal E5 that comprises four consecutive pulses extracted from the third pulse corresponding to the third wave W3 of the waveform of the ultrasonic wave. The pulse selection logic circuit 70 outputs a pulse signal E6 to a divider 74 as a dividing control signal at the timing when the four pulses from the third pulse have been extracted. The counter 48 is reset by the counter reset signal E4 that has detected the transmission of the ultrasonic wave from the infrared ray detection unit 42 and, at the same time, the adder 72 provided on the side of the time measurement unit 28 is reset when the adder 72 receives the same counter reset signal E4 as a adder reset signal E4. The adder 72, every time it receives each pulse signal of the crossing timing signal E5 shown in FIG. 14B from the pulse selection logic circuit 70, retains the count value of the counter 48 at the timing of the rise of this pulse signal and conducts an adding operation for adding the count value with the value the adder 72 already retains. In this adding operation, the counter values corresponding to the time periods T1, T2, T3 and T4 from the rise of the pulse signal E4 indicating the start of transmitting the ultrasonic wave shown in FIG. 14D to the rise of the four pulse signals in the crossing timing signal E5 shown in FIG. 14B are added in this order. When four adding operations using each pulse in the crossing timing signal E5 from the pulse selection logic circuit 70 is finished, a pulse signal E6 shown in FIG. 14C is output from the pulse selection logic circuit 70 to the divider 74 as a dividing control signal. At the same time, a calculated mean of the added account values corresponding to the added time periods (T1+T2+T3+T4) output from the adder 72, i.e., a time T obtained by obtaining an arithmetic mean from calculating (T1+T2+T3+T4)/4 is output to the micro-controller 30. After an offset correction according to the mean timing of the four pulses in the pulse selection logic circuit 70 is conducted by the length measurement unit 52, the micro-controller 30 multiplies the time T with the sound velocity and the length L to the transmitter 10 is obtained.

In the embodiment shown in FIG. 13, a plurality of pulses are selected not as in the embodiment shown in FIGS. 7A and 7B. It seems that the dispersion of the result becomes smaller as the number of pulses becomes large, however, the dispersion becomes yet larger when only the timings with small dispersion are not added. That is, the dispersion of the timing crossing with the threshold of a waveform of an ultrasonic wave is in inverse proportion to the amplitude of a vibration giving an approximate crossing point. Therefore, denoting the dispersion of crossing timing on the maximal amplitude V as Δt, the dispersion of timing of the crossing point at a vibration having an amplitude αV (α is an attenuation rate and α<1) is Δt/α. Then, the dispersion Δ of the result obtained as an arithmetic mean of the maximal amplitude V and the amplitude αV is as follows.

$$\Delta = (\sqrt{\Delta t^2 + (\Delta t/\alpha)^2})/2 = (\sqrt{1 + 1/\alpha^2}\Delta t)/2$$

When this Δ is larger than the dispersion Δt of the crossing timing with the maximal amplitude V, the adding does not make sense. Therefore, $(\sqrt{1+1/\alpha^2})/2$ should be <1 and it is understood that an amplitude of $\alpha = 1/\sqrt{\sqrt{3}}$ (=approximately 0.57) or larger is necessary. Similarly, when the total of n timings at the vibration having attenuation rates α1, α2, α3, . . . are added to the timing at the maximal amplitude, $1 + 1/\alpha_1^2 + 1/\alpha_2^2 + 1/\alpha_3^2 + \ldots$ should be <n2. Assuming the amplitude except for the one for the vibration having the maximal amplitude are all same, $$\alpha > 1/\sqrt{n+1}$$

is obtained from $1+(n-1)/\alpha^2 < n^2$. Because, for example, when n=3, α>0.5, the effect of the arithmetic mean can be obtained by adding two (2) crossing points of a vibration larger than the half of the maximal amplitude to the crossing timing of the maximal amplitude. Referring to, for example, the waveform of the ultrasonic wave 55 shown in FIG. 10A, the dispersion of approximately nine (9) crossing points at rises and fall-downs from the third crossing point at the rise of the third wave W3 is small as in the characteristics shown in FIG. 10B. This is because each vibration giving respective crossing point is approximately 80–90% of the maximal amplitude. When the arithmetic mean of the time periods obtained at the timing of crossing points in the range is obtained, that is, as shown in FIG. 11B, compared to the timing 64 on the third wave, when an arithmetic mean of the time of the consecutive crossing points on the nine (9) rises and fall-downs from the third wave at the timings 66 is obtained, an effect of reducing the dispersion to approximately one third (⅓) (=1/√9) is obtained compared to that of the single crossing point at the timing 64.

Figure 15:
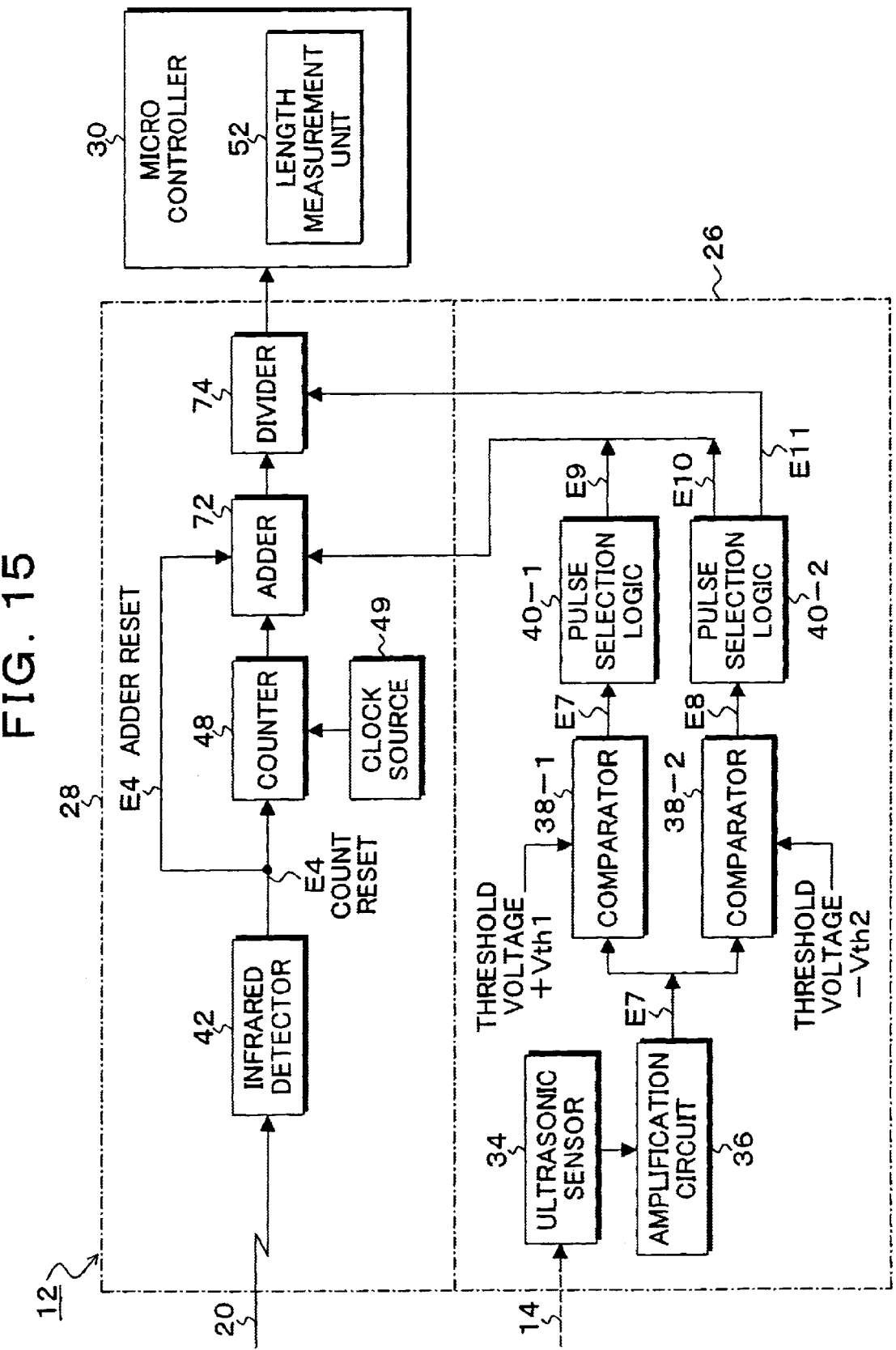
FIG. 15 illustrates a block diagram of an embodiment of a receiver that obtains the arithmetic mean of a plurality of the crossing timing time periods by setting threshold values in both polarities.
Figure 16:
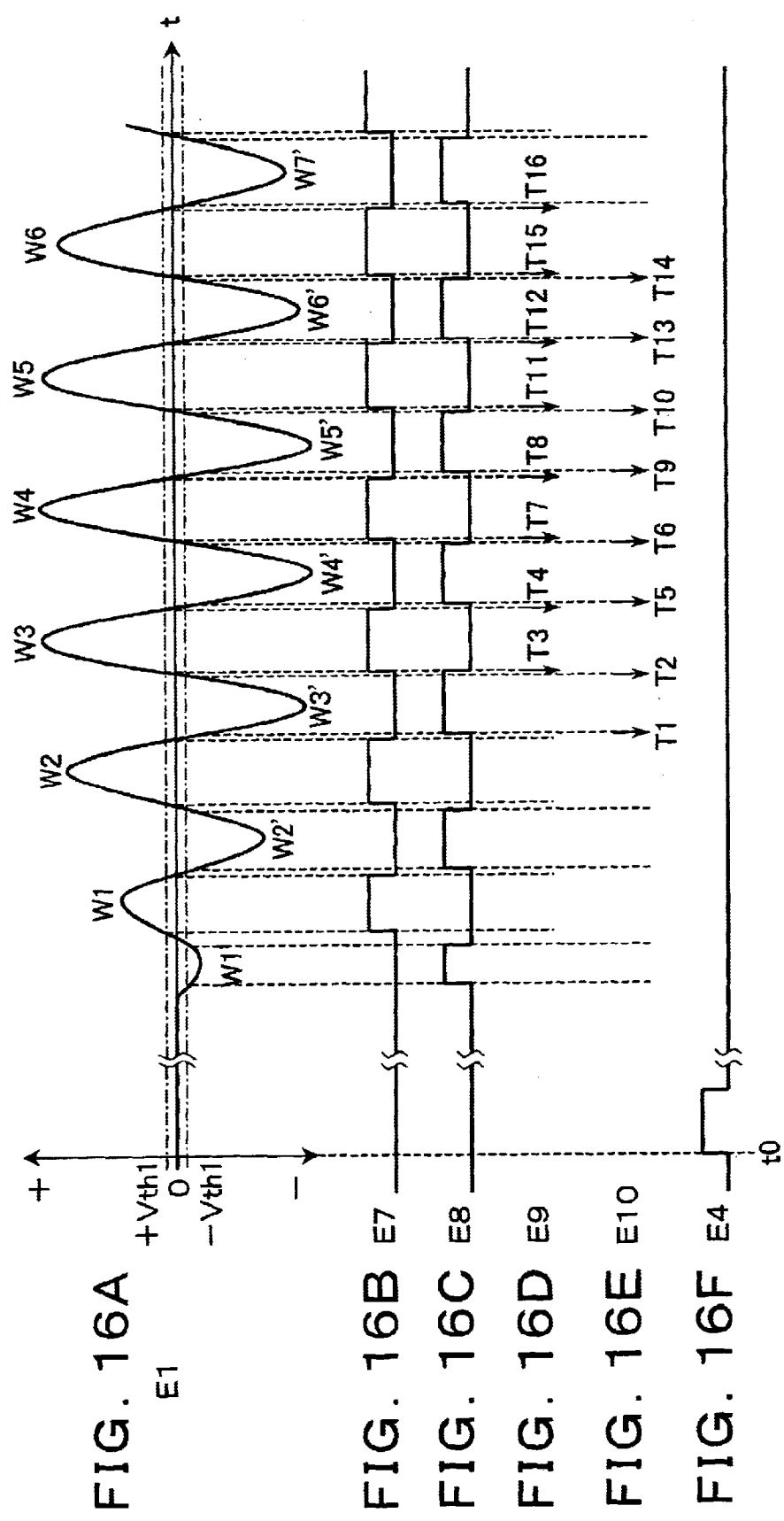
FIGS. 16A to 16F illustrate the time-chart of a signal waveform in the operation of the receiver shown in FIG. 15.

FIG. 15 shows a block diagram of another embodiment of the receiver 12 according to the invention in which an arithmetic mean of a plurality of crossing timing times is obtained by setting a threshold value on each of both polarities for the waveform of an ultrasonic wave. The receiver 12 comprises the timing detection unit 26, time measurement unit 28 and the micro-controller 30. The timing detection unit 26 is provided with the ultrasonic sensor 34 and the amplification circuit 36 followed by a comparator 38-1 set with the threshold voltage $+V_{th1}$ and a comparator 38-2 set with the threshold voltage $-V_{th}$. The threshold voltages for the comparators 38-1 and 38-2 are set on both of the positive side and the negative side to zero voltage that is the center of the waveform of the ultrasonic wave as shown in FIG. 16A. The comparator 38-1 outputs a pulse signal E7 constituted by a series of pulses corresponding to the threshold value crossing points on the positive side of the waveform of the ultrasonic wave by the threshold voltage $+V_{th1}$. The comparator 38-2 outputs a pulse signal E8 constituted by a series of pulses corresponding to the crossing points of the threshold voltage $-V_{th2}$ on the negative side of the waveform of the ultrasonic wave. The pulse signal E7 and E8 constituted by series of pulses from the comparators 38-1 and 38-2 are as shown in FIGS. 16B and 16C. From the pulse signal E7 constituted by a series of pulses output from the comparator 38-1, the pulse selection logic circuit 40-1 extracts pulses corresponding to the crossing timings of consecutive eight (8) rises and fall-downs from the rise of the third wave on the positive side of the waveform of the ultrasonic wave shown in FIG. 16A and outputs them to the adder 72 as a crossing timing signal E9. The pulse selection logic 40-2 outputs to the adder 72 a crossing timing signal E10 constituted by the extracted pulses having the consecutive eight (8) rises and fall-downs timings from the crossing point of the threshold voltage $-V_{th2}$ of the third wave 3' on the negative side shown in FIG. 16A. The infrared ray detection unit 42 provided in the time measurement unit 28 has the same configuration as that of the embodiment shown in FIG. 8. The unit 42 receives the infrared ray pulse 20 and outputs the count reset signal E4 corresponding to the transmission timing of the ultrasonic wave. The signal E4 is also applied to the adder 72 as the adder reset signal E4. The adder 72 latches the count value of the counter 48 at each timing of rises and fall-downs in the consecutive pulse of crossing timing signals E9 and E10 output from the pulse selection logic circuits 40-1 and 40-2 and adds the latched value with the value the adder 72 already retains. More specifically, denoting the time from a rise time t0 of the count reset E4 indicating the transmission of the ultrasonic wave shown in FIG. 16F, to rises and fall-downs of the pulse signals extracted as the crossing timing signals E9 and E10 shown in FIGS. 16D and 16E as T1, T2, . . . , T16, the adder 72 calculates the time of (T1+T2+T3+ . . . +T16) using the count value of counter 48 of each timing. In addition, the pulse selection logic circuit 40-2 outputs a pulse signal E11 to the divider 74 at the timing after the adding up to 16 times of the threshold value crossing points on the both sides of polarity is finished. Therefore, the divider 74 obtains the temporal average calculated as (T1+T2++T3+ . . . +T16)/16 and outputs the result to the micro-controller 30 in which the result is offset-corrected by the length measurement unit 52 and multiplied by the sound velocity and the length from the transmitter is obtained.

At this moment, in the adder 72 of the embodiment shown in FIG. 11, adding operation is continuously conducted for the rises and fall-downs timings of the pulse signals E9 and E10 obtained from the two (2) threshold voltages $+V_{th1}$ and $-V_{th2}$ set on the both sides of polarity for addition control. However, depending on the settings of the threshold voltages $+V_{th1}$ and $-V_{th2}$, the timings of the rises and fall-downs of the pulses to be added becomes very close to each other and may overlap. Therefore, it is possible that an adder is provided respectively to the pulse selection logic circuits 40-1 and 40-2 and adding is conducted separately for each threshold value, then, the results of each adding are added by an adder provided additionally followed by a division calculation conducted by the divider 74.

As to the adder 72 and the divider 74 provided in the embodiment shown in FIG. 13 and FIG. 15, in which a arithmetic mean of a plurality of crossing timing time is obtained, it is possible to achieve the calculation by the program processing of the micro-controller 30 without providing them as calculation circuits on the side of the time measurement unit 28.

As described above, according to the invention, the resolution of the propagation time measurement can be considerably improved and a high precision length measurement can be realized with a simple circuit configuration by obtaining the propagation time by detecting the crossing timings at the crossing points on waves having large amplitudes and steep inclination of the waveform, i.e., the waves having the maximal amplitude or the wave by one (1) wave immediately before or after that wave, as the timing crossing the threshold value of the waveform of the ultrasonic wave received. Furthermore, the resolution of the propagation time measurement can be further improved and the length measurement precision can be considerably improved by obtaining the length from the arithmetic mean of times of crossing timings consecutively following by a predetermined number from the maximal amplitude where the inclination of the waveform of the ultrasonic wave crossing the threshold value becomes steep or the amplitude immediately before or after the maximal amplitude.

In the above embodiment, as shown in FIG. 5, a configuration in which the transmitter 10 and the receiver 12 is separated and arranged facing each other is taken as an example. However, as another embodiment, an embodiment in which the transmitter 10 and the receiver 12 is integrated and the length to be measured to the item is measured by measuring the time in which an ultrasonic wave is reflected by the item to be measured and returns can be also available.

In relation to the embodiment as shown in FIG. 12 in which two (2) systems of ultrasonic wave receiving instruments are provided to the transmitter 14 and two-dimensional coordinate positions of the transmitter are measured by triangulation, it is possible that, in the embodiment shown in FIG. 13 and FIG. 15, two (2) system of ultrasonic wave receiving instruments are also provided, the two (2) lengths L1 and L2 from the transmitter 10 are measured and the two-dimensional coordinate positions of the transmitter 10 are measured by the coordinate measurement unit 68 on the side of the micro-controller 30.

(Coordinate Inputting Apparatus)

Figure 17:
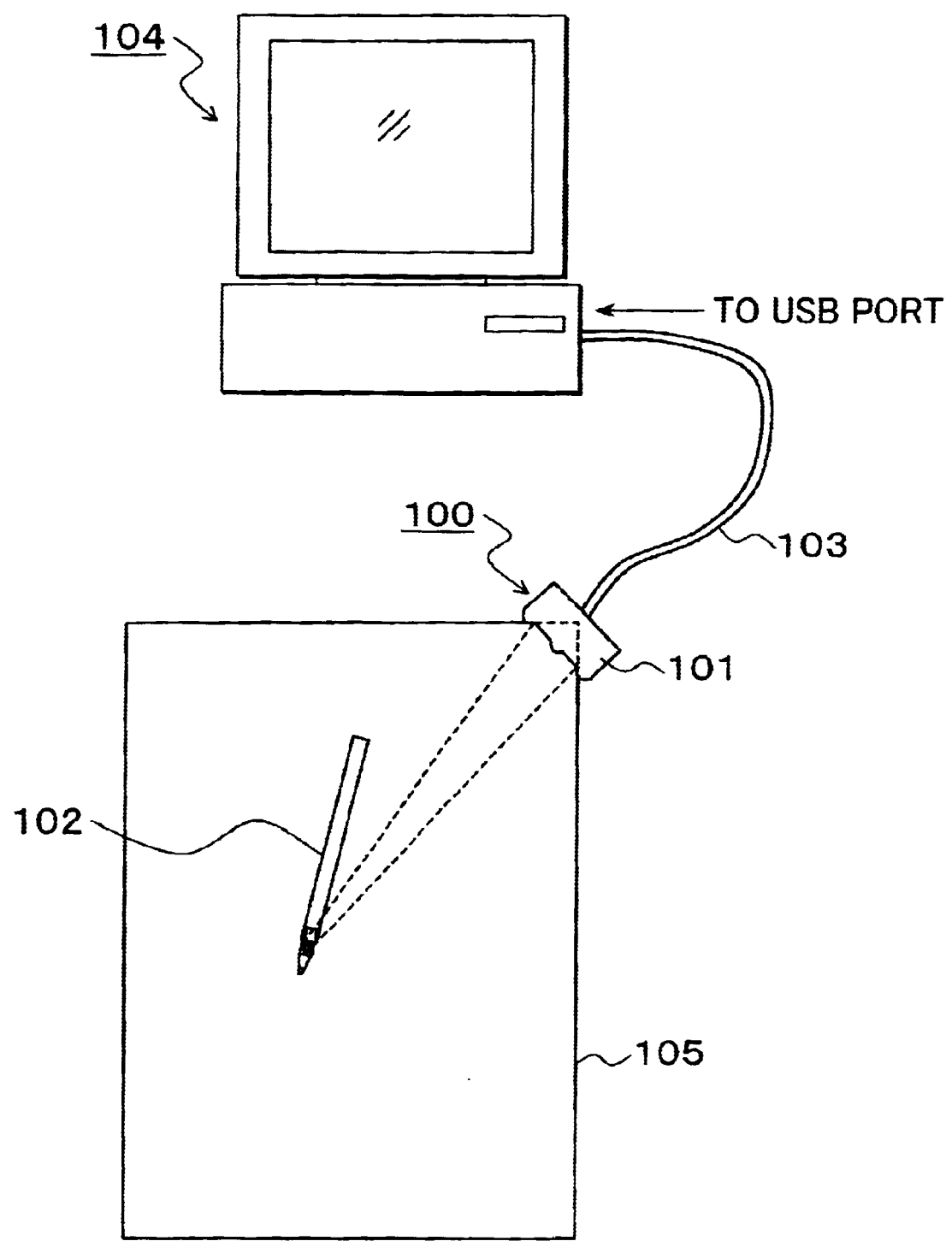
FIG. 17 illustrates the entire configuration of a coordinate inputting apparatus of the invention.

In FIG. 17, a coordinate inputting apparatus 100 according to the invention comprises a receiver 101 having, as shown in FIG. 19B, two (2) ultrasonic wave receivers 304-1 and 304-2 and an infrared ray receiver 305, and a dedicated pen as a writing tool, and it is necessary to connect a connecting cable 103 of the receiver 101 with a USB port of a personal computer etc. to use the apparatus 100. In the case of the coordinate inputting apparatus 100, when characters and figures are handwritten on a sheet 105 by the dedicated pen 102, the traces are input to a computer as data and it can be used as character data and figure data.

Figure 18A:
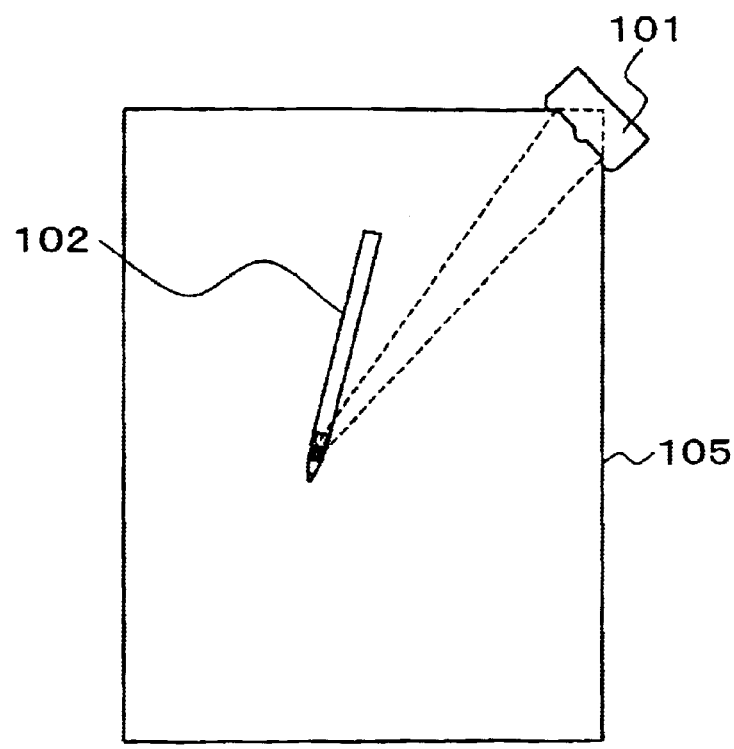
FIGS. 18A and 18B illustrate the arrangement of the receiver.
Figure 18B:
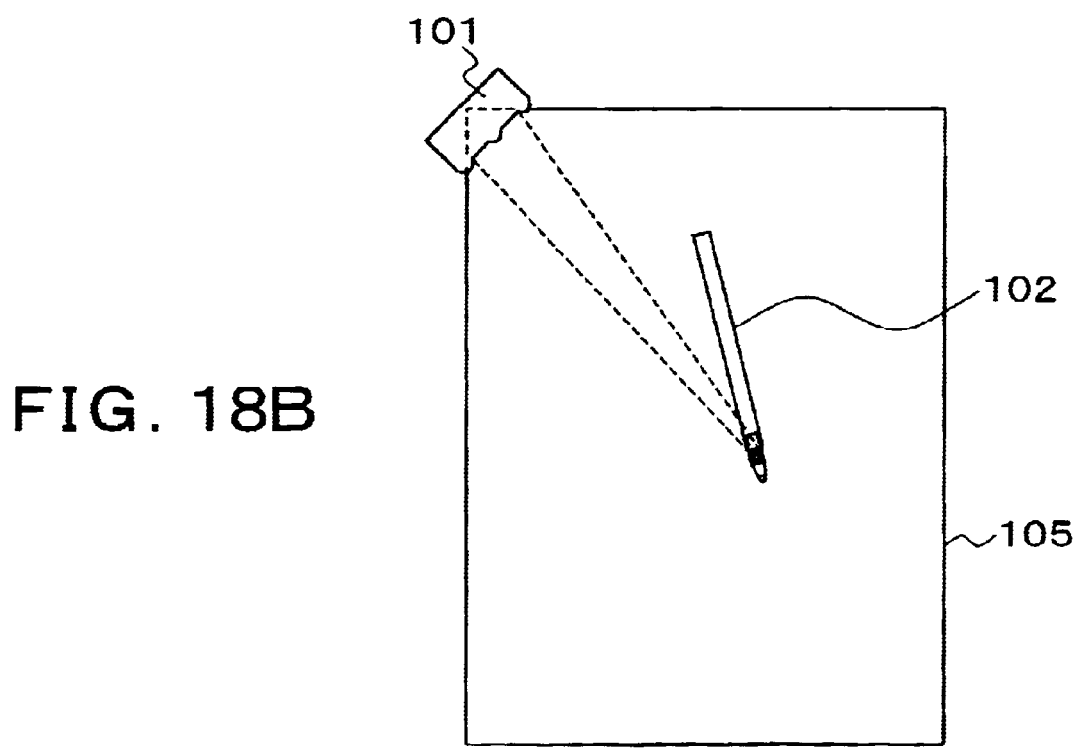

FIGS. 18A and 18B illustrate an example of the arrangement of the receiver 101. This arrangement is remarkably characterized in that the receiver 101 can be arranged on a corner of the sheet to eliminate any blind spot from the built-in ultrasonic receiver by composing the receiver 101 compactly. That is, the receiver 101 is positioned on a upper corner either on the left or right on the sheet face as its position and it is preferable that the receiver 101 is positioned on the upper-right corner as shown in FIG. 18A when the user is right-handed. This is for preventing to interrupt the ultrasonic wave and the infrared ray sent out from the pen with user's left hand when the left hand holds the sheet. In contrast, for a left-handed user, the receiver 101 is positioned on the upper-left corner, as shown in FIG. 18B, while using the apparatus. Now, the characteristics of this embodiment 1 will be mainly described.

Figure 20A:
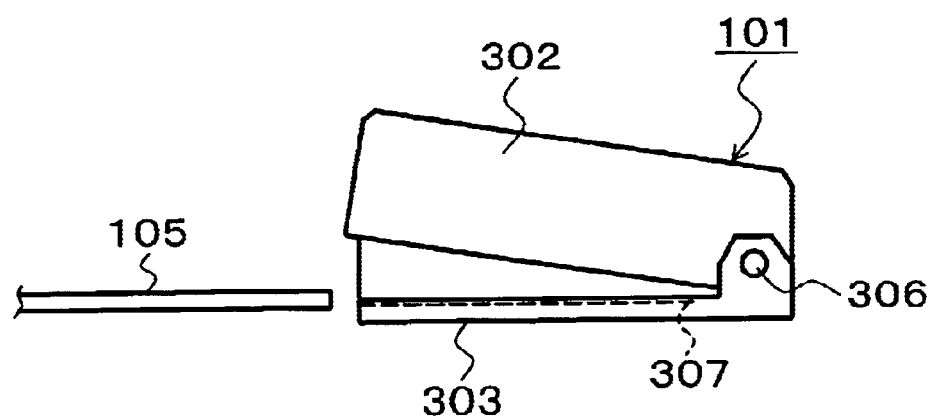
FIG. 20 illustrates the procedure of pinching of a sheet of paper by the receiver.
Figure 20B:
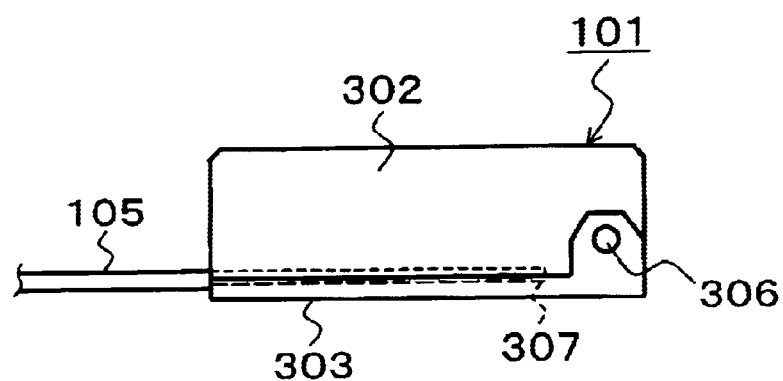

As shown in FIGS. 19A to 19C, the receiver 101 has a configuration so-called clip type having a thick main body 302 and thin base 303. At predetermined positions of the main body 302, two (2) ultrasonic wave receivers 304-1 and 304-2 separated from each other and one (1) infrared ray receiver 305 positioned approximately in the middle of the ultrasonic wave receivers 304-1 and 304-2 are respectively mounted. Among these, the ultrasonic wave receiver 304 is constituted of a tube-shaped piezoelectric film made from polyvinylidene fluoride. The base end side of the main body 302 and base 303 is axially supported by a shaft 306 and pushed to the direction for closing by a built-in spring (not shown). Therefore, the main body 302 and the base 303 can be opened and closed as shown in FIG. 20A centering the shaft 306 and can pinch the sheet at a predetermined position as well as can fix it as shown in FIG. 20. Furthermore, the receiver 101 composed as this is used positioned and fixed at a corner of the sheet.

Figure 21:
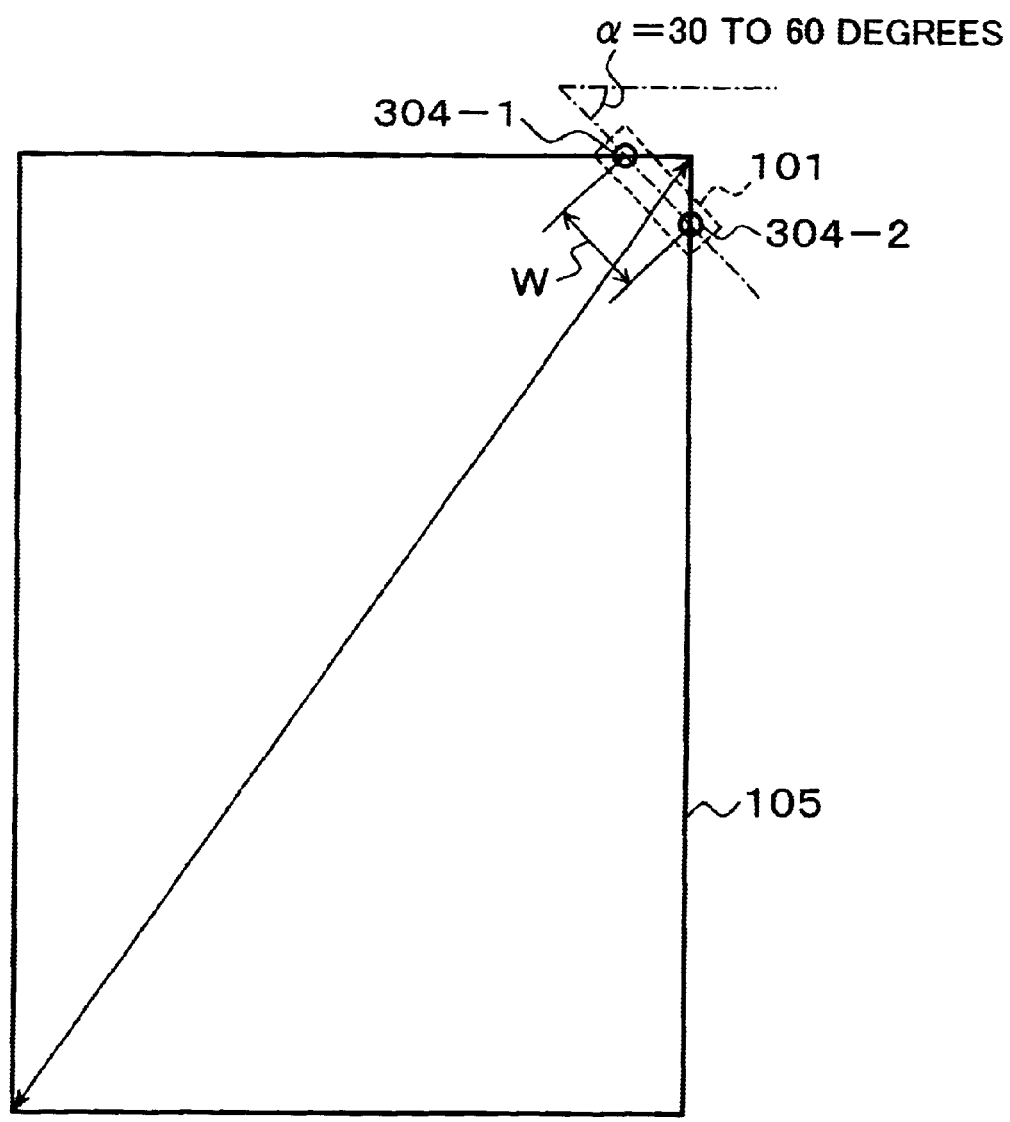
FIG. 21 illustrates the arrangement of the ultrasonic wave receiver.
Figure 23A:
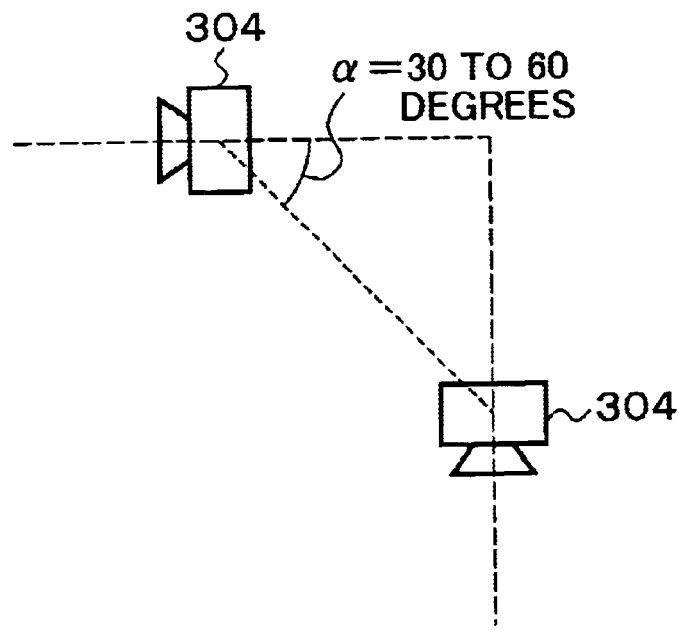
FIGS. 23A and 23B illustrate the arrangement and the direction of the ultrasonic wave receiver.

It has been found out that blind spots for the ultrasonic wave receivers 304-1 and 304-2 and the infrared ray and ultrasonic wave receiver 305 are created or their apparent spacing becomes narrower when receiver 101 is positioned approximately in parallel with the sheet 105. Therefore, as shown in FIG. 21, the position to fix the receiver 101 provided with the ultrasonic wave receiver 304-1 and 304-2 is characterized in that the receiver 101 is positioned and fixed being inclined such that the angle α formed by a line connecting the two (2) ultrasonic wave receiver and the upper edge of the sheet 105 is 30–60 degrees. That is, as specifically shown in FIG. 23A, in the case of the ultrasonic wave receivers 304-1 and 304-2 shown in FIG. 21, the manner in which the two (2) ultrasonic wave receivers 304-1 and 304-2 is limited to the arrangement in which the angle a formed by the line connecting the two (2) ultrasonic wave receivers 304-1 and 304-2 and the upper edge of the sheet is 30–60 degrees. In this case, the direction itself of the ultrasonic wave receiver 304 is not specially considered.

Figure 22:
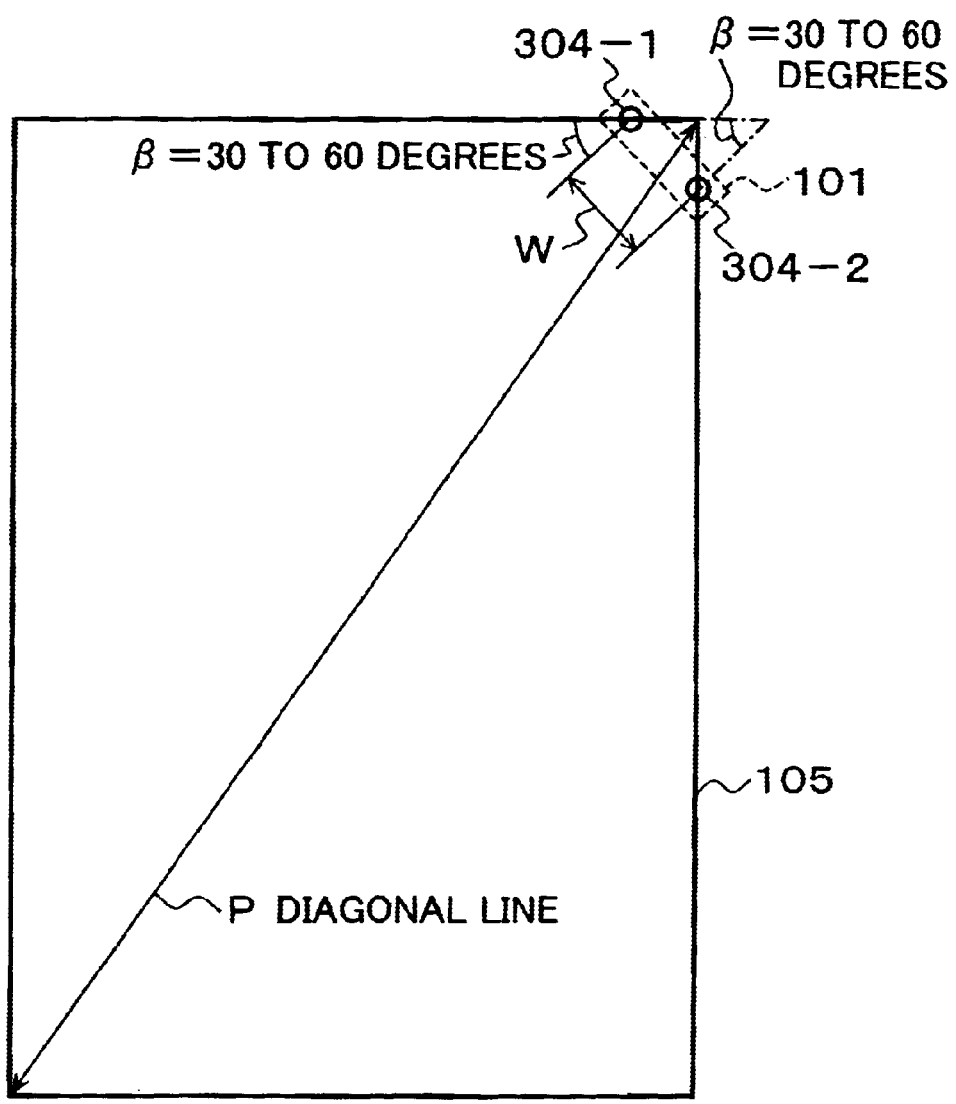
FIG. 22 illustrates the direction of the ultrasonic wave receiver.

As shown in FIG. 22, it is suitable in terms of directionality that the two (2) ultrasonic wave receivers 304-1 and 304-2 are fixed such that the direction of the two (2) ultrasonic wave receivers 304-1 and 304-2 forms an angle β of 30–60 degrees to the upper edge of the sheet 105, which direction (the direction of the arrow) gives the ultrasonic receiver 304 the strongest sensitivity.

Figure 23B:
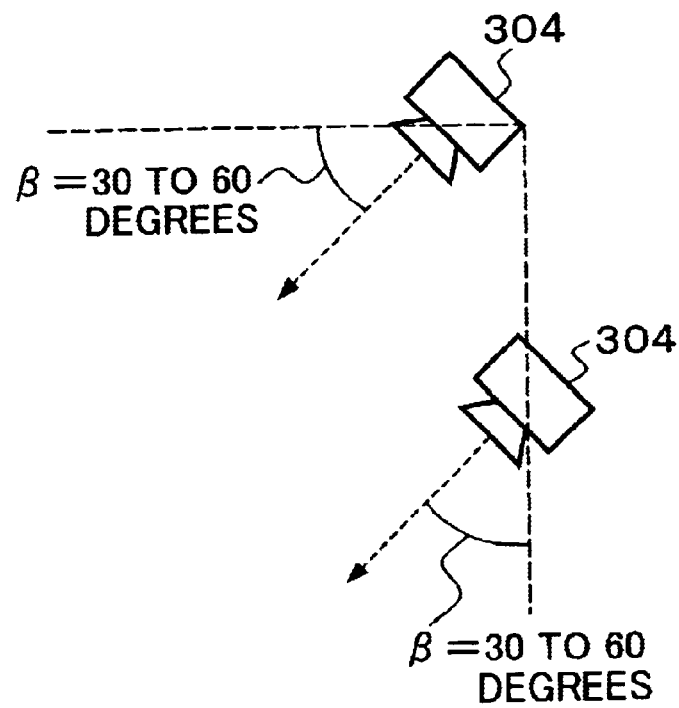

That is, as specifically shown in FIG. 23B, in the case of the ultrasonic wave receivers 304-1 and 304-2 shown in FIG. 22, the direction of each of the two (2) ultrasonic wave receivers 304-1 and 304-2 is limited to the arrangement in which each of them forms an angle of 30–60 degrees to the upper edge of the sheet, which angle gives the strongest sensitivity to each of the ultrasonic wave receivers 304-1 and 304-2. In this case, the arrangement itself of the ultrasonic wave receivers 304-1 and 304-2 is not especially considered.

Figure 24:
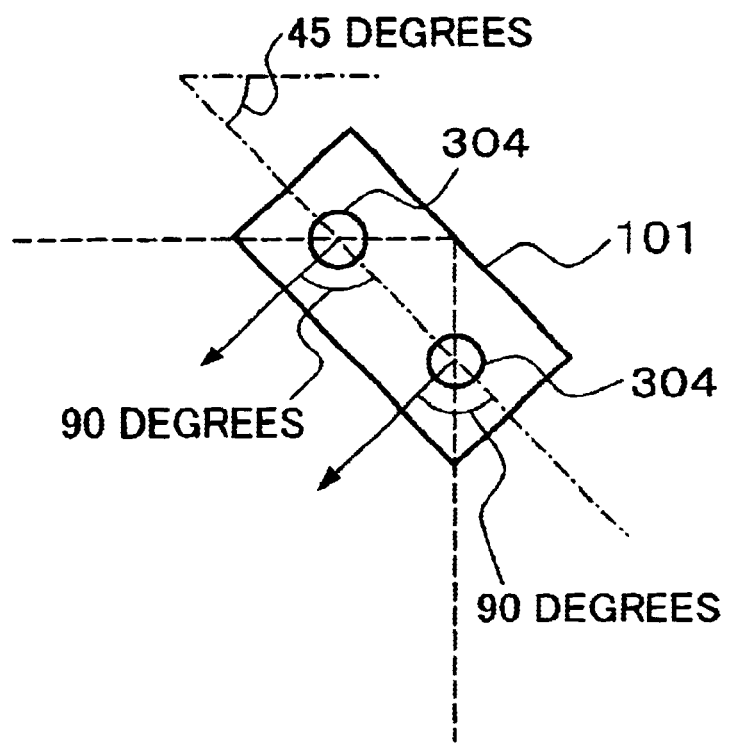
FIG. 24 illustrates the direction in which the maximal sensitivity of the ultrasonic wave receiver can be obtained.

In addition, as in FIG. 24, more preferably, the angle formed by the line connecting the two (2) ultrasonic wave receivers 304-1 and 304-2 and the upper edge of the sheet is 45 degrees and the angle formed by the line connecting the two (2) ultrasonic wave receivers 304-1 and 304-2 and the direction in which most strongest sensitivity is given is 90 degrees, i.e., the angle formed by the direction and the upper edge of the sheet is fixed to be 45 degrees. In order to achieve this, as shown in the inside view of the base 303 shown by cutting apart the main body 302 in FIG. 19A, an edge portion 307 is formed set in an angle of approximately 90 degrees (inclined portion) on the surface of the base 303 constituting the receiver 101. Therefore, when a corner of the sheet 105 is fixed by the receiver 101, the angle of arrangement of the receiver 101 to the sheet 105 can be arranged at an inclined position in 45 degrees which gives the strongest directionality by inserting the sheet 105 along the edge portion 307. In this embodiment, the forming position of the edge portion 307 is on the side of base 303. However, the arrangement angle of the receiver 101 can be arranged in an inclined position of 45 degrees in which the strongest directionality is given even when this edge portion 307 is formed on the side of the main body 302.

Figure 25:
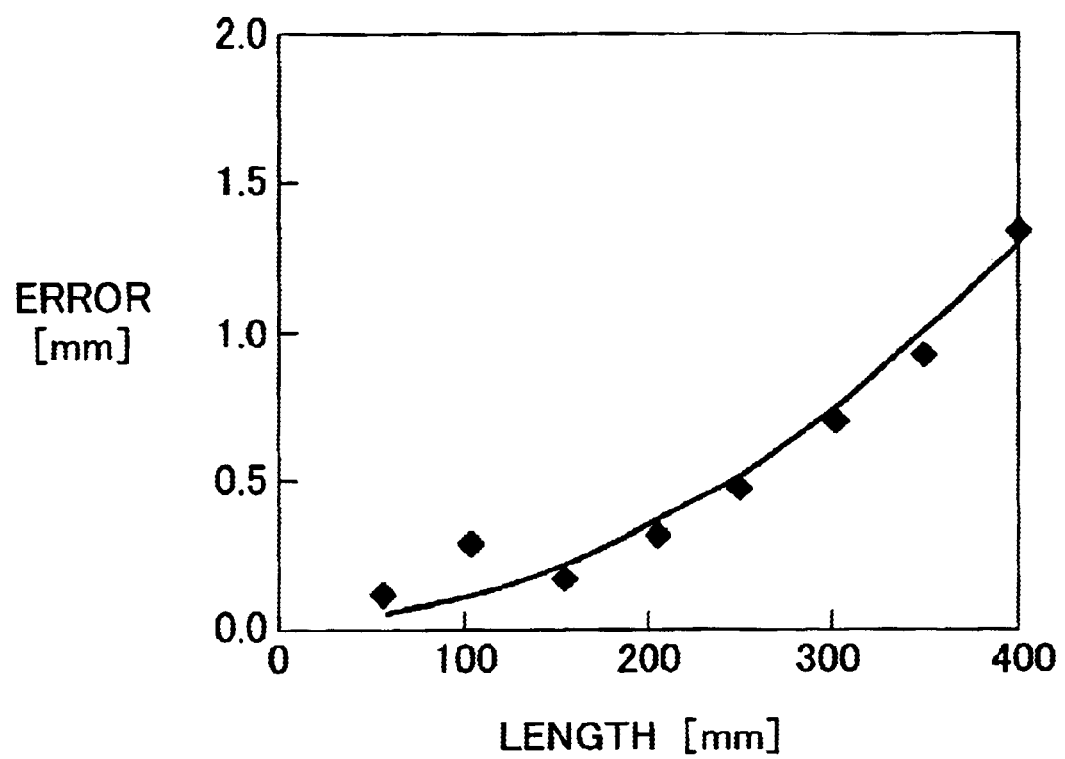
FIG. 25 illustrates the characteristics of the result of an experiment to obtain the relationship between length and error.

In this way, the invention is characterized in that the arrangement position of the receiver 101 is arranged to be on a corner of the sheet 105 in order to eliminate any blind spots and prevent not narrow the apparent spacing of the two (2) ultrasonic wave receivers 304-1 and 304-2 provided to the receiver 101. It is necessary to narrow the spacing W of the two ultrasonic wave receivers 304-1 and 304-2 and make compact and down-size the receiver 101 itself in order to arrange the receiver 101 on a corner of the sheet 105 as described above. A sufficient resolution can be obtained when the spacing W of the ultrasonic receivers is wide, however, the reason of above arrangement is to solve the problems that, in contrast, blind spots are created and the apparatus becomes large. That is, the dispersion of length measurements by ultrasonic wave attributed to the fluctuation of the temperature of the air in which the ultrasonic wave propagates and the noise produced by the sensor and the amplifier in the ultrasonic wave receiver and all these factors become larger in proportion to the length L which is the spacing between the ultrasonic wave receivers 304-1 and 304-2 and the pen point (the writing position by the dedicated pen 102). Furthermore, it has been found out that the dispersion e of the coordinate obtained from the triangulation is in proportion to the length L and in inverse proportion to the spacing W between the two (2) ultrasonic wave receivers 304-1 and 304-2. Therefore, the inventors conducted an experiment as shown in FIG. 25 to obtain the relation between the length and the error in order to obtain the spacing W between the ultrasonic wave receivers that can maintain the necessary resolution and that has as possible as small selected value. In this experiment, the spacing W between the ultrasonic wave receivers is selected as 25 mm and the relation between the length and the coordinate dispersion is obtained experimentally. More specifically, an experiment is conducted to verify to what extent the dispersion of measured length is produced when the dedicated pen 102 is gradually separated farther from the ultrasonic wave receivers 304-1 and 304-2. In FIG. 25, the axis of abscissas represents the value of the actual length (mm), the vertical axis represents the error (mm), the black dots denote the measured length obtained by the ultrasonic receiver and the graph shows the transition by the calculated value calculated from the formula, respectively. From this measured result, the coordinate dispersion e for the triangulation can be calculated as an approximate using the following formula.

$$e=0.0002L^2/W$$

Then, when the size of the sheet used (the length of the diagonal of the sheet) and the required resolution are determined by tracing back from the above formula, the necessary and the minimal spacing W of the ultrasonic wave receivers can be obtained. That is, in the case where the receiver 101 is fixed on a corner of the sheet, the length of the diagonal is the most separated length and this length is the length in which the ultrasonic wave receiver 304 and the pen point are most separated. In addition, because the resolution of ±0.1–1 mm is necessary in the case of usual handwriting, denoting the length of the diagonal as P (the length L to the position of the pen point of the dedicated pen is substituted by P), the spacing W between the ultrasonic wave receivers can be obtained from the following formula.

$$W=0.0002P^2 \text{ to } 0.002P^2$$

Based on this formula, according to the invention, denoting the length of the diagonal of the sheet as P, the set value of the arrangement spacing W between the two (2) ultrasonic wave receivers 304-1 and 304-2 is set such that the spacing W is larger than $0.0002P^2$ and smaller than $0.002P^2$ when the receiver 101 is composed arranging the ultrasonic wave receivers 304-1 and 304-2 based on the spacing W between the ultrasonic wave receivers set as above, it is possible to down-size the receiver 101 and to arrange this receiver 101 on a corner where the receiver obtains the strongest directionality. In this manner, the receiver 101 according to the embodiment according to the invention is composed as a fixing member freely fixed and pinching a corner of the sheet comprising the main body 302 having a pair of the ultrasonic wave receivers 304-1 and 304-2 and the infrared ray and ultrasonic wave receiver 305 and the base 303 axially supported at the base edge portion of the main body as well as it is composed such that the fixing position of the receiver 101 against the sheet is set at a position with which the angle formed by the line connecting the pair of the ultrasonic wave receivers 304-1 and 304-2 and the upper edge of the sheet is in the range of 30 to 60 degrees. Therefore, no blind spots are created for the ultrasonic wave receivers 304-1 and 304-2 and the apparent spacing between these ultrasonic wave receivers 304-1 and 304-2 is not narrowed. Furthermore, the down-sizing of the configuration of the apparatus is possible because of the above. Then, the usability and portability of the apparatus become excellent and the apparatus can be used as a portable apparatus.

Figure 26:
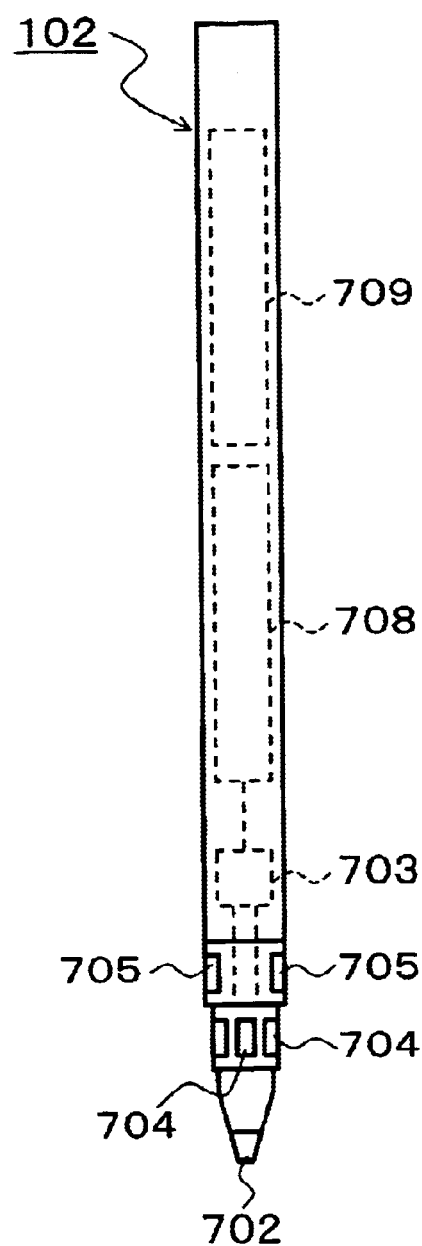
FIG. 26 illustrates the configuration of a dedicated pen.

The configuration of the dedicated pen applied to the invention will be described referring to FIG. 26. The dedicated pen 102 is equipped with a ball-point pen ink tube 702 at its tip and a contact detection switch 703 is provided inside it for detecting the contact of the ball-point pen ink tube 702 and the writing face of the sheet. An tube-shaped ultrasonic transmitter 704 and an infrared ray transmitter 705 are provided at the tip side of the dedicated pen 102. Among these, the ultrasonic wave transmitter 704 is constituted of a piezoelectric film made from polyvinylidene fluoride (PVDF). This piezoelectric film has a function for vibrating itself to generate an ultrasonic waves when it is applied with an voltage. The shape of the ultrasonic wave transmitter 704 is a tube-like shape that can have the directionality of 360 degrees for ultrasonic waves. Therefore, the ultrasonic wave transmitter 704 can deliver ultrasonic wave pulses it has transmitted, to the ultrasonic wave receiver 304 accurately even when the pen 102 rotates while writing. As to the infrared ray transmitter 705, it can deliver the infrared ray it has transmitted, to the ultrasonic wave receiver 304 accurately also even when the dedicated pen 102 rotates while writing because three (3) of the transmitter 705 having an directionality of 120 degrees are arranged uniformly. 708 denotes a drive circuit unit and the drive circuit unit 708 is driven by a AAA battery 709. More specifically, when writing is conducted manually, the contact detection switch 703 becomes ON only when the tip of the dedicated pen 102 contacts the face for writing of the sheet and the ultrasonic wave and the infrared ray are transmitted. In this manner, saving of power is promoted by preventing the transmission of the ultrasonic wave and the infrared ray while writing by the dedicated pen 102 is not conducted.

Figure 27:
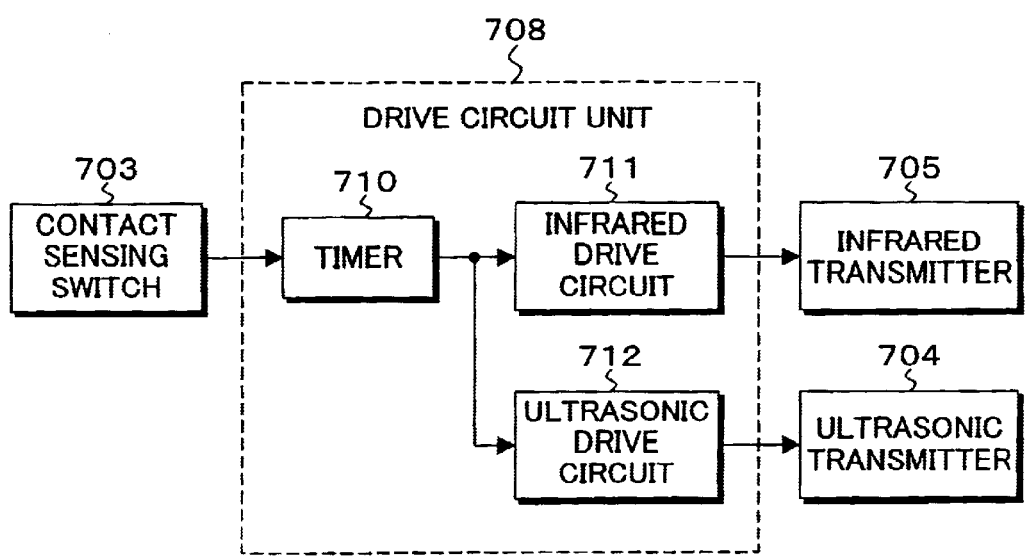
FIG. 27 illustrates the partial block diagram of a drive circuit unit.

FIG. 27 shows a block diagram of the drive circuit 708 applied to the dedicated pen 102. The drive circuit 708 comprises a timer 710, an infrared ray drive circuit 711 and an ultrasonic wave drive circuit 712. When the ink tube 702 of the dedicated pen 102 and the face for writing of the sheet contact and this contact is detected by the contact detection switch 703, an infrared pulse is generated from the infrared ray transmitter 705 and an ultrasonic wave pulse is generated from the ultrasonic transmitter 704 for a constant period (50 Hz–100 Hz) by the actuation of the timer for the infrared ray drive circuit 711 and the ultrasonic wave drive circuit 712. The period is set to be a constant period of approximately 50 Hz because it is enough that only the move of the pen 102 by the user's hand can be detected stably.

Figure 28A:
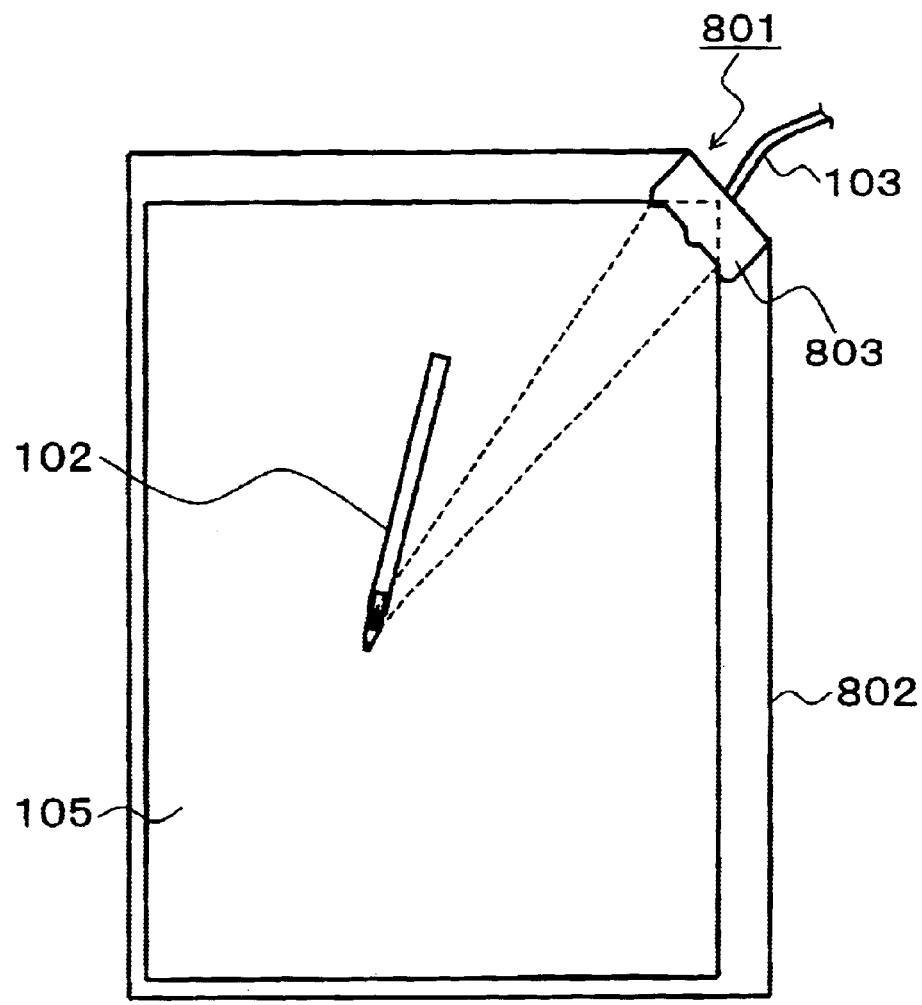
FIGS. 28A and 28B illustrate other embodiment of a coordinate inputting apparatus of the invention.
Figure 28B:
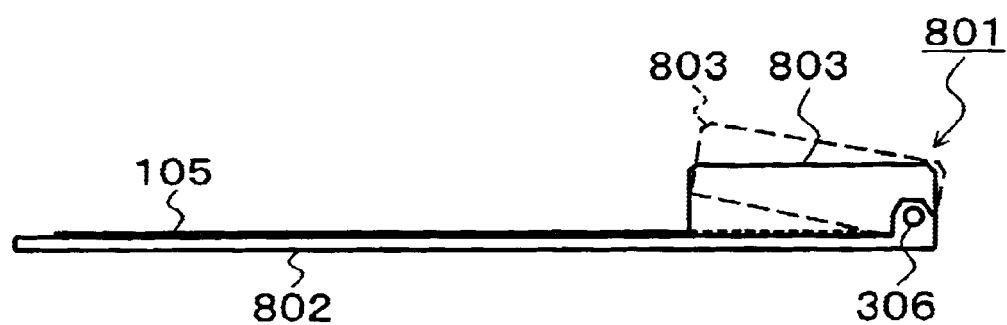

Next, the configuration of a coordinate inputting apparatus 801 of another embodiment according to the invention referring to FIG. 28A and 28B will be described. This embodiment is characterized in that a board 802 (corresponding to the base 303 in FIG. 20A) is provided below the main body 302 constituting a receiver 803 and the sheet is loaded on the upper portion of the board 802. That is, the main body 302 is axially supported against the board 802 by a shaft 306 on the base edge side (on the right in the drawing) and, because the main body 302 is freely opened and closed centering the shaft 306 against the board 802, a corner of the sheet 105 can be pinched and fixed on the board 802. The thickness of the board 802 is selected to be thin and the size of it is selected approximately same as that of the sheet. The fixed position of the receiver 803 against the board 802 is selected on a corner of the board 802 such that the angle formed the position and the upper edge of the board 802 is in the range of 30 to 60 degrees and, more specifically, it is 45 degrees with which the directionality to the sheet becomes maximal. Furthermore, because the thickness of the board 802 employed in this embodiment is selected thin, the board 802 acts as solid support for writing and it is not unsuitable for carrying as tablet. Therefore, the board 802 can be used as a coordinate inputting apparatus convenient for carrying. The size of the board 802 is surely not limited to A4 size etc. that are often used and it can be used as the coordinate inputting apparatus 801 more suitable for carrying when a smaller size such as B5 is selected. Such coordinate inputting apparatus 801 of the invention is composed such that a plate-shaped board 802 corresponding to a base 303 is provided below the main body 302 constituting the receiver 803 a sheet is loaded on the board 802 and a corner of the sheet is selected and fixed to form an angle in a range of 30 to 60 degrees with the upper edge of the board 801. Therefore, no blind spots are created for the ultrasonic wave receivers 304-1 and 304-2, the apparent spacing between the ultrasonic wave receivers 304-1 and 304-2 is not narrowed and the board 802 acts as a solid support for writing. Thus, the usability while writing by the pen 102 and portability are excellent. As a result, the apparatus 801 can be utilized as a portable apparatus.

Figure 29:
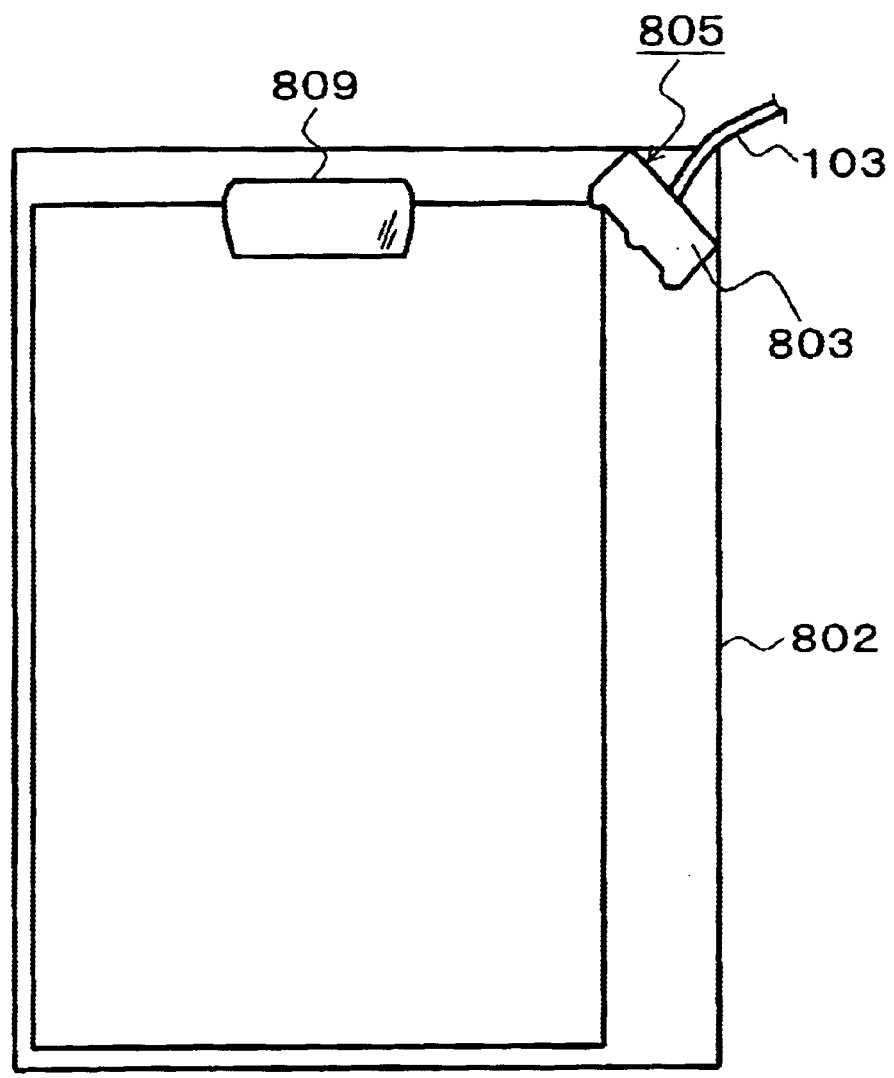
FIG. 29 illustrates a coordinate inputting apparatus which separates its receiver and its clip.

FIG. 29 shows a coordinate inputting apparatus 805 composed such that the receiver 803 and a clip 809 are separated bodies, the clip 809 is provided on the upper portion of the board 802 and the sheet 105 is pinched by the clip 809. Similarly in this case, the fixed position of the upper half portion 302 is selected on a corner of the board 802 and, simultaneously, to form an angle in a range of 30 to 60 degrees with the upper edge of this board 802 and, more specifically, 45 degrees with which the directionality of the ultrasonic wave receiver 304 to the sheet becomes strongest. In this case, because the sheet 105 can be fixed by the clip 809, it is not necessary to provide to the main body 302 any mechanism for pinching the sheet such as the shaft 306.

Figure 30:
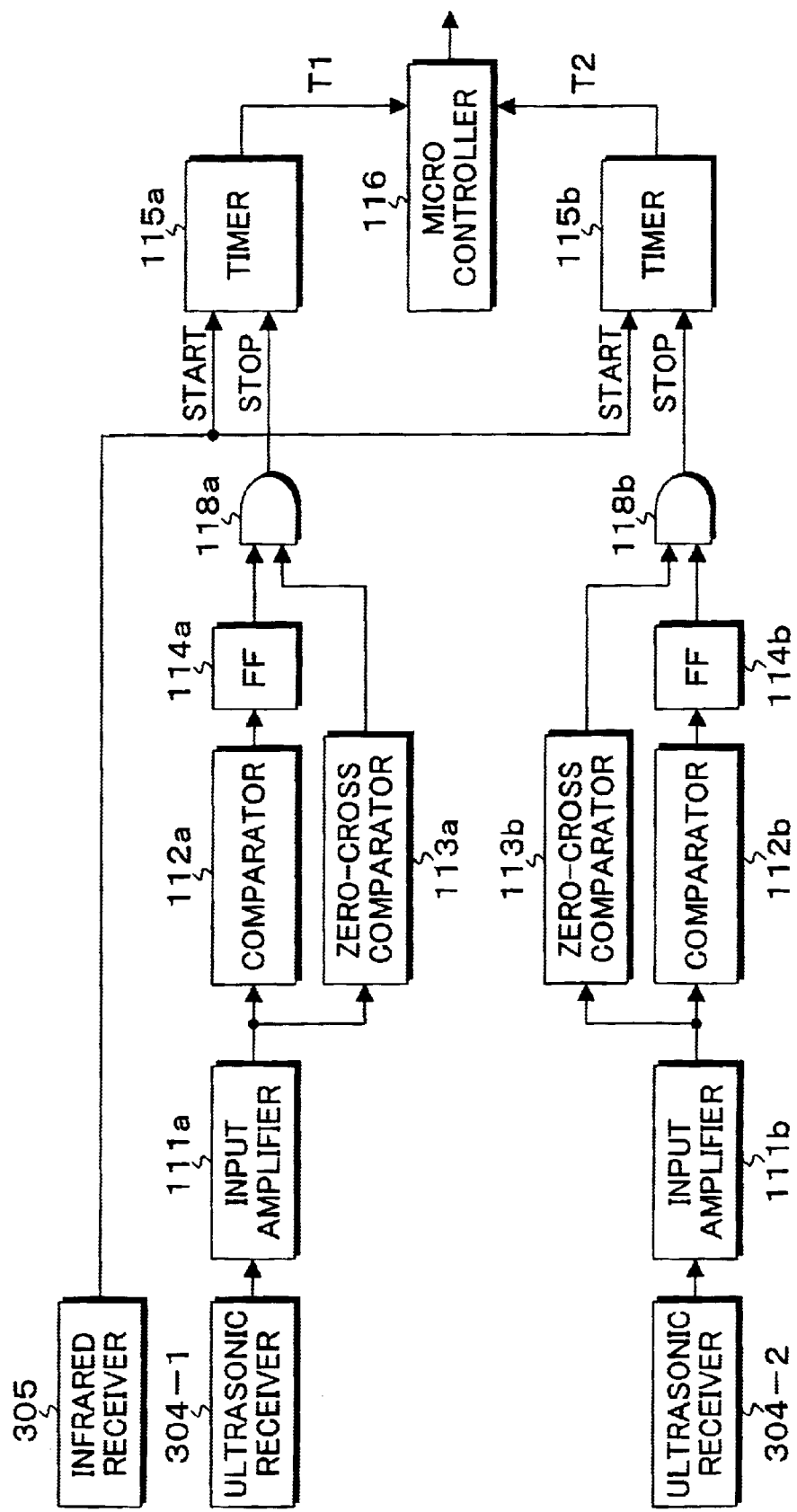
FIG. 30 illustrates a block diagram of the electric circuit unit in the receiver.
Figure 31:
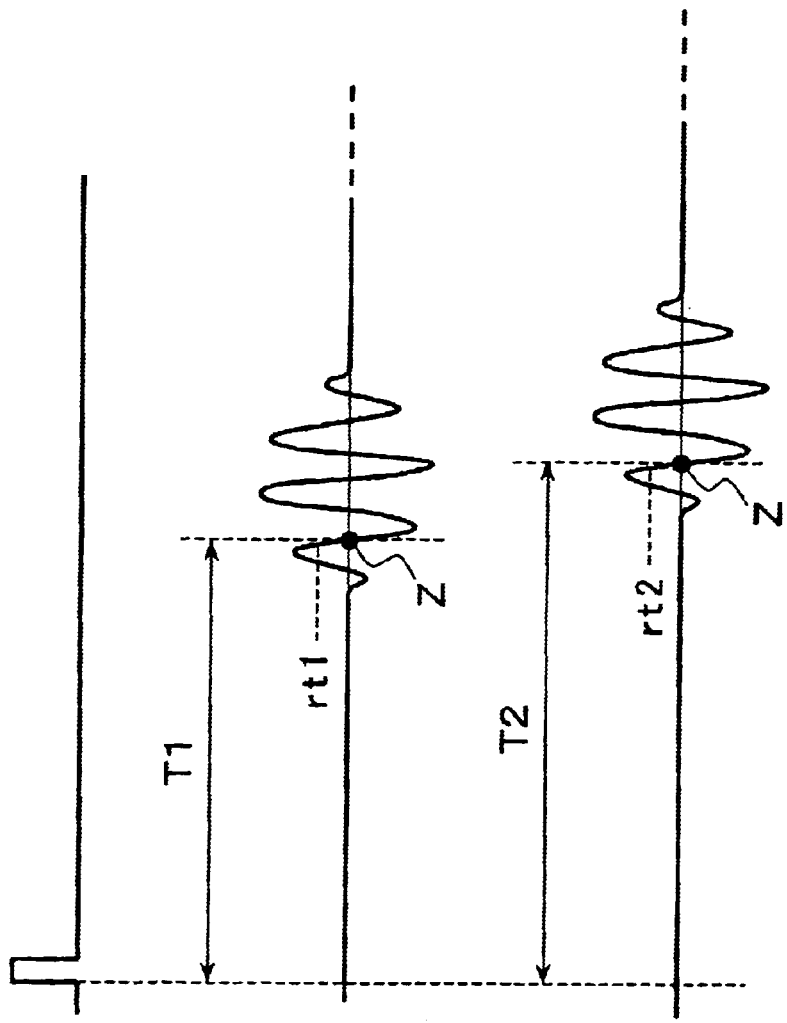
FIGS. 31A to 31C illustrate the waveform of the ultrasonic wave pulses received by the ultrasonic wave receiver.

FIG. 30 shows a block diagram of a circuit applied to a receiver of the invention. The receiver circuit comprises input amplifiers 111*a* and 111*b* for amplifying the ultrasonic wave pulse received at the ultrasonic wave receiver, comparators 112*a* and 112*b*, zero-cross comparators 113*a* and 113*b*, FFs (flip-flops) 114*a* and 114*b*, AND gates 118*a* and 118*b*, timers 115*a* and 115*b* and a micro-controller 116 the ultrasonic wave propagation times T1 and T2 can be detected by such a circuit configuration. First, as shown in FIG. 31A, the timer 115*a* and 115*b* are started by the receiving of the infrared ray receiver 305 infrared ray pulses transmitted from the infrared transmitter 705. Then, the ultrasonic wave pulses received by one of the two ultrasonic wave receivers 304-1 are amplified to a appropriate level as shown in FIGS. 31B and 31C by the input amplifiers 111*a* and 111*b*. A threshold value is extracted by the comparator 112 from the ultrasonic pulses after being amplified by the input amplifier 111 and the FF 114 is turned on when the ultrasonic wave pulse exceeds the threshold value. Then, a zero-cross (Z-point) is detected by the zero-cross comparator 113*a* and the timer 115*a* is stopped by the AND of both of these. At this moment, the next zero-cross position exceeding the threshold value is detected. The time at which this zero-cross position is detected is the arriving time of the ultrasonic wave pulse for the ultrasonic wave receiver. Then, the ultrasonic wave propagation time T1 to the arrival of the ultrasonic wave pulse is detected by the timer based on the infrared ray synchronous signal from the infrared receiver 305. The propagation time T2 is detected in a same sequence for another ultrasonic wave receiver 304-2 and the propagation times T1 and T2 detected as above are input to a micro-computer 116. As described later, the lengths from the pen point being the writing position to the ultrasonic wave receivers 304-1 and 304-2 can be calculated based on the propagation times T1 and T2 detected in this manner.

Figure 32:
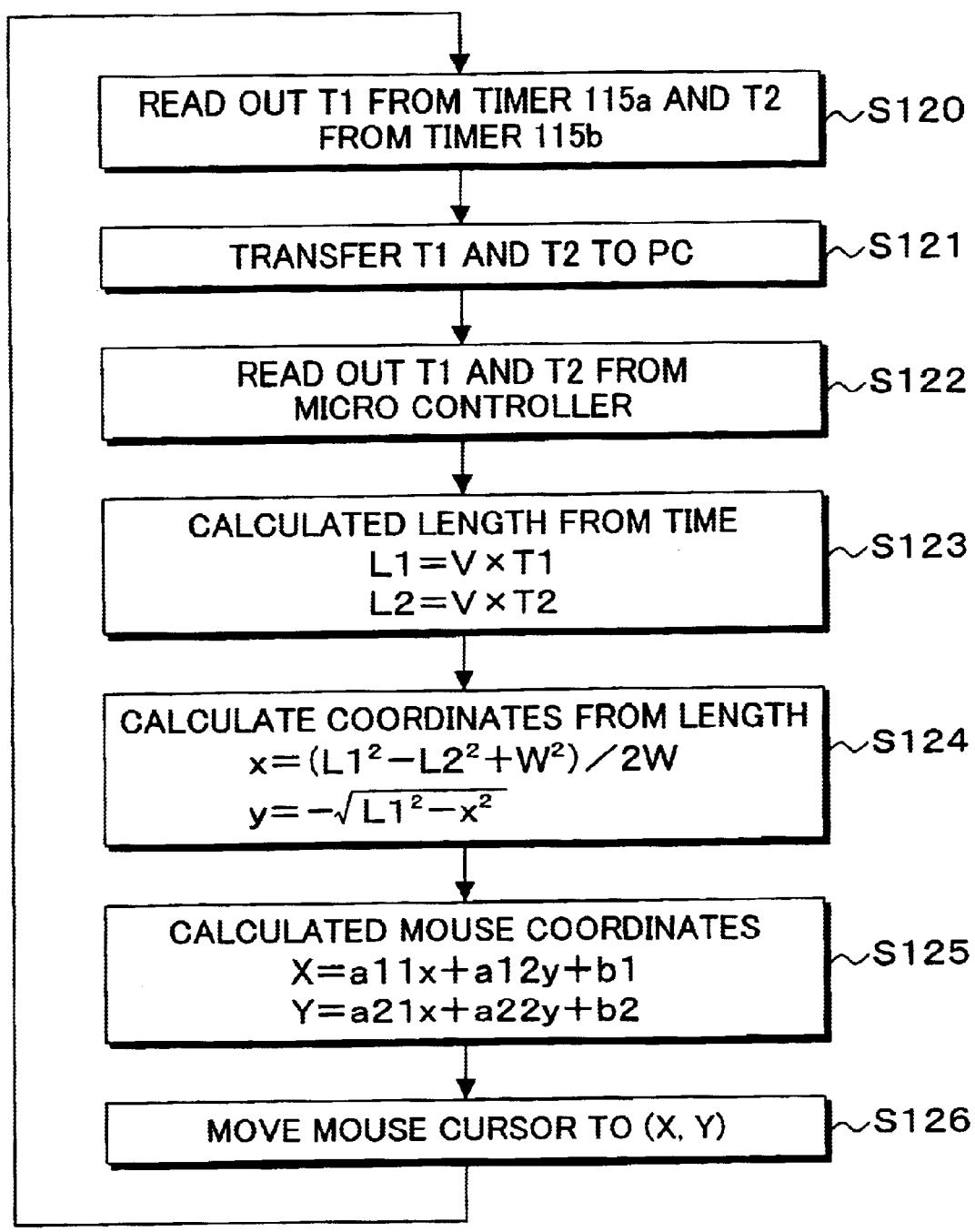
FIG. 32 illustrates a flow-chart of the process of a micro-controller and personal computer software.

FIG. 32 shows a flow chart showing the process conducted in the micro-computer and the personal computer.

Referring to this flow chart, the method for calculating the coordinates by the personal computer from the ultrasonic wave propagation times T1 and T2 detected will be described. First, as the process conducted by the micro-controller 116, a process of reading out the propagation times T1 and T2 from the timers 115*a* and 115*b* is conducted (Step S120). These read-out propagation times T1 and T2 are transferred through a USB port to the personal computer (Step S121). Following is a process conducted in the personal computer. In the personal computer, a process of reading out the propagation times T1 and T2 from the micro-controller 116 is conducted (Step S122) then, a length calculation for calculating the length L1 and the length L2 that are the lengths between the pen point and the two ultrasonic wave receivers 304, from these propagation times T1 and T2 is conducted (Step S123). That is, denoting the sound velocity as V and the length between the ultrasonic wave receivers as W, the length L1 and the length L2 are calculated from the following formula.

$$L1 = V \times T1$$

$$L2 = V \times T2$$

Then, a coordinate calculation process is conducted in the personal computer for calculating the coordinate positions based on the length L1 and the length L2 calculated from the formula in Step S123 (Step S124). That is, assuming a coordinate system in which the position of one (1) ultrasonic wave receiver 304 of the two (2) receivers 304 is taken as the origin and the position of the other ultrasonic wave receiver 304 is taken as (W, 0), the coordinate of the pen in this coordinate system (x, y) is obtains as follows. Since, $$x^2 + y^2 = L1^2$$

$$(x-W)^2 + y^2 = L2^2,$$

solving these equations for x and y gives the following.

$$x = (L1^2 - L2^2 + W^2)/2W$$

$$y = -\sqrt{L1^2 - x^2}$$

From these formulas, each coordinate, (x, y) can be obtained. Furthermore, because the calculation of mouse coordinate on the personal computer screen is necessary in the personal computer, a coordinate calculation for specifying the mouse cursor position is conducted (Step S125). That is, denoting the mouse coordinate as (X, Y), this coordinate can be obtained from the following formulas.

$$X = a11x + a12y + b1$$

$$Y = a21x + a22y + b2,$$

where the coefficients a11, a12, a21, a22, b1 and b2 have been predetermined by a calibration as built-in data. Then, a process for moving the mouse cursor is conducted base on the mouse coordinate (X, Y) obtained in Step S125 (Step S126). After this, the desired coordinate inputting can be conducted by repeating the process from (Step S120) to (Step S126). A general purpose application software such as, for example, a paint brush can be used for showing actually the trace made by the pen on the personal computer screen. The characters etc. hand-written materially on the sheet are stored in the personal computer by a bit map data.

As described above, according to the invention, it is possible to down-size the configuration of the coordinate inputting apparatus because no blind spot is created for the ultrasonic wave receivers, narrowing the apparent spacing between the ultrasonic wave receivers is prevented and the ultrasonic wave receivers can be arranged and fixed on a corner of the sheet. Therefore, the invention has the effect that the apparatus is excellent in usability and portability and it can be used as a portable receiver. Furthermore, by fixedly attaching the receiver on a plate-shaped board loaded with a sheet for writing with a dedicated pen, because the receiver is positioned and fixed on the corner of the board in advance, no blind spot is created for the ultrasonic wave receivers, narrowing of the apparent spacing between the ultrasonic wave receivers is prevented and, in addition, the board can work as a solid support for writing. Therefore, the apparatus is excellent in usability and portability while writing and it can be used as a portable apparatus.

In addition, because the receiver is fixed on it with a sheet at a position such that an angle formed by a line connecting a plurality of ultrasonic wave receivers and the upper edge of the sheet is in the range of 30 to 60 degrees, no blind spot is created for the ultrasonic wave receivers, narrowing of the apparent spacing of the ultrasonic wave receivers is prevented and, in addition, the receiver is excellent in usability and portability. Therefore, the apparatus can be used as a portable apparatus.

Furthermore, because a flexible edge portion is formed set in the direction approximately 90 degrees pressing the corner of the sheet on the pinching face of the receiver against the sheet, by inserting the sheet along the edge portion, the arrangement angle of the receiver to the sheet is arranged at a inclined position of 45 degrees with which the directionality becomes strongest.

Figure 33:
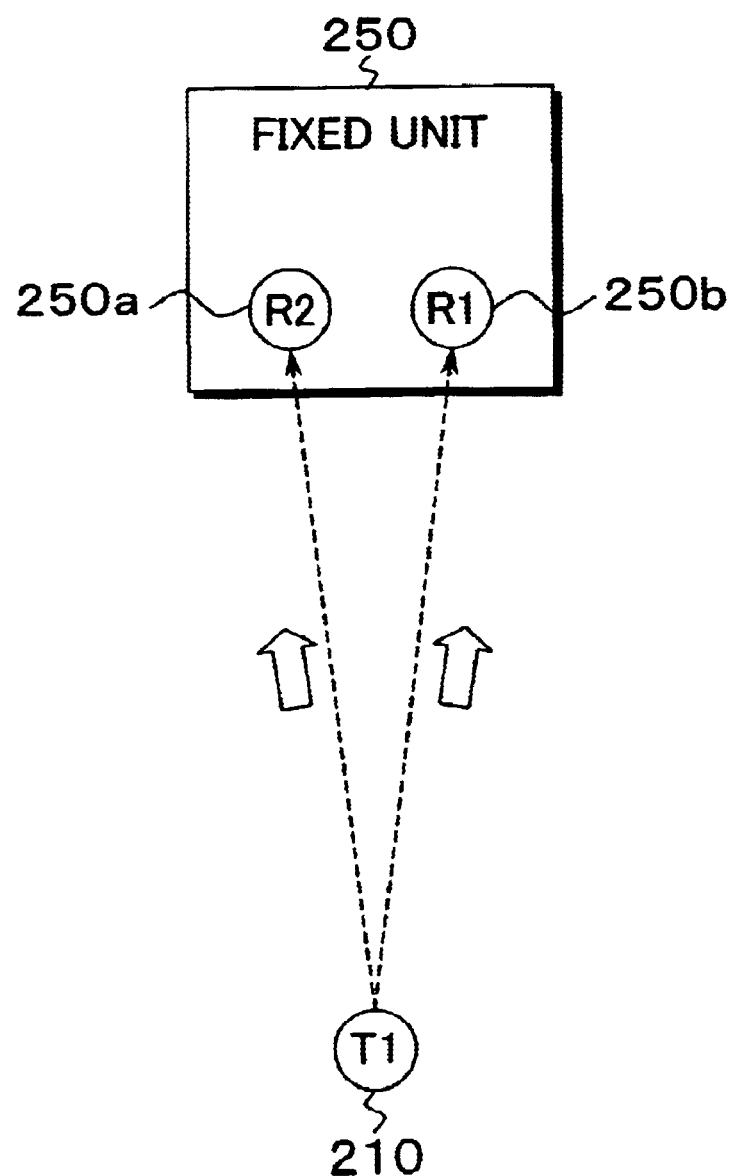
FIG. 33 illustrates the principle of a coordinate inputting apparatus of the invention.

FIG. 33 shows a coordinate inputting apparatus for inputting coordinate information to a computer etc. for obtaining a coordinate of a mover using triangulation based on the length to the mover measured by measuring the propagation time of an ultrasonic wave transmitted by the mover. According to this configuration, it is possible to input to computer etc. handwritten characters written by the pen-shaped mover, on a paper sheet placed on, for example, a desk, as they are. That is, a pen-shaped mover 210 is embedded with an ultrasonic wave transmitter and the ultrasonic wave transmitted from the ultrasonic wave transmitter of the pen-shaped mover is received by a plurality of ultrasonic wave receivers 250$a$ and 250$b$ in a fixed unit 250. Then, by measuring the difference between the time when each of the ultrasonic wave receivers receives the ultrasonic wave and the time the ultrasonic wave has been transmitted from the pen-shaped mover 210, i.e., the propagation time of the ultrasonic wave, each of the lengths (propagated lengths) between the pen-shaped mover 210 and a plurality of the ultrasonic wave receivers 250$a$ and 250$b$ is calculated. Then, the coordinate position of the pen-shaped mover 210 using the known triangulation based on these lengths and the length between the ultrasonic wave receivers 250$a$ and 250$b$ previously measured. In the above length calculation, it is possible to obtain each lengths to the transmitter by multiplying each propagation time of the ultrasonic wave with the sound velocity. These propagation time periods are obtained as the time periods from the transmission timing obtained from an LED drive circuit 203 shown in FIG. 34 to the receiving timing of the ultrasonic wave at each of the ultrasonic wave receivers 250$a$ and 250$b$.

Figure 34:
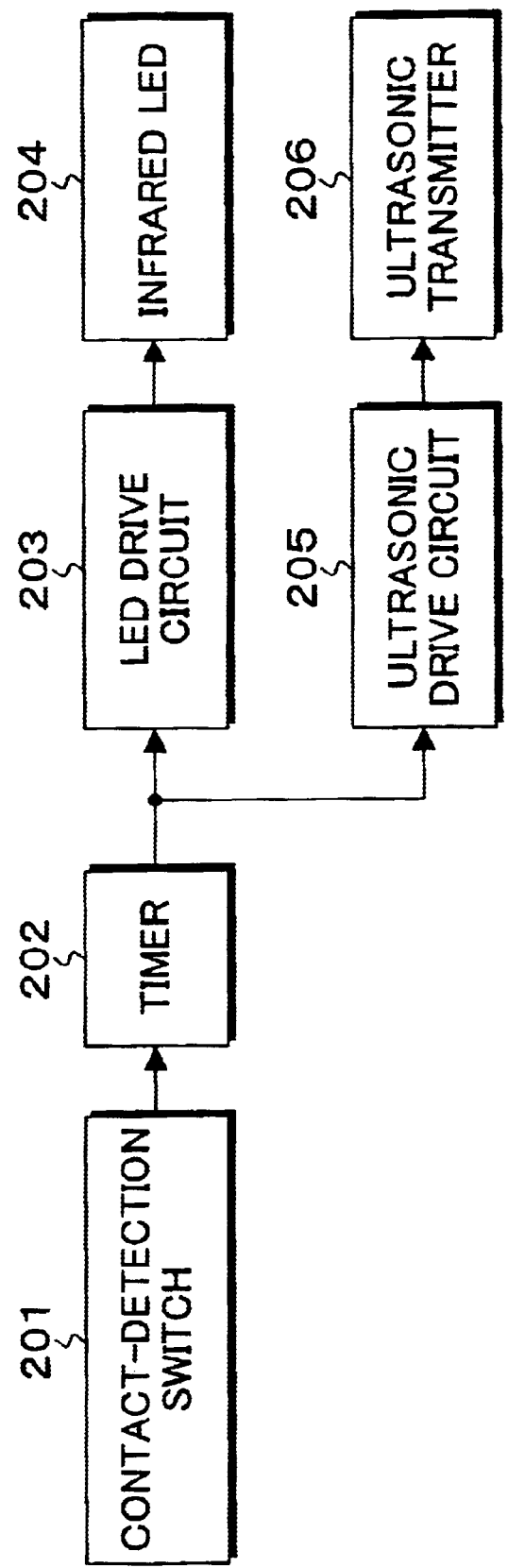
FIG. 34 illustrates a block diagram of the transmitter shown in FIG. 33.
Figures 35A, 35B, 35C:
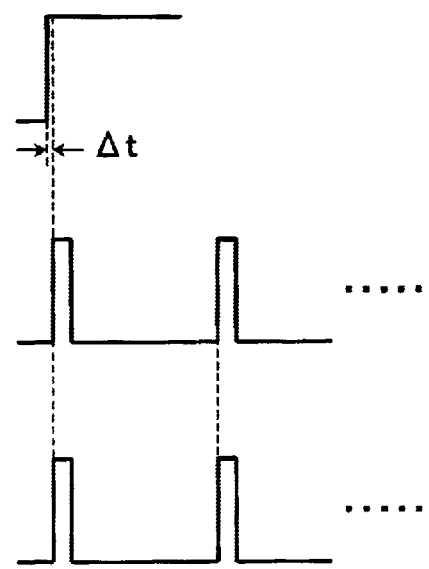
FIGS. 35A to 35C illustrate a time-chart of transmission of detection of hand-writing, synchronized signal and the ultrasonic wave.

As shown in FIG. 34, the pen-shaped mover 210 is provided with a mechanism for detecting a writing action of the pen-shaped mover 210 by an operator, i.e., a writer, for example, a contact detection switch 201. The switch 201 is turned on when the pen tip of the pen-shaped mover 210 contacts the face for writing of the paper sheet etc. on a desk. When the switch 201 is turned on, an ultrasonic wave transmission is conducted by driving an ultrasonic wave generator 206 by an ultrasonic wave drive circuit 205 at a predetermined time interval by a timer 202 until the pen tip is separated from the face for writing. During this, a synchronous signal indicative of the synchronized timing is fed to the fixed unit 250 on the receiver side by driving an infrared LED 204 by the LED drive circuit 203 simultaneously with the ultrasonic wave transmission. Since the synchronous signal can be an optical signal by the illumination of an infrared ray etc., it is possible to shorten the infrared propagation time to extent it can be ignored relative to the propagation time of the ultrasonic wave. Now, a case where writing is detected by the pressure sensitive switch 201 as shown in FIG. 35A and the ultrasonic wave transmission is conducted as shown in FIG. 35C simultaneously. In this case, the synchronous signal shown in FIG. 35B and the ultrasonic wave signal shown in FIG. 35C are transmitted intermittently at a predetermined period defined by the timer 202 by a function of the timer 202.

Figure 36A:
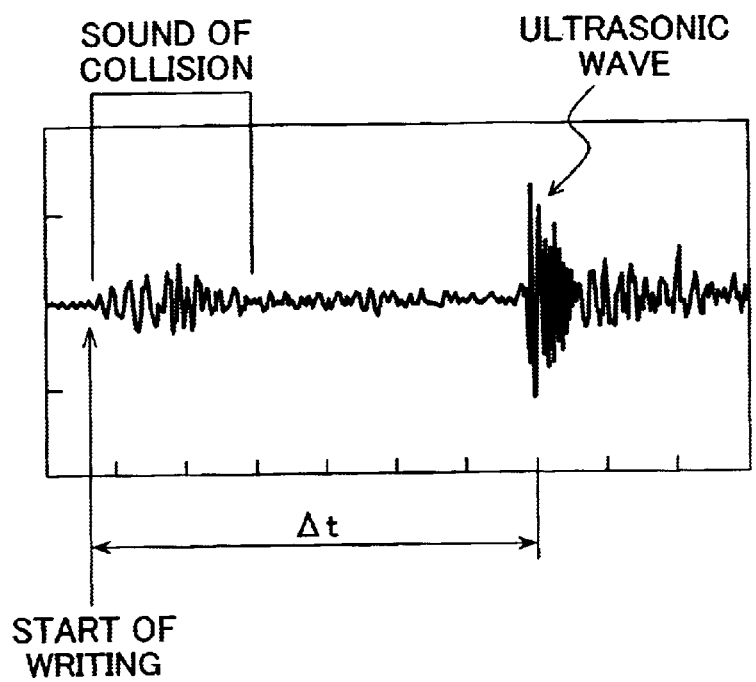
FIGS. 36A and 36B illustrate the problems considered to caused by the configuration shown in FIG. 33.
Figure 36B:
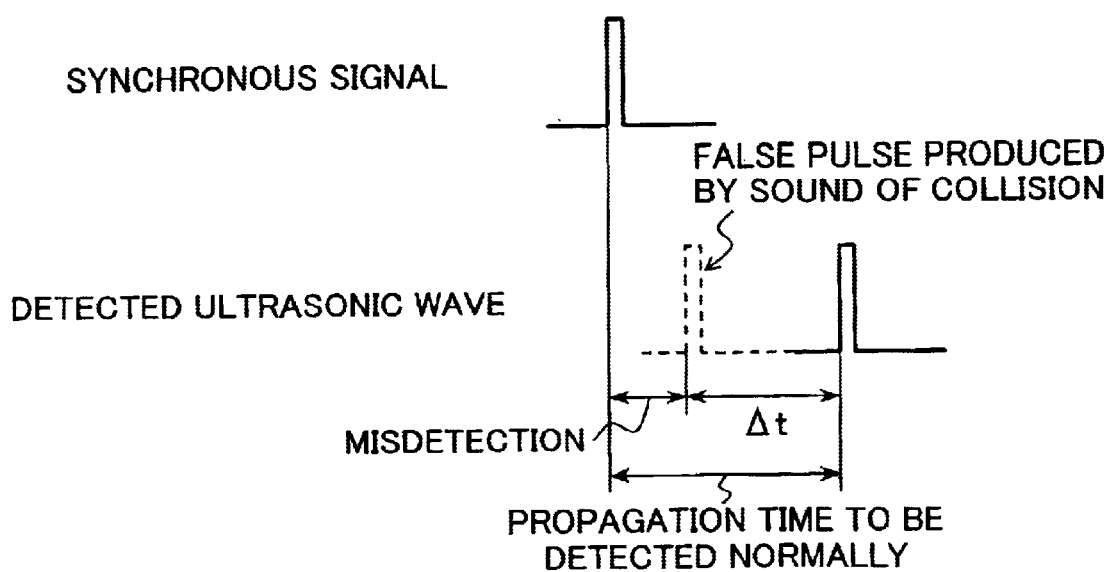

When writing action is conducted by the pen-shaped mover 210, the sound of collision in a form depending on the relationship between the hardness of the pen tip and the face for writing is generated at the pen tip and the face for writing contact. This sound of collision may contain an ultrasonic sound component of several ten kHz. In addition, the echoes of the sound of collision may continue for several milliseconds as shown in FIG. 36A due to the configuration of the pen-shaped mover 210 and surrounding environment. Therefore, as shown in FIG. 36B, not the ultrasonic wave transmitted from the transmitter 206 that should be detected but the ultrasonic wave of the sound of collision may detected in the fixed unit and, as a result, the coordinate position may be mis-detected. It is considered, as shown in FIGS. 35A to 35C, the factors that create a time difference $\Delta t$ between the occurrences of the sound of collision and the ultrasonic wave signal are mainly the operation time of the pressure sensitive switch 201 as a writing detection mechanism 201 and circuit operation time of the ultrasonic wave drive circuit 205 etc.

Figure 37:
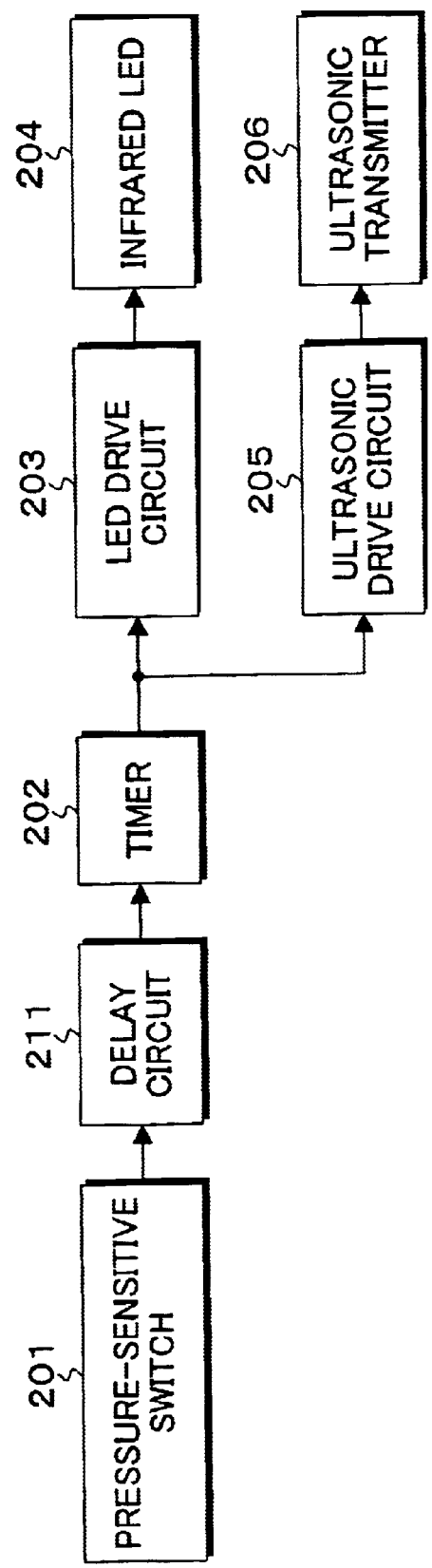
FIG. 37 illustrates a block diagram of the first embodiment of the transmitter of the invention.
Figures 38A, 38B, 38C:
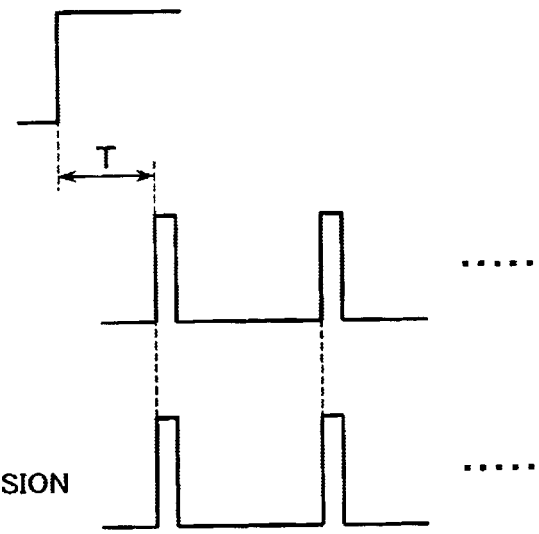
FIGS. 38A to 38C illustrate the operation of the first embodiment of the coordinate inputting apparatus shown in FIG. 37.

In a first embodiment of the invention for solving the problem of mis-detection due to the sound of collision, as shown in FIG. 37, a delay circuit 211 is provided between the writing detection mechanism 201, and the synchronized circuit 203 and the ultrasonic wave drive circuit 205. The sound of collision in problem is generated at the initial point of each stroke in the writing action by the operator, i.e., it is generated at the first moment of contacting of the pen tip of the pen-shaped mover 210 with the face for writing. Then, in the embodiment, as shown in FIGS. 38A to 38C, it has a configuration in which, by providing a predetermined delay T by the delay circuit 211 after the writing has been detected at the writing detection mechanism 201, an intermittent ultrasonic wave transmission is implemented through the timer 202 by the ultrasonic wave drive circuit 205 after the time T has passed. Because a waiting time is provided after the writing detection until the sound of collision and its echoes are decayed enough and ceased as described above, any mis-detection of the ultrasonic wave can be prevented. That is, in this embodiment, the writing is detected by the pressure sensitive switch 201 and, then, a delay of the predetermined time interval T is provided by the delay circuit 211. The time interval T in this case is set (at, for example, several milliseconds) according to the result obtained by measuring the sound of collision and the echo time in advance. After this delay, until the time when the end of writing is detected by detecting the contact state between the pen-shaped mover 210 and the face for writing, by the contact detection switch 201, for example, pressure sensitive switch, the transmission of the ultrasonic wave is conducted intermittently at the predetermined interval (period) by the timer 202. In this embodiment, the infrared LED 204 is used as the synchronizing circuit 203 and the synchronous signal is transmitted by the illumination of the infrared LED 204. However, the synchronizing circuit 203 is not limited to the one described above and a method in which the pen-shaped mover 210 and the fixed unit 250 are connected through a wire and the electrical signal is transmitted directly can be used.

Next, a second embodiment of the invention for preventing the mis-detection due to the sound of collision will be described. It is possible to eliminate apparently the effect of the sound of collision if the operator is let not notice the effect even when the operator is under the effect of the sound of collision. That is, it is preferable to have a configuration in which the end of each stroke of the writing action of the pen-shaped mover by the operator is detected and, the first coordinate detection data of the next stroke starting immediately after this is not used (is ignored). This is an approach utilizing the fact that the sound of collision in problem is generated only at the moment of each stroke of the writing action. In this embodiment, the detection of the end of a stroke is conducted by, more specifically, for example, detecting a transmission repetition rate of the ultrasonic wave transmitted intermittently at a constant period and judging if the period of the repetition rate (approximately 50–200 Hz) is a predetermined one or not. That is, as shown in FIG. 37, the intermittent and periodic generation of the synchronized signal through the timer 202 is started by a detection of the contact of the pen-shaped mover 210 and the face for writing by the pressure-sensitive switch 201 and continues while the contact continues. Therefore, the intermittent and periodic generation of the synchronized signal is ceased by the cease of the detection of the contact by the contact detection switch 201 caused by the end of the stroke of the writing action. As a result, a relatively long blank of time is placed until when a intermittent and periodic generation of a next synchronous signal is started by the start of a stroke of a next writing action. Therefore, it is possible to detect the state of the blank of time being placed as an irregularity of the period of receiving the synchronous signal (i.e., receiving the synchronizing pulse).

Figure 39:
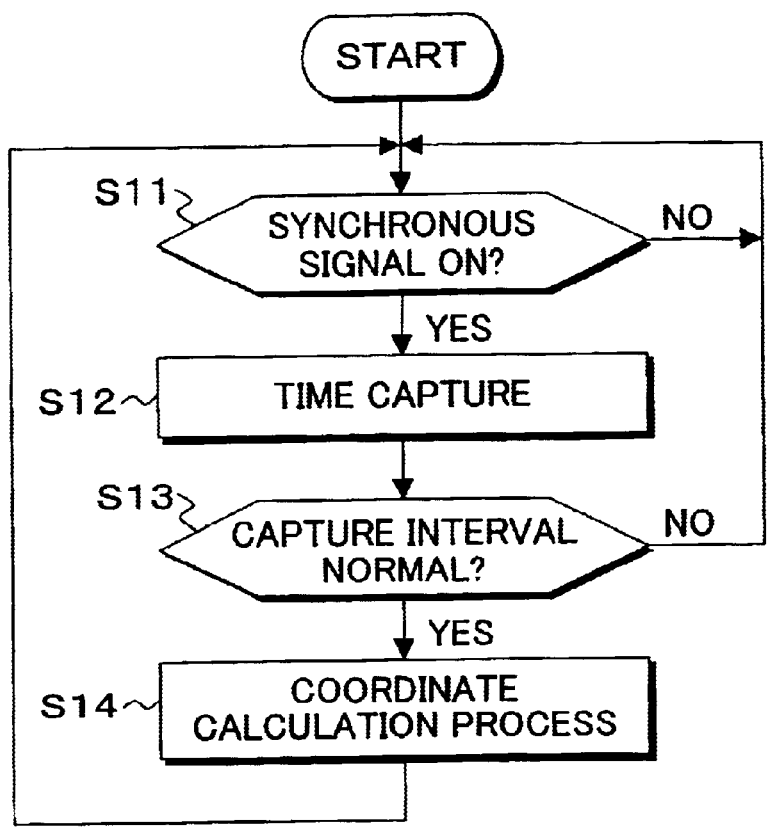
FIG. 39 illustrates a flow-chart of the process operation on the transmitting side constituting the second embodiment of the invention.

FIG. 39 shows the operation according to a method of the above second embodiment. That is, the end of the stroke is detected and the measured value at the first moment of the next stroke is ignored. More specifically, the detection of the end of the stroke is conducted as follows. That is, a time interval at which the synchronous signal is sent from the mover 210 is measured (Step S11 and S12) and, when the measured result do not coincide with the predetermined repetition period of the synchronous signal transmission (No of Step S13), it is judged that the stroke is ended and a next stroke is started and, in this case, the operation returns to Step S11 without conducting the coordinate calculation of the mover 10 by the receiving of the ultrasonic wave. In contrast, when the detected period of the synchronous signal is judged to be the predetermined value (Yes of Step S13), a coordinate calculation of the pen-shaped mover 210 is conducted using triangulation based on the difference between the detected receiving timing of the synchronous signal and the ultrasonic wave (Step S14). Even in the case where a noise such as disturbance light can be mis-detected as the synchronous signal, it is possible to avoid the mis-detection by not applying the measured value to the position calculation by detecting it as an irregularity of the synchronizing pulse receiving period by a process shown in FIG. 39.

Next, a third embodiment of the invention for preventing the malfunctioning caused by the sound of collision will be described. This embodiment has a configuration in which the initial moment of each writing stroke is detected utilizing the fact that the sound of collision is generated thoroughly at the initial moment of a writing stroke and the measured value at that moment is ignored. More specifically, the end of the stroke of the writing action is transmitted from the pen-shaped mover 210 that is the transmitting side and the fixed unit 250 side receives it and distinguishes the above sound of collision from a normal ultrasonic wave. The transmission of the end of the stroke is conducted by the synchronous signal.

Figure 40:
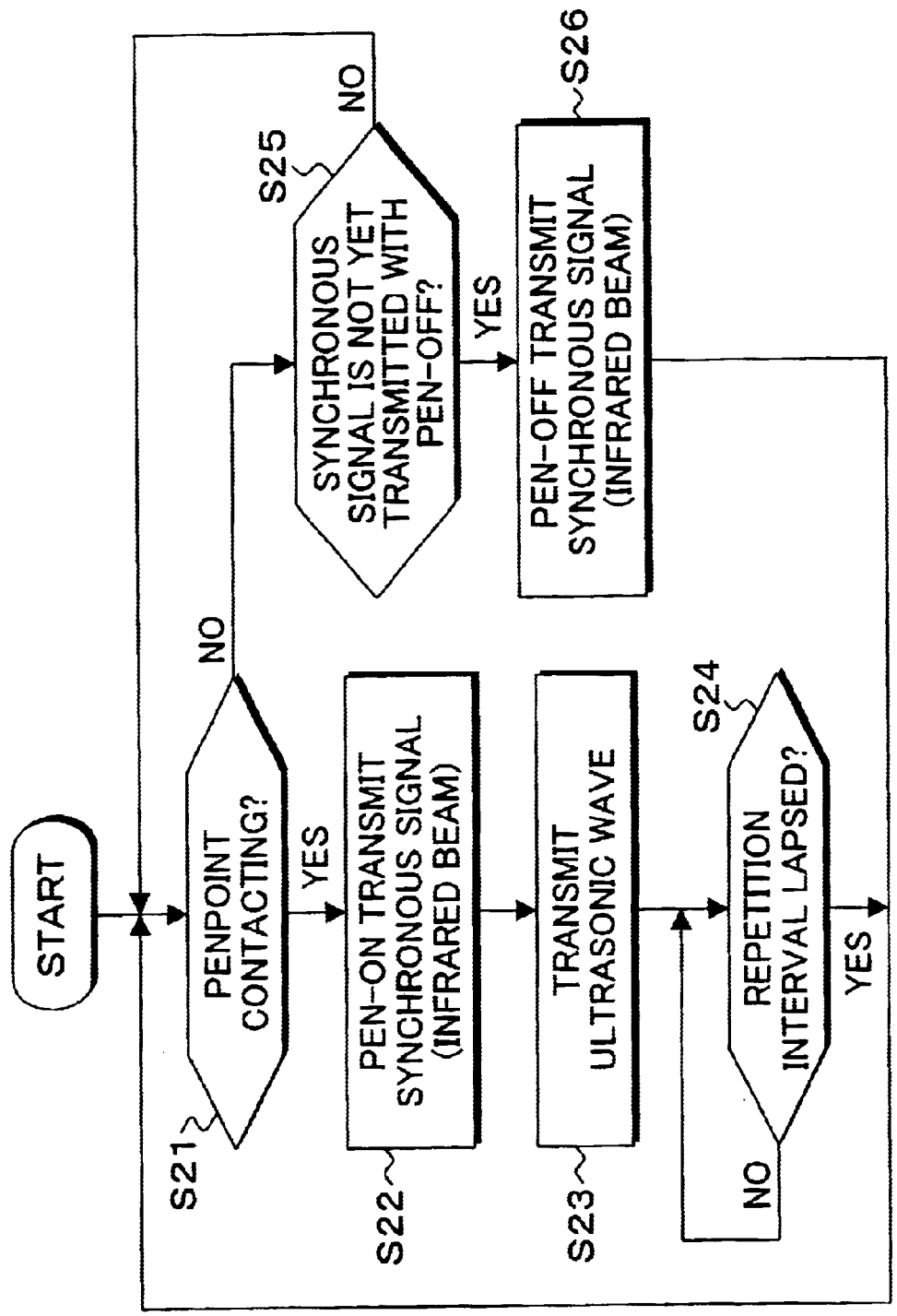
FIG. 40 illustrates a flow-chart of the process operation on the transmitting side constituting the third embodiment of the invention.

In the third embodiment, similarly to the first and the second embodiment, the infrared LED 204 is used as the synchronizing circuit 203. In this case, the transmission of the end (pen-OFF) of the stroke is possible by preparing two kinds of signals of pen-ON signal and pen-OFF signal, having different pulse widths of infrared ray as shown in FIGS. 42A and 42B. On the other hand, in the fixed unit 250, initial flags are provided by pen-ON/OFF. Whether a transmitted signal is that of the initial moment of the stroke or not is judged by this initial flag and, when it is of the initial moment, the measured value for this moment is ignored. That is, in FIG. 40, when the contact of the pen tip is detected from the output of the contact detection switch on the mover 210 side (Yes of Step S21), a synchronous signal to be the pen-ON signal shown in FIG. 42A is transmitted (Step S22). In addition, an ultrasonic wave is transmitted simultaneously (Step S23). Then, when a repetition period by the timer 202 is judged to have passed (Yes of Step S24), the operation returns to Step S21 and restarted from the operation for judging whether the pen tip contacts or not. At this moment, when the end of the pen tip contact is detected in Step S21 (No), whether the synchronous signal to be a pen-OFF signal that is the signal for the moment when the pen tip does not contact shown in FIG. 42B in Step S25 has been transmitted or not is judged. When the synchronous signal has not been transmitted (No), a pen-OFF signal is transmitted in Step S26. On the other hand, when the synchronous signal has been transmitted (No), the operation returns to Step S21. In this manner, the pen-OFF signal is prevented from being transmitted repeatedly while the pen-shaped mover 210 is separated from the face for writing.

Figure 41:
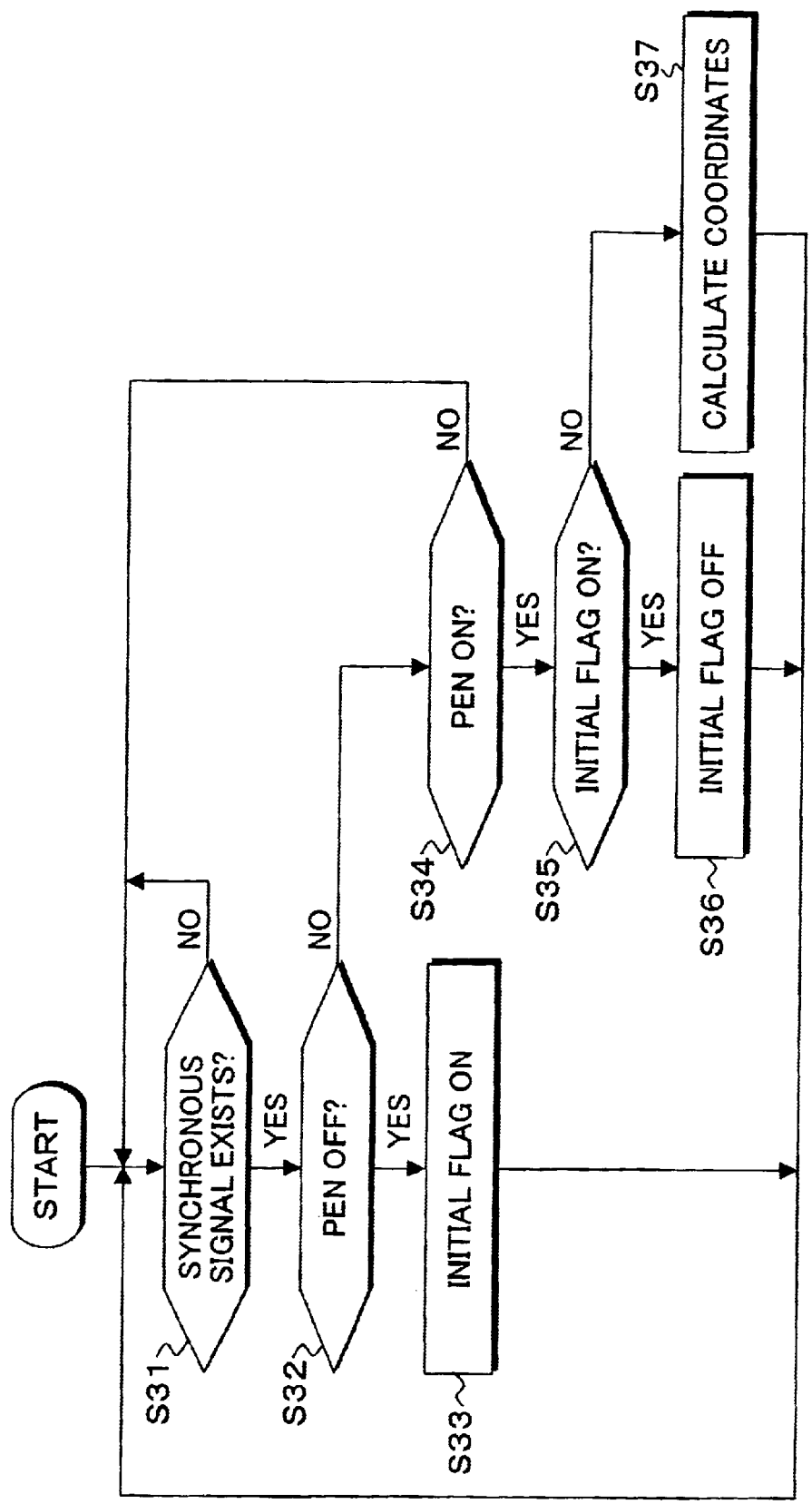
FIG. 41 illustrates a flow-chart of the process operation on the receiving side constituting the third embodiment of the invention.

On the other hand, as shown in FIG. 41, when the fixed unit 250 on the receiving side detects the synchronous signal (Yes), it judges whether the signal is a pen-OFF signal or not (Step S32) and, when it is a pen-OFF signal (Yes) an initial flag is placed (Step S33) and the operation returns to the Step 31 ignoring the measured value at that moment. On the other hand, when the signal is judged not to be a pen-OFF signal (No), the signal is judged whether it is a pen-ON signal or not in Step S34. Next, when it is a pen-ON signal (Yes), whether the initial flag is placed or not is judged in Step S35. When it is placed (Yes), the initial flag is made off and cleared in Step S36 and the operation returns to Step S31 ignoring the measured value at that moment. When it is not placed (No), the coordinate calculation of the mover 210 is conducted using triangulation as described above using the measured value at that moment in Step S37. As described above, according to the third embodiment, an initial flag is placed when a pen-OFF signal is detected and, after the detection of a pen-ON signal, the initial flag is cleared once, then, the coordinate calculation is conducted from the moment when the next synchronous signal is detected. As a result, the measured value at the initial stage of the writing stroke is ignored. However, in this manner, no trouble occurs in detecting the writing stroke of a handwritten characters etc. even when the data for the initial several times of the writing stroke is ignored because the repetition rate of the synchronous signal and the ultrasonic signal by the timer 202 is 50–200 Hz as described above.

Next, a fourth embodiment of the invention for preventing any malfunction caused by the sound of collision will be described. In this embodiment, the mis-detection between the sound of collision and the normal ultrasonic wave signal is prevented by providing means for distinguishing the sound of collision from the ultrasonic wave signal to the fixed unit 250. More specifically, the sound of collision generally contains relatively many frequency components while the frequency of the ultrasonic wave signal transmitted from the pen-shaped mover 210 is fixed. Then, it is possible to distinguish the sound of collision from the normal ultrasonic wave signal by analyzing the frequency components of the received sonic wave.

FIG. 43 shows the operation of the receiving side of this fourth embodiment, i.e., the fixed unit 250. In this embodiment, the period of the received sonic wave is measured using an approach of, for example, zero-cross detection etc. (Step S51, S52 and S53). When this period is different from the predetermined period of the ultrasonic wave signal transmitted from the pen-shaped mover 210 (Yes of Step S54), the received sonic wave is ignored and the normal ultrasonic wave signal (pulse) is waited (Step S56). On the other hand, when the period of the received sonic wave coincides the period of the above predetermined period (Yes of S54), the sonic wave is judged to be the normal ultrasonic wave and the coordinate calculation process for the pen-shaped mover 210 is conducted using triangulation as described above using this judgment result (Step S55).

Figure 44A:
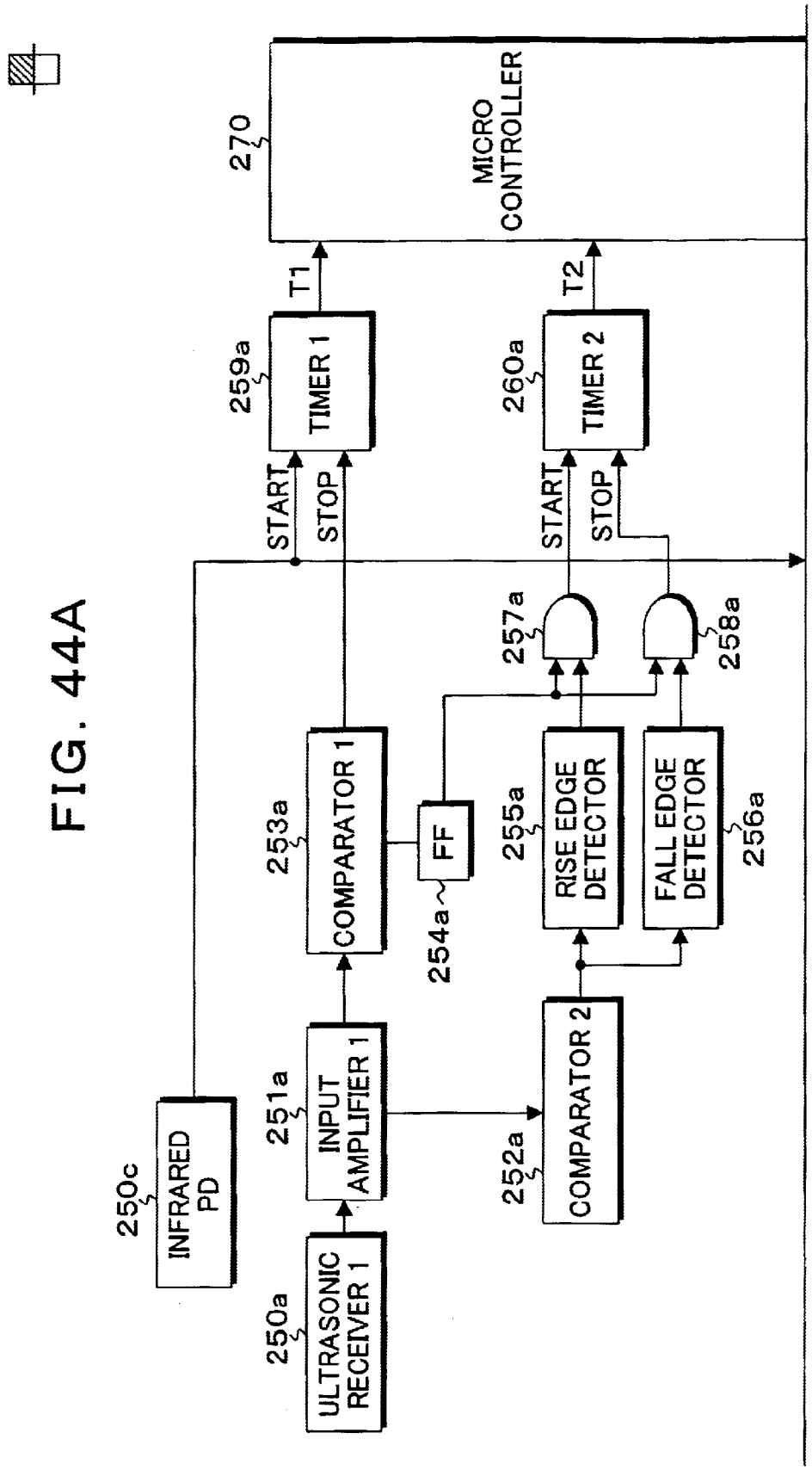
FIGS. 44A and 44B illustrate a block diagram of the configuration of the receiving side constituting the fourth embodiment of the invention.
Figure 44B:
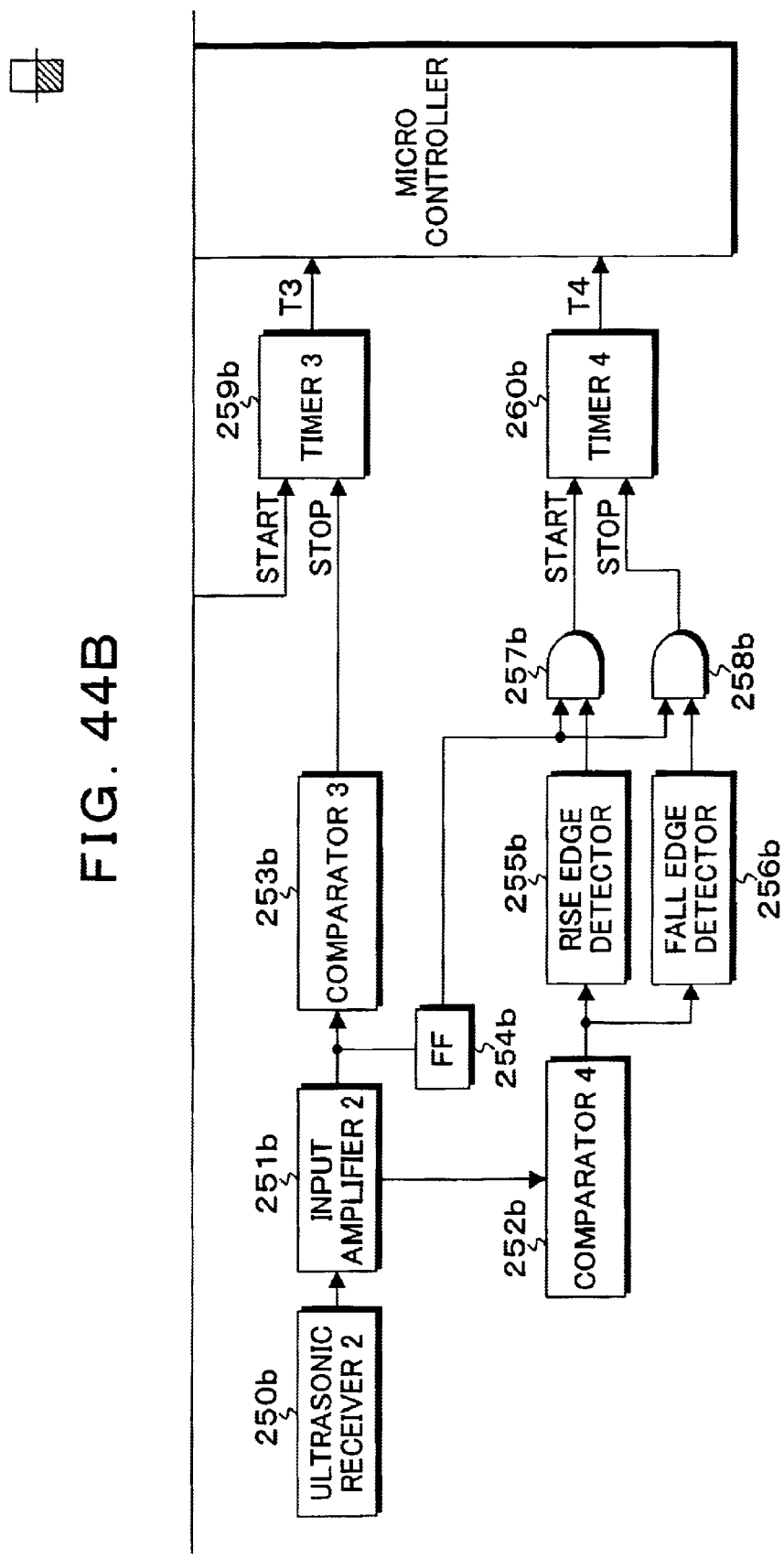

FIGS. 44A and 44B show the configuration of the receiving side (the fixed unit 250 side) according to the fourth embodiment shown in FIG. 43. Only the ultrasonic wave receiver 250a side will be described because the circuits following the ultrasonic wave receivers 250a and 250b are same. The output of the receiver 250a is input to an input amplifier 251a and the detected signal amplified in the input amplifier 251a is utilized for measuring the ultrasonic wave receiving timing, i.e., propagation time of the ultrasonic wave signal as well as for the period measurement of the received sonic wave. That is, the amplifier output is input to both of a comparator 253a for propagation time measurement and a comparator 252a for measuring a ½ period. As to the measurement of the propagation time, it is measured by starting a timer 259a with the input from an infrared PD (synchronous signal detector) 250c and stopping the timer 259a with the output from the comparator 253a. The time T1 measured by the timer 259a is taken as the propagation time of the ultrasonic wave signal. The comparator 253a has a predetermined threshold value and generates an output when a sonic wave exceeding the threshold value is received. This threshold value is set to a level with which it prevents the detection of sonic wave, by noises such as disturbance sound. On the other hand, the comparator 252a used for ½ period measurement of the received sonic wave is a zero-cross comparator and the output of this comparator 252a is input to both of a rise edge detection circuit 255a and a fall-down edge detection circuit 256b. Because the zero-cross comparator 252a often generates pulses by the noises etc., a signal generated when the output of the comparator 253a for above propagation time measurement is received at a FF (flip-flop) is utilized as a mask. That is, unnecessary noise components are masked by obtaining the result of AND process with the outputs of rise and fall-down edge detection circuit 255a and 255b. A timer 260a is started by the masked output of the rise detection circuit 255a and the timer 260a is stopped by the masked output of the fall-down edge detection circuit 256a. The time T2 obtained in this manner corresponds to a zero-cross interval of the received sonic wave, i.e., ½ period. The timer is started by the rise edge and it is stopped by the fall-down edge in FIG. 45 but the signals used to start and stop the timer can be the opposite of each other. That is, the circuit constituted of the comparator 253a and the timer 259a is a circuit portion for measuring the time difference T1 from the receiving timing of the synchronous signal received by the infrared PD 250c to the receiving timing of the ultrasonic wave signal received by the ultrasonic wave receiver 250a (i.e., above "propagation time") and for conducting the coordinate calculation using triangulation as described above from the time difference T1 and the time difference T3 from the other system obtained from the circuit constituted of the corresponding comparator 253b and the timer 259b. Due to this configuration, a sonic wave having a predetermined level and a predetermined period is detected as the normal ultrasonic wave signal and applied to the coordinate position calculation of the pen-shaped mover 210. On the other hand, the circuit constituted of the comparator 252a, a rise edge detection circuit 255a, a fall-down detection circuit 256a, an AND circuits 257a and 258a and a timer 260a is a circuit portion for measuring the sonic wave period of the received sonic wave (for example, a period corresponding to 80 kHz) by starting and stopping the timer 260a every time the received signal level crosses the zero level upward and downward.

As described above, according to the invention, in the configuration in which the propagation time of the length measurement signal such as ultrasonic wave etc. is detected, the corresponding propagation length is calculated and the position of the mover is detected using triangulation, mis-detection of the position due to the sound of collision that may occur at the start of the pen contact can be prevented by not applying the data obtained at the moment when the mover first contacts the contact face, to the position detection calculation. Consequently, it is possible to realize a coordinate inputting apparatus excellent in usability and precision, that can be enabled to widen the range of application by not limiting the area for writing operation.

Furthermore, the invention is not limited to the above-described embodiments and includes modifications without departing from its objects and advantages. In addition, the invention is not restricted by the numerical values shown in the above-described embodiments.

What is claimed is:

1. An ultrasonic length measuring apparatus comprising:
   a transmission unit for transmitting an ultrasonic wave signal;
   at least one receiving unit for receiving the ultrasonic wave signal and converting it into an electrical signal;
   a timing detection unit for measuring a number of times a waveform of the ultrasonic wave signal received by the receiving unit crosses a predetermined threshold value, for detecting a first crossing point corresponding to the ultrasonic wave signal crossing the predetermined threshold value a first time, and for detecting a crossing timing corresponding to a second crossing point when the ultrasonic wave signal crosses the predetermined threshold value a predetermined number of times after the first crossing point;

a time measuring unit for measuring a time period from a start of transmission of the ultrasonic wave signal by the transmission unit to the crossing timing detected; and a length measuring unit for calculating a length based on the measured time period.

2. An ultrasonic length measuring apparatus comprising:

a transmission unit for transmitting an ultrasonic wave signal;

at least one receiving unit for receiving the ultrasonic wave signal and converting it into an electrical signal;

a timing detection unit for measuring a number of times a waveform of the ultrasonic wave signal received by the receiving unit crosses a predetermined threshold value, for detecting a first crossing point corresponding to the ultrasonic wave signal crossing the predetermined threshold value a first time, for detecting a second crossing point corresponding to the ultrasonic wave signal crossing the predetermined threshold value a predetermined number of times after the first crossing point, and for detecting each crossing timing corresponding to the ultrasonic wave signal crossing the predetermined threshold value a predetermined number of times after the second crossing point;

a time measuring unit for measuring time periods from a start of transmission of the ultrasonic wave signal by the transmission unit to each crossing timing detected, and obtaining an arithmetic mean of each time period measured; and a length measuring unit for calculating a length based on the time obtained as the arithmetic mean.

3. An ultrasonic length measuring apparatus according to claim 1 or 2, wherein the second crossing point corresponds to a crossing point of a vibration having a maximal amplitude of the waveform of the received ultrasonic wave signal with the predetermined threshold value or a crossing point of a vibration one vibration immediately before or after the vibration having the maximal amplitude with the predetermined threshold value.

4. An ultrasonic length measuring apparatus according to claim 1 or 2, wherein the second crossing point is a crossing point of an nth vibration of the waveform of the received ultrasonic wave signal with a threshold value or a crossing point of an n±1th vibration with the threshold value when an integer Q-value of the receiving unit is n.

5. An ultrasonic length measuring apparatus according to claim 2, wherein the timing detection unit measures a number of times of crossing of the waveform of the ultrasonic wave signal received by the receiving unit with a threshold value set on both of the polarities relative to the center of vibration, and detects each crossing timing for a predetermined number of times from the crossing point of both of the polarities after predetermined times counting from the first crossing point, and wherein the time measuring unit obtains the time periods by measuring and obtaining the arithmetic mean of each of the time from the start of transmitting the ultrasonic wave signal by the transmission unit to each detected crossing timing of both polarities.

6. An ultrasonic length measuring apparatus according to claim 2 or 5, wherein the timing detection unit measures a number of times of crossing at the rises and fall-downs of the waveform of the ultrasonic wave signal received by the receiving unit with a predetermined threshold, and detects each crossing timing for a predetermined number of times after a predetermined number of times counting from the first crossing point, and wherein the time measuring unit obtains the time obtained by measuring each time period from the start of transmission of the ultrasonic wave signal to each crossing timing of the detected rises and fall-downs and obtaining their arithmetic mean.

7. An ultrasonic length measuring apparatus according to claim 1 or 2, wherein the transmission unit comprises a transmission notifying unit which issues electromagnetic waves in synchronism with a start of transmission of an ultrasonic wave signal, and wherein the time measuring unit receives a beam or electromagnetic wave from the transmission notifying unit, and detects a transmission starting timing of the ultrasonic wave signal.

8. An ultrasonic length measuring apparatus according to any one of claim 1, 2 or 5, wherein the apparatus comprises at least two systems of the receiving unit, the timing detection unit, the time measuring unit and the length measuring unit, and further comprises a coordinate measuring unit for calculating a position of the transmission unit as two-dimensional coordinates based on two lengths obtained by each of the length measuring units.

9. An ultrasonic length measuring method comprising:

transmitting an ultrasonic wave signal;

receiving the ultrasonic wave signal by use of at least one receiving unit and converting the ultrasonic wave signal into an electrical signal;

detecting a number of times a waveform of the received ultrasonic wave signal crosses over a predetermined threshold value, detecting a first crossing point corresponding to the ultrasonic wave signal crossing the predetermined threshold value a first time, and detecting a crossing timing corresponding to a second crossing point when the ultrasonic wave signal crosses the predetermined threshold value a predetermined number of times after the first crossing point;

measuring a time period from a start of transmission of the ultrasonic wave signal to the crossing timing detected; and calculating a length based on the time period measured.

10. An ultrasonic length measuring method comprising:

transmitting an ultrasonic wave signal;

receiving an ultrasonic wave signal by use of at least one receiving unit and converting the ultrasonic wave signal into an electrical signal;

detecting a number of times a waveform of the received ultrasonic wave signal crosses a predetermined threshold value, detecting a first crossing point corresponding to the ultrasonic wave signal crossing the predetermined threshold value a first time, detecting a second crossing point corresponding to the ultrasonic wave signal crossing the predetermined threshold value a predetermined number of times after the first crossing point, and detecting each crossing timing corresponding to the ultrasonic wave signal crossing the predetermined threshold value a predetermined number of times after the second crossing point;

measuring a time period from a start of transmission of the ultrasonic wave signal to each crossing timing detected, and obtaining an arithmetic mean of each time period measured; and calculating a length based on the time obtained as the arithmetic mean.

11. An ultrasonic length measuring method according to claim 9 or 10, wherein the second crossing point corresponds to a crossing point of a vibration having a maximal amplitude of the waveform of the received ultrasonic wave signal with the predetermined threshold value or a crossing point of a vibration one vibration immediately before or after the vibration having the maximal amplitude with the predetermined threshold value.

12. An ultrasonic length measuring method according to claim 9 or 10, wherein the second crossing point is a crossing point of an nth vibration of the waveform of the received ultrasonic wave signal with the predetermined threshold value or a crossing point of an n±1th vibration with the predetermined threshold value when the integer Q-value of the receiving step is n.

13. An ultrasonic length measuring method according to claim 10, wherein the detecting step measures a number of times of crossing of the waveform of the received ultrasonic wave signal with a threshold value set on both of the polarities relative to the center of vibration, and detects each crossing timing for a predetermined number of times from the crossing point of both of the polarities after predetermined times counting from the first crossing point, and wherein the measuring step obtains the time periods by measuring and obtaining the arithmetic mean of each of the time from the start of transmitting the ultrasonic wave signal to each detected crossing timing of both polarities.

14. An ultrasonic length measuring method according to claim 10 or 13, wherein the detecting step measures a number of times of crossing at the rises and fall-downs of the waveform of the received ultrasonic wave with a predetermined threshold, and detects each crossing timing for a predetermined number of times after a predetermined number of times counting from the first crossing point, and wherein the measuring step obtains the time obtained by measuring each time period from the start of transmission of the ultrasonic wave signal to each crossing timing of the detected rises and fall-downs and obtaining their arithmetic mean.

15. A method according to claim 9 or 10, wherein the measuring step detects a transmission start timing by receiving a beam or an electromagnetic wave in synchronism with the ultrasonic wave transmission start.

16. A method according to any one of claim 9, 10 or 13, wherein the method further comprises a coordinate measurement step for calculating a transmission position as a two (2)-dimensional coordinate based on the two lengths obtained in the detecting step, the measuring step and the calculating step for the waveform of the received ultrasonic wave signal received by at least two systems of the receiving unit.

* * * * *